US007782324B2

(12) United States Patent
Goldfarb

(10) Patent No.: US 7,782,324 B2
(45) Date of Patent: Aug. 24, 2010

(54) NON-HIERARCHICAL UNCHAINED KINEMATIC RIGGING TECHNIQUE AND SYSTEM FOR ANIMATION

(75) Inventor: Haggai Goldfarb, Sherman Oaks, CA (US)

(73) Assignee: Dreamworks Animation LLC, Glendale, CA (US)

( * ) Notice: Subject to any disclaimer, the term of this patent is extended or adjusted under 35 U.S.C. 154(b) by 912 days.

(21) Appl. No.: 11/285,921

(22) Filed: Nov. 23, 2005

(65) Prior Publication Data
US 2007/0115289 A1 May 24, 2007

(51) Int. Cl.
*G06T 13/00* (2006.01)
(52) U.S. Cl. ...................... 345/473; 345/474
(58) Field of Classification Search ................. 345/473, 345/474
See application file for complete search history.

(56) References Cited

U.S. PATENT DOCUMENTS

| | | | | | |
|---|---|---|---|---|---|
| 5,261,041 | A | * | 11/1993 | Susman | 345/473 |
| 5,287,446 | A | * | 2/1994 | Williams et al. | 345/474 |
| 5,379,215 | A | * | 1/1995 | Kruhoeffer et al. | 702/3 |
| 5,566,288 | A | * | 10/1996 | Koerhsen | 345/442 |
| 5,611,036 | A | * | 3/1997 | Berend et al. | 345/441 |
| 5,929,867 | A | * | 7/1999 | Herbstman et al. | 345/474 |
| 6,034,695 | A | * | 3/2000 | Silva et al. | 345/619 |
| 6,215,495 | B1 | * | 4/2001 | Grantham et al. | 345/419 |
| 6,271,864 | B1 | * | 8/2001 | Graham | 345/442 |
| 6,326,972 | B1 | * | 12/2001 | Buhler et al. | 345/474 |
| 6,512,522 | B1 | * | 1/2003 | Miller et al. | 345/474 |
| 6,606,095 | B1 | * | 8/2003 | Lengyel et al. | 345/473 |
| 2004/0130550 | A1 | * | 7/2004 | Blanco et al. | 345/473 |
| 2005/0190204 | A1 | * | 9/2005 | Cohen et al. | 345/660 |
| 2006/0103655 | A1 | * | 5/2006 | Nelson et al. | 345/473 |

FOREIGN PATENT DOCUMENTS

| | | |
|---|---|---|
| EP | 0 984 366 A2 | 3/2000 |
| EP | 0 984 366 A3 | 3/2000 |
| EP | 1 304 655 A2 | 4/2003 |
| EP | 1 304 655 A3 | 4/2003 |

OTHER PUBLICATIONS

Invitation to Pay Additional Fees mailed on Jan. 16, 2007, for PCT Application Patent No. PCT/US2006/033158 filed on Aug. 25, 2006, five pages.
Preda, M. et al. (2002). "Critic Review on MPEG-4 Face and Body Animation," *Proceedings of the 2002 International Conference on Image Processing*, Rochester, NY, Sep. 22-25, 2002, 3:505-508.
European Search Report mailed on Feb. 27, 2009, for EP Application No. 08021337, filed on Aug. 25, 2006, 5 pages.
Maestri, G. (Aug. 13, 2001). "Animating Reptiles and Snakes," located at <http://www.informit.com/articles/article.aspx?p=22802 &seqNum=5>, last visited on Mar. 6, 2009, 2 pages.

* cited by examiner

*Primary Examiner*—Xiao M Wu
*Assistant Examiner*—David T Welch
(74) *Attorney, Agent, or Firm*—Morrison & Foerster LLP

(57) ABSTRACT

In computer enabled key frame animation, a method and associated system for rigging a character so as to provide a large range of motion with great fluidity of motion. The rigging uses a character body that moves along a path or freely as needed. The nodes in the body and path are not physically connected but are linked for performing a particular task. This task driven behavior of the nodes which may allow them to re-organize themselves in different re-configurations in order to perform a common duty, implies a variable geometry to the entire dynamic structure. To some regard the nodes can be said to be intelligent.

23 Claims, 60 Drawing Sheets

```
for (ctl_ind = 0; ctl_ind < num_ctls; ctl_ind++) {

= = = if (path_ctl && (ctl_ind == num_ctls-1)) m3 = num_path_segments-1;

if (((path_ctl) && (locked_path[ctl_ind] == 1)) || <(ipath_ctl) && (locked[ctl_ind] == 1))) { bck_n = 0;
        if (ctl_ind <= num_ctls-1) {
            for (n1 = m0; n1 <= m3; n1++) {
                if ((m3 != m0) && (m3 > 0) && (m3 < (num_segments))) {
                    bck_t  = bck_n/(m3-m0)
                    MX4_berier_interp(m0_mx, m1_mx, m2_mx, m3_mx, bck_t; out_mx[n1])
                }
                bck_n++;
            }
        }
    }
    ctl_1_rot[1] = D;
}
```

FIG. 14

| Overlay viper_m_tail_ik - frame | |
|---|---|
| m_all_t | |
| tx | 0 |
| ty | 0 |
| tz | 0 |
| m_all_r | |
| bend | 0 |
| twist | 0 |
| side | 0 |
| m_path_plv_t | |
| tx | 0 |
| ty | 0 |
| tz | 0 |
| m_path_plv_r | |
| bend | 0 |
| twist | 0 |
| side | 0 |
| M_viper_handles | |
| extend handles | 100.00 |
| m_body_spline | |
| draw_up_spline | 0 |
| up_spline_radius | 0.10 |
| m_path | |
| body_travel | 0 |
| path_slide | 0 |
| draw_path | 1.00 |
| path_radius | 0.10 |
| draw_up_path | 0 |
| up_path_radius | 0.10 |
| umb_loc | 0 |
| umb_blend | 0 |
| path_pls | 100.00 |
| path_length | 220.00 |
| viper_length | 117.00 |
| simple_spline | 0 |
| simple_spline_type | 3.00 |
| m_tail | |
| tail_stretch | 100.00 |

FIG. 44

| Overlay viper_m_tail_r10 - frame | |
|---|---|
| m_body_ctl_10_t | |
| tx* | 0 |
| ty* | 6.80 |
| tz* | 0 |
| m_body_ctl_10_r | |
| bend* | 0 |
| twist* | 0 |
| side* | 0 |
| local_bend* | 0 |
| local_twist* | 0 |
| local_side* | 76.40 |
| m_body_ctl_10_s | |
| sx* | 100.00 |
| scale_all* | 100.00 |
| sz* | 100.00 |
| m_body_ctl_10_c | |
| control_location* | 75.00 |
| control_sharpness* | 90.00 |
| backward_sharpness* | 100.00 |
| forward_sharpness* | 100.00 |
| body_sharpness* | 82.20 |
| spine_tx* | 0 |
| spine_ty* | 0 |
| spine_tx_sharpness* | 80.00 |
| spine_ty_sharpness* | 80.00 |
| enable_local_rot* | 1.00 |
| coil* | 100.00 |
| local_rot_arc* | 25.00 |
| local_stretch* | 0 |
| m_body_ctl_10_n | |
| direction* | 1.00 |
| draw_spline* | 1.00 |
| spline_radius* | 0.10 |
| m_body_ctl_10_x | |
| nearest_path_ctl_number* | 0 |
| m_path | |
| body_travel* | 0 |
| path_slide* | 0 |
| draw_path* | 1.00 |
| path_radius* | 0.10 |

FIG. 53

| Overlay viper_m_viper_proxy_head | |
|---|---|
| m_head_r | |
| bend | 0 |
| twist | 0 |
| side | 0 |
| m_head | |
| head_stretch | 100.00 |
| body_blend | 0 |
| m_head_trk_t | |
| path2global | 0 |
| tx | 0 |
| ty | 0 |
| tz | 0 |
| head_track_location | 0 |
| m_viper_eval | |
| spline_ik | 1.00 |
| bezier_path | 1.00 |
| run_lock | 1.00 |
| rotate | 1.00 |
| bezier_trn | 1.00 |
| translate | 1.00 |
| twist | 1.00 |
| scale | 1.00 |
| shift | 1.00 |
| place_controls | 1.00 |
| umbrella | 1.00 |
| m_path | |
| body_travel | 0 |
| path_slide | 0 |
| path_offset | 0 |
| draw_path | 1.00 |
| path_length | 220.00 |
| viper_length | 117.00 |

FIG. 60

NON-HIERARCHICAL UNCHAINED KINEMATIC RIGGING TECHNIQUE AND SYSTEM FOR ANIMATION

FIELD OF THE INVENTION

The present disclosure relates generally to computer generated animation and to the fabrication, referred to as "rigging", of characters created for animated movies, video, etc., whether two or three dimensional.

BACKGROUND

The present technique solves various kinematics problems in computer based animation character rigging and rigs. "Character" here means an animated person, animal, vehicle, robot, object, etc. Prior art rigs or rigging in computer generated or enabled animation are typically chain-based and thus dependent on a hierarchical system of nodes called "Dependency Graph" such as the well known Alias/Wavefront Maya, where each node in the animation system must pose some constant or fixed relationship with other members of the hierarchy. In such a system a node is a "child" or a "parent" of other nodes. This type of relationships creates many limitations for animation in creating the necessary character behaviors, as well as high overhead and undesirable complexity for the set-up of animation rigs. It is also well known that such hierarchical rigs are extremely hard to fix (change) when broken or deemed unsatisfactory. The reason being that once animated, a rig is stamped with its animation curves and may not be successfully modified without having to change the animation which because of the graph dependency is propagated down the chain of the hierarchy. In most cases the animation will have to be redone if any change is needed even if it is already after the production state of approval. These problems have been over-looked from the beginning of CGI (computer generated imaging) which also marks the beginning of computer based character animation and hence character rigging. Until now, character rigging has been considered one of the most complex and laborious steps in any CGI production such as production for feature film animation or visual effects. It requires a large amount of resources. Unfortunately it has become the common belief that using these expensive resources is unavoidable.

SUMMARY

The present rigging technique provides a method and system which are computer enabled and where the nodes in the animation system are not, in a digital sense, "physically" connected to each other and have no any particular relationship such as a parent-child relationship, except for what is needed and when needed at the moment of execution. That is to say: the nodes may join together in a relationship for the purpose of performing some procedural task. The execution of this task may typically only take a fraction of a second which is needed to execute the rendered result of an animation pose in a single video/film frame. However since the same nodes may be needed in order to participate in some form in another task in the next or some other subsequent frame, they are constantly in a free or floating agent state between these tasks.

The current technique provides a very flexible solution that reduces rigging complexity and allows for a much bigger range of behaviors in animation. Characters which have been rigged this way such as the "Viper" character in the film "Kung-Fu Panda" of DreamWorks Animation, have a feel of much more fluid motion, and can have a much bigger range of motion than otherwise. Also, because each character or object joint is its own individual unattached element, fixes can remain isolated without having to affect the entire character rig.

BRIEF DESCRIPTION OF THE DRAWINGS

FIG. 14 shows the bezier path logic.

FIG. 44 shows the path controls overlay.

FIG. 53 shows the universal controls overlay.

FIG. 60 shows the overlay control for the character head.

DETAILED DESCRIPTION

Introduction

For simplicity, the present method and system are described here in the context of the "viper" character rig for the animated feature file "Kung-Fu Panda". This method and system may be used in other animation/computer graphics applications.

Generally animation uses key frame animation whereby the user (animator) with computer assistance animates particular frames of a film, video, commercial, etc. These key frames are then used by computer software to generate intermediate frames for the film, video, etc., to provide the needed 24 or 30 frames/second for the finished film or video. The animation process is complex with many technical aspects described here only as relevant to the present invention. Generally the figures here are what the animator sees as he uses the present system, and are not the finished animation.

There are two main elements in the present rig system:
1. Body
2. Path

Figure 1:
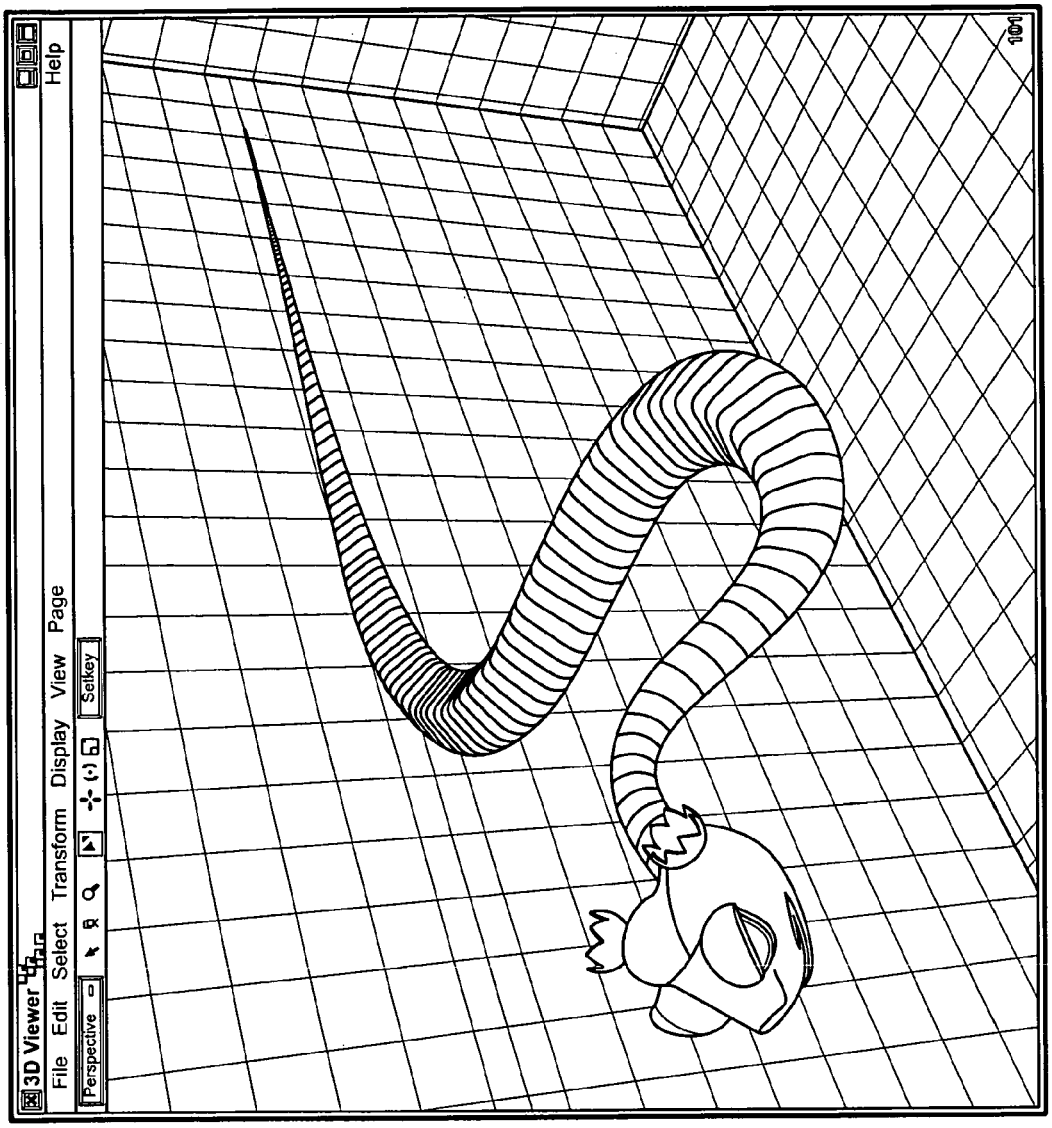
FIG. 1 shows the polygonal geometrical representation of the body parts of a character.

The path relates to a track-like system allowing the character's body to follow it during animation or posing. The body relates to, e.g., the actual body and the head of the viper (snake) character which is the subject of animation as shown in FIG. 1. Although prior art systems have used a simple path or spline-ik system, the present "spline-XK" path (as designated here for convenience) has novel functions such as allowing the path to be used for shaping or posing the character (or object) being animated. The integration, fabrication and jointed configuration of these two elements are carried out by the present system.

In this disclosure, similar to other animation systems, each element which is part of the rig and is presented within the Cartesian space (xyz coordinates), visible or not, is a node in the system. The term joint here refers to the graphical icon representations of a person's or animal's actual skeletal bone. Thus a snake character's actual bone is represented or simulated as a joint here. A joint is always a single node in the rig. The term link here is a more general aspect of a joint, in the sense of a link in a chain of elements. A link may not have any actual graphical representation but exists as an element in a chain. Thus a joint is visible and sometimes can be directly manipulated by the animator by selecting the associated icon. A link is not visible.

Figure 2:
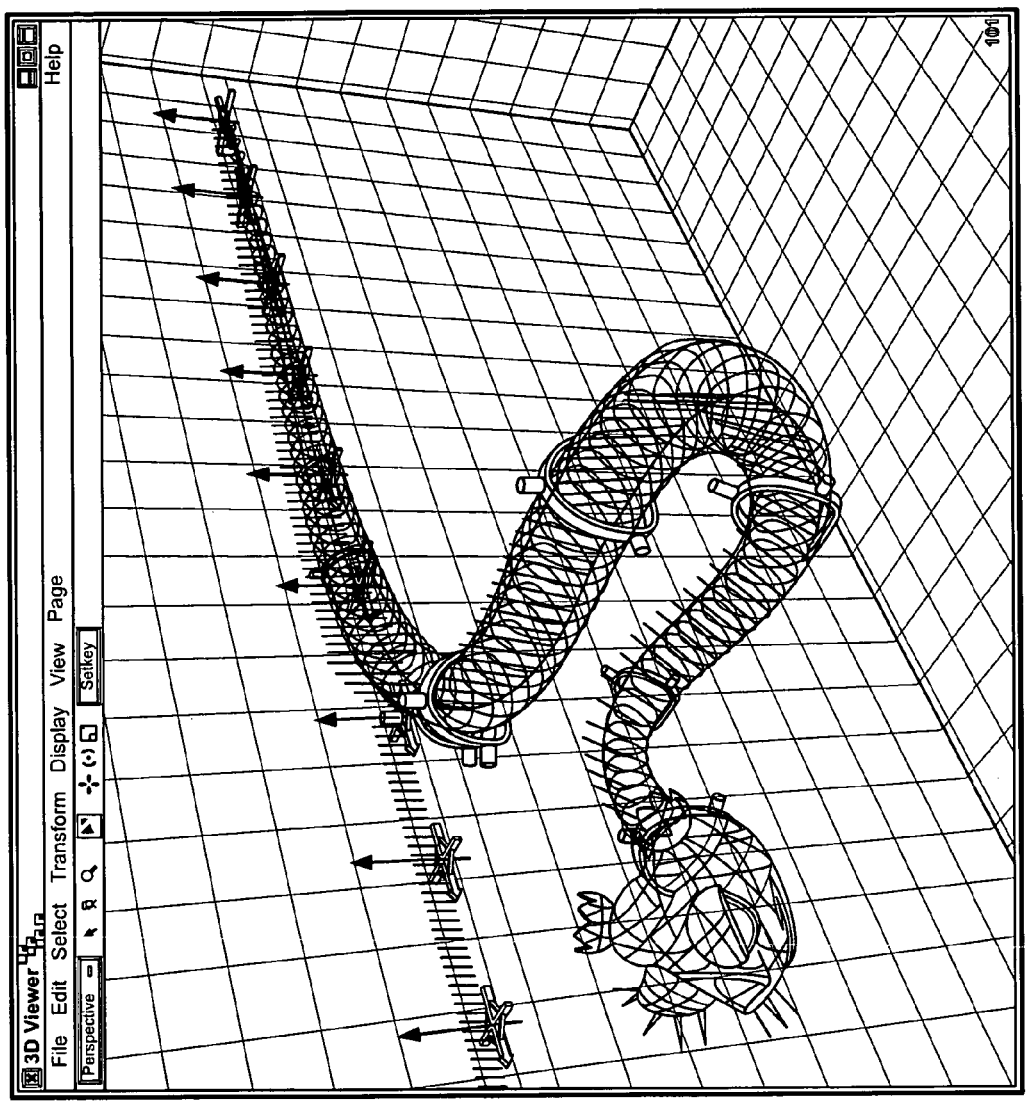
FIG. 2 shows the internal layout of the total 120 joints of the viper rig in "slinky" mode.

At their lowest level the body and the path each are a system of independent links or joints as shown in FIG. 2. Notice that the independent links are arranged in a consecutive order where each intermediate link is adjacent to two neighboring links, thus the underlined logical architecture remain consistent allowing it to be kept intact through the current animation task. (such as snake slide). While prior art systems have used chains of joints before, an important differentiating feature of the present system is in the fact the links are not chained. There are typically no fixed relationship such as parenting which the prior art used in rigs. That is to say, in contrast to prior art rigs, the inner structure of the present rig is a variable geometry which adapts itself to the constantly changing circumstances and frame needs.

Figure 3:
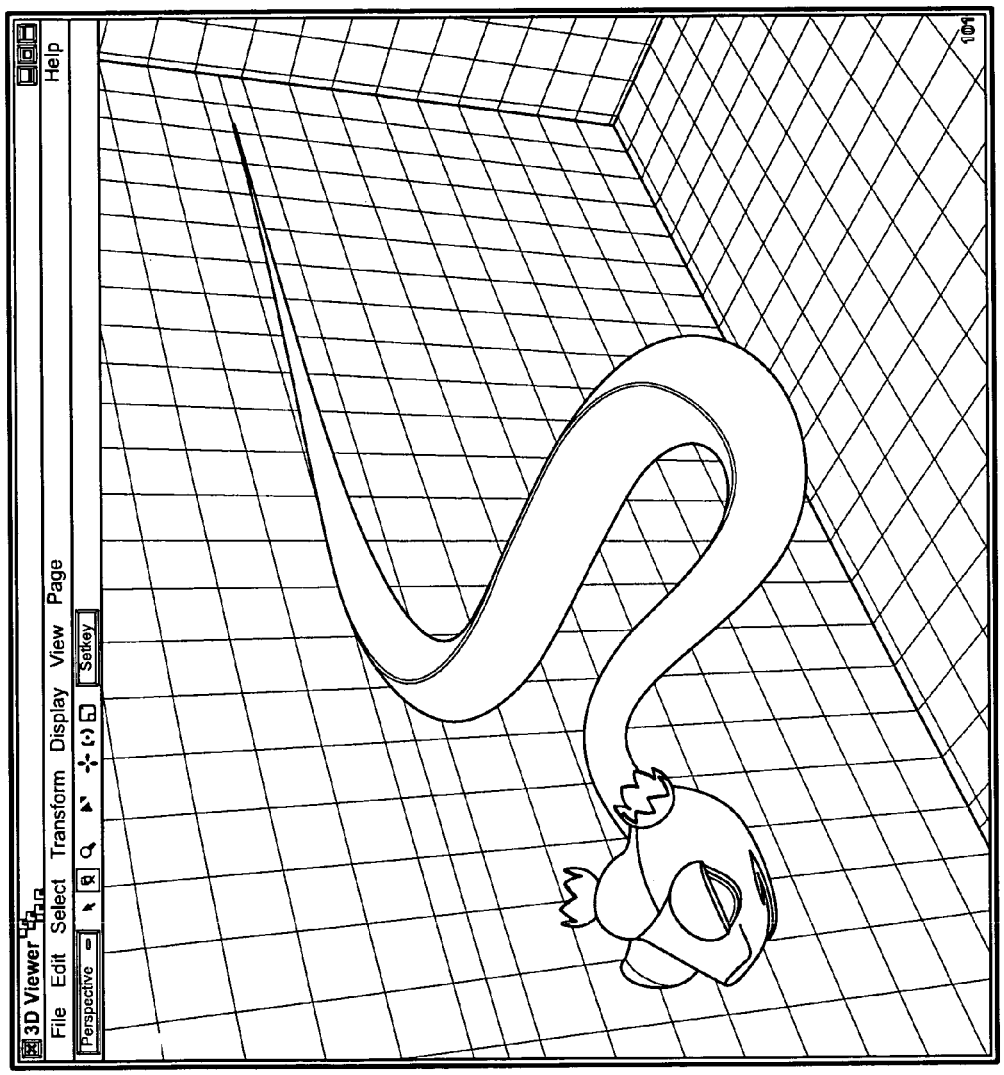
FIG. 3 shows skin deformation on the viper body rig.
Figure 4:
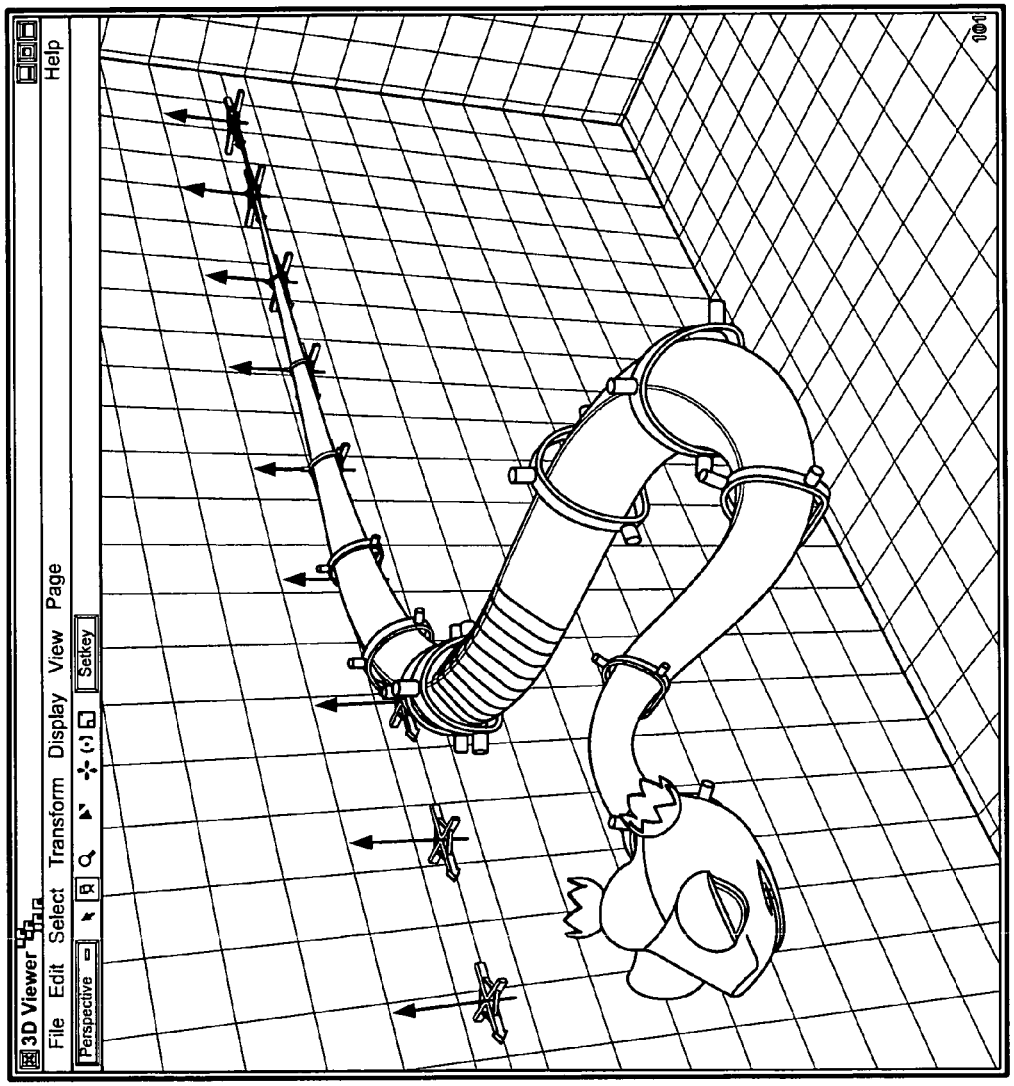
FIG. 4 shows the proxies mode, as well as universal path controls.
Figure 5:
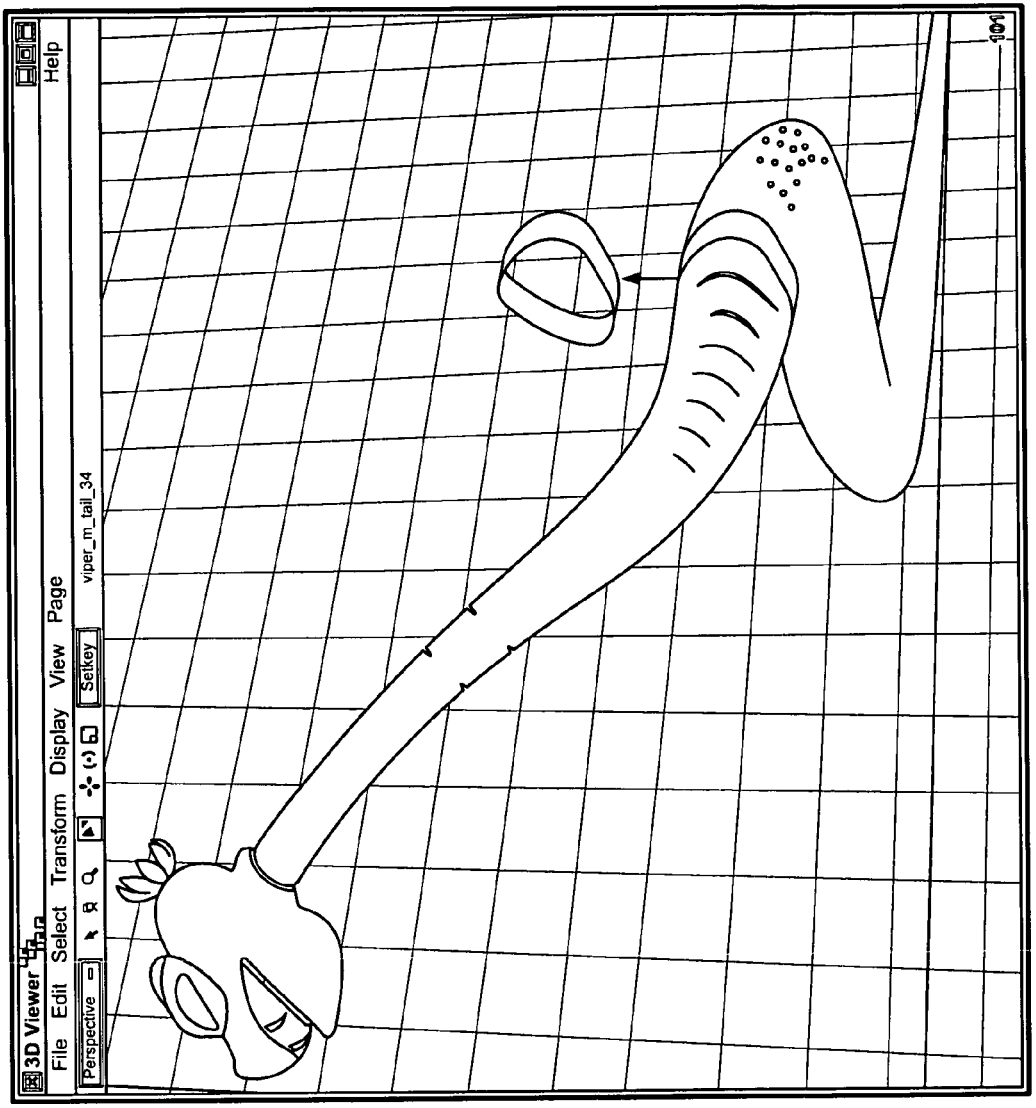
FIG. 5 shows the independent state of the joints, where each joint can move independently.
Figure 6:
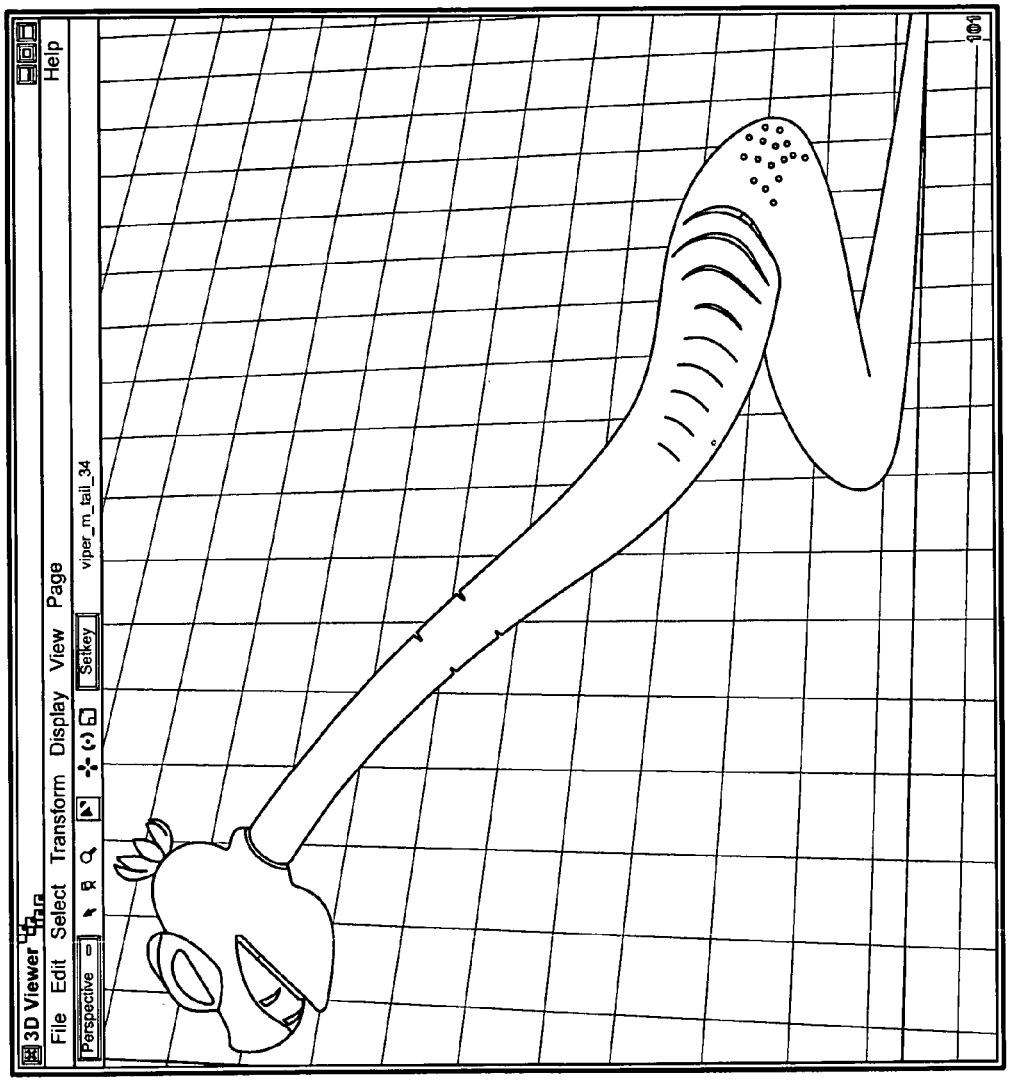
FIG. 6 shows the joint which moved in FIG. 5 as returned to its original location.

There are several visible modes of the rig throughout the animation process. When a rig is ready for rendering of its animated frames it will visually appear as a character with its skin deformed as in nature, see FIG. 3. During the animation production process, for flexibility and speed, the character is represented in a simplified schematic representation where each visible body part is called a proxy, see FIG. 4, illustrating this proxy mode, as well as universal path controls, for use by the animator. Rather than having the behavior dependent on the structure, the structure is dependent on the behavior. While joints may constantly move in their own world-space, for proper skin deformation the joints (see FIG. 5) keep the underlying (snake) shape and thus constantly keep track of their neighbors and adhere to the overall character (e.g., snake) shape constriction as in FIG. 6 showing the joint of FIG. 5 returned to its original location.

Software

The rig software has these main sub-systems each of which is typically a computer-implemented program or routine, each coded to perform the functions described here, that is, these are the main sub-systems of the computer software:

| | |
|---|---|
| viper_constraint_m_viper_spline_ik | hereon called "*spline_ik*" |
| viper_constraint_m_viper_bezier_path | hereon called "*bezier_path*" |
| viper_constraint_m_viper_run_lock | hereon called "*run_lock*" |
| viper_constraint_m_viper_path_travel | hereon called "*path_travel*" |
| viper_constraint_m_viper_rotate | hereon called "*rotate*" |
| viper_constraint_m_viper_translate | hereon called "*translate*" |
| viper_constraint_m_viper_twist | hereon called "*twist*" |
| viper_constraint_m_viper_scale | hereon called "*scale*" |
| viper_constraint_m_viper_shift | hereon called "*shift*" |
| viper_constraint_m_viper_head_track | hereon called "*head_track*" |
| viper_constraint_m_viper_place_controls | hereon called "*place_controls*" |

Figure 62:
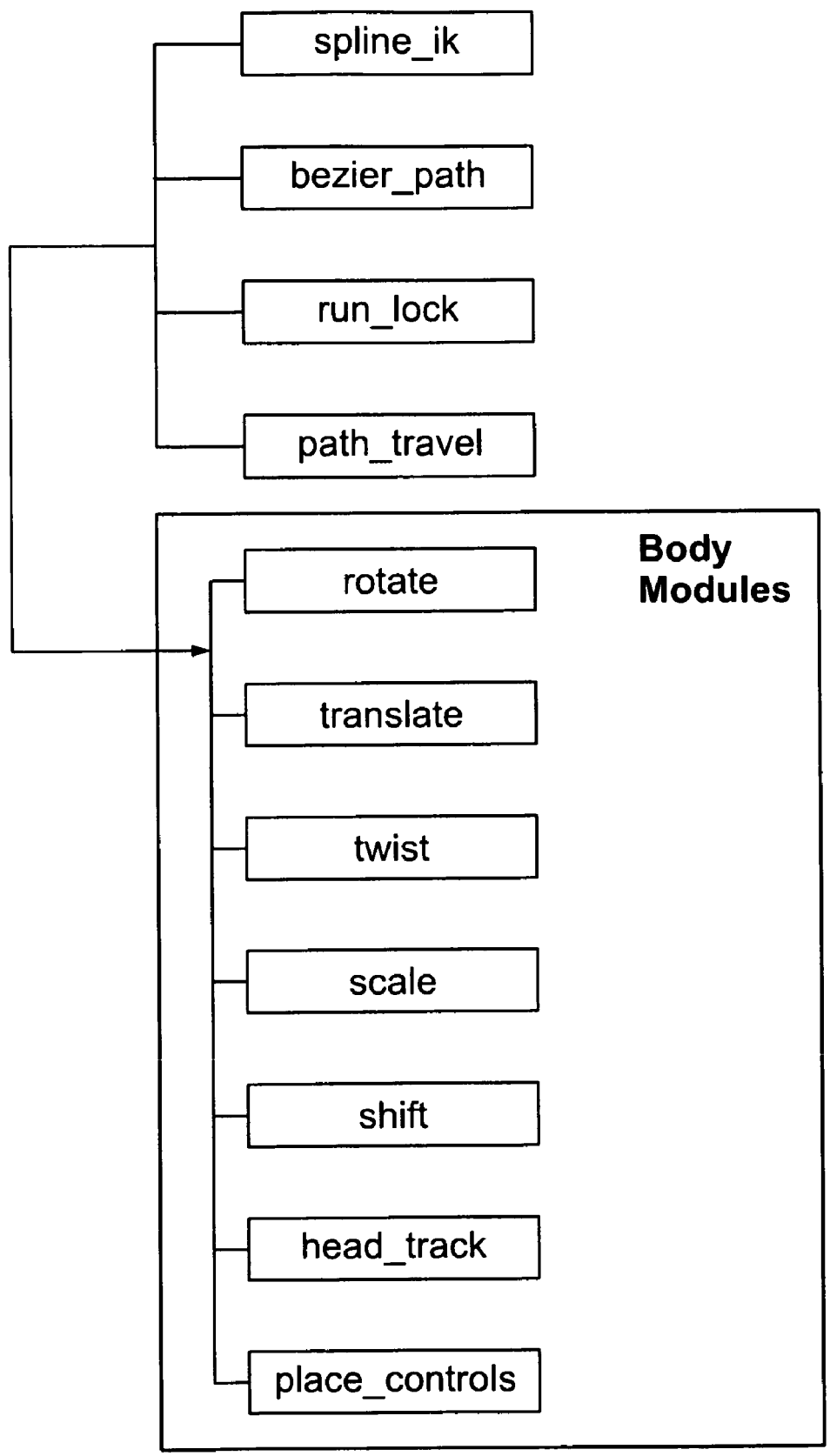
FIG. 62 shows the software architecture.

FIG. 62 shows these main sub-systems (modules) as an apparatus in a block diagram, each module labeled as above (but without the prefix viper_constraint_m_viper_,for simplicity.) These sub-systems are typically layered hierarchically, and coded to work as independent computer software modules, thus allowing interchangeability and flexibility within the hierarchy. The order shown above is used here, but any other order as well as other structuring of the various modules will be operative including addition and insertion of new modules, which is allowed at any time. Coding these modules given the present description is well within the skill of one of ordinary skill in the field of, e.g., computer graphics. A suitable computer language is, e.g., C++ or C to be executed on a conventional computer workstation of type conventionally used for computer graphics and/or animation. The names given above to the various modules are of course merely for purposes of identification. Moreover, other embodiments will have different functionality and/or distribution of functions among the various modules or other software elements. The software elements/routines/variables are generally italicized here for ease of understanding.

Spline IK Constraint

This constraint sets up the main path and the native follow-path behavior for the exemplary viper character. It takes as an input a set of path controls arranged with some default distance intervals. After query of their matrices it will apply these matrices to create a spline. The spline type is optional but typically allows the spline to move through the control points, such as bspline, linear or clamped. In one embodiment all main splines are set to be clamped by default.

By a novel animation concept disclosed here, the animator may edit the entire path configuration at pre-animation time. (The animator is the person using the present system.) However building a construction path is intended as a first step only, and since no provisions are taken at this point to handle re-building of the path once key frame saving has started, the animator decides at what point the path is ready for animation.

There are two methods available as sub-functions of the Spline-IK constraint to accommodate re-construction of the path on-the-fly:

The "Add-Sub" Method

The first method is built-in and handles insertion and removal of intermediate path controls along the path. The advantage of this method is that it is executable directly from any conventional 3D-viewer of the type well known in the computer animation field. Such as the Alias/Wavefront Maya 3D viewer. The user may select two end points and execute an action button within the Switches Editor (see below) to add or subtract controls (Viper_add or Viper_sub). Each click implies a new iteration which, for addition means an insertion or subtraction of a new control between two existing controls. The path can quickly be "hi-rez'd" (high resolution) or "de-rez'd" this way. Once a control is inserted it is immediately ready to be used by the animator. Each control is automatically attached to the newly reconstructed path and ready for action, or detached from the path in the case of subtraction.

An inverse first-in first-out type stack data structure controls the insertion and subtraction logic. It is inverse in the sense that in reality, controls are loaded from the back of the stack rather than the front. This technique was found to be less interruptive to the spline indexation. When not used, all controls remain in hibernation and in a hidden inactive state on the stack. Upon request, a control will be pulled up from the stack and be activated. If the control has an animation curve attached, it will not be lost.

A secondary virtual stack is used to allow a higher level of consecutive insertions and subtractions. (For simplicity sake the current embodiment is limited to a total of 100 path controls). While controls names must remain the same to keep logical animation curves bindings, internally their identifications are sorted out when loaded to, or unloaded from the stack.

Figure 11:
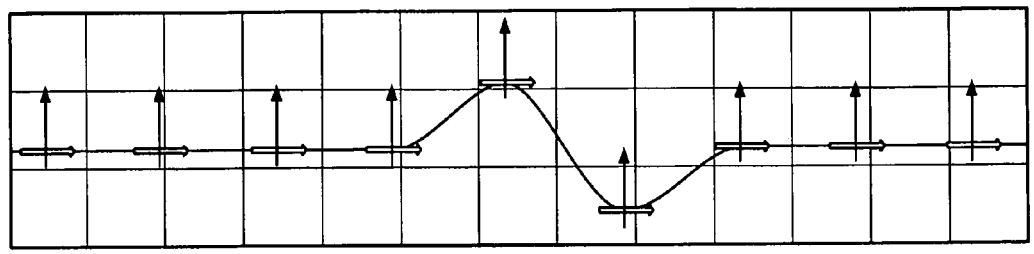
FIG. 11 shows a before addition state; only the edge controls are selected.
Figure 12:
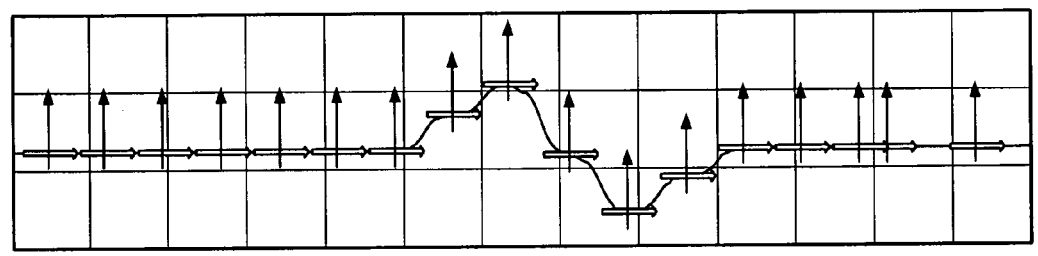
FIG. 12 shows a first addition iteration; only one control is added between two neighbors.
Figure 13:
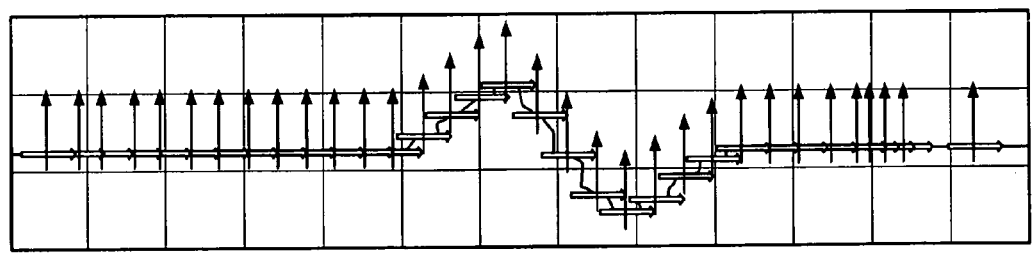
FIG. 13 shows a second addition iteration; three new controls added between every two neighbors.

FIG. 11 shows a before addition state of the controls. Only the edge controls are selected. FIG. 12 shows a first addition iteration. Only one control is added between two neighbors. FIG. 13 shows a second addition iteration. Three new controls added between every two neighbors. (Notice we chose not to rotate controls generated on a non-aligned spline to the world axis.)

The External Curve Editing Method

This method relays on the use of the external curve editing tool for path controls modifications. The main advantage of this method is in the ease, speed and simplicity of laying out control points. The second advantage is the ability to save a path in a separate native curve file, which can be re-loaded to the 3D viewer at any time. The animator can save, pick and choose from as many pose files he/she wishes to. It is also important in the sense that the isolation of the path provides a backup if something in the path goes wrong. In such situation the animation is not lost.

Figure 16:
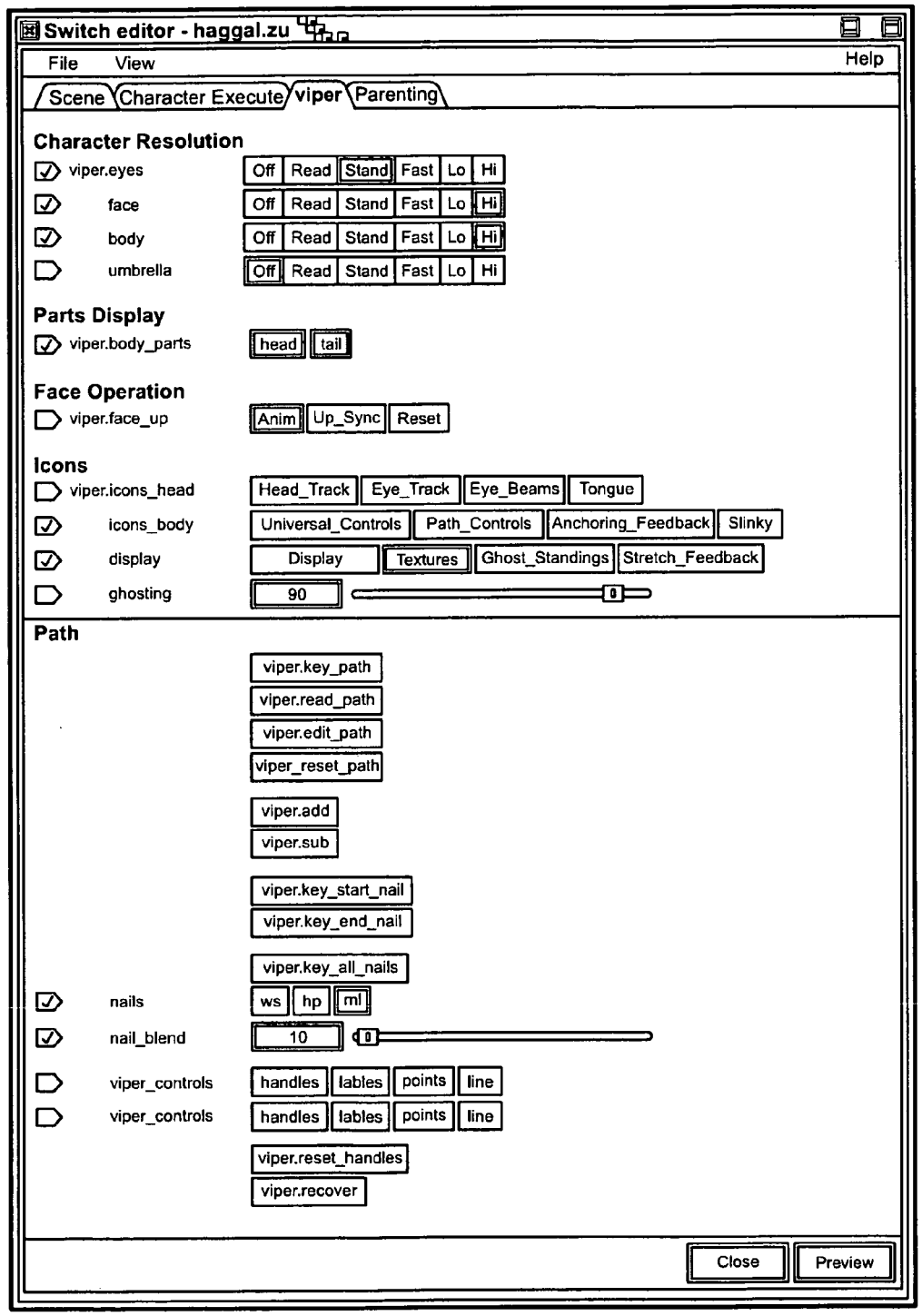
FIG. 16 shows the Switches Editor screen with all the viper related switches.

There are four buttons on the switches editor control screen (see FIG. 16) setup here for the external method:

1. The "read_path" key reads in an existing curve file stored on the disk drive (memory) associated with the computer executing the present software. For instance, the default file name is hard-coded to be "viper_path", and is located in the same directory where the main mc file is located. That is: the environment variable pointing to the directory of the current shot (in film terminology). In a normal session the animator will keep open on screen a second curve editing window which will contain a world file of the current shot. As integral part of curve editing session, the animator can import the world file from the temporary directory where it was initially created. If this file was added to the shot, the temporary directory will contain the world file and it can now be loaded into the "viper_path" file. "read_path" is no longer responsible for making a decision whether or not to read a new path from disk or rebuild a path from scratch (It used to turn the current path persistence to "On" using curve persistent setting routine. Thereby "read_path" is no longer affecting the curvature of the existing animated path.

2. The "edit_path" will load the curve editor from the switches editor control screen shown in FIG. 16. The animator can then edit the loaded mc file. After he is done editing, the newly modified curve file must be saved from within the curve editor before trying to read the file back into the path using "read_path" button. In one embodiment the only information that is read from the file is world space coordinates of the spline points. The curve's curvature is handled by the path construction procedure. This means that there could be some curvature differences between the curve editor spline and the main path, although we have found that to be negligible. Animators' experience has shown a great ease in creating and modifying the spline in the curve editor, and this process has proved to be very convenient in terms of work-flow. Upon loading the curve editor "edit_path" makes the assumption that the user is intended to modify the path and consequently turns the current path persistence to "Off" using curve persistent setting routine, allowing it to be rebuild from scratch. The animator can always use this command prior to using "read_path" to allow for another fresh load.

3. The "save_path" action button has two main functions. The first is to save the length of the newly created path. This function is needed mostly for the "ml moving locks" discussed below. Saving a length of a path can only be used once per animated scene. That is, the last length is always the final length of the path. While stretching may occur on intermediate controls, it is in fact extending the edge controls that has the most impact on the path and thus needs to be saved. The second function is saving the newly edited path. The current path will be saved to the disk drive as "viper_path" and if it already exists it will replace the older file. The old curve is backed-up (see immediately following for detail).

4. The "reset_path" action button allows the animator to start a fresh default pose curve called "viper_default_path". The old curve is backed-up to "viper_path_bkp{date-nanoseconds}.{extension}".

Once an "mcc" path is created, and a secondary adjacent slightly offset path is also created for providing up-vector orientation, an initial placement of the viper joints will take place within the sub-function char_constraint_viper_spline_ik_place_jnts( ). In the first stage, which happened within the sub-function char_constraint_viper_spline_ik_get_nodes( ), one obtains all the viper joints matrices, and creates a "dist_mat" array which will contain the accumulative default distances between every neighboring joint's position vectors using V3_dist( ). (The dist_mat array is an alternative for another method which uses the input matrices to calculate the partial distances between neighboring joints using local matrices.)

The "dist_mat" array is the input for performing arc length calculations along the path. Each joint has a corresponding arc length in order to evaluate its position along the path. Dedicated arc length functions well known in the CGI world such as "arclen" in Alias/Wavefront Maya, are responsible for handling proper real-time evaluation of the arc length and time based calculations along it. Since all perform an approximation, their accuracy and effectiveness vary. In this case they are used primarily throughout the Spline_IK constraint. The newly created "length-to-time" curve allows converting a length (i.e a segmented length from the "dist_mat" array) to a time parameter along the path. One can then evaluate the position of a joint on that time on the curve using a special curve-vector evaluation function. After all the needed point's vector positions in world space are found for every joint, as well as their nearest up-vector position using the secondary up-vector path "up_mcc", one calculates the orientation of that joint and plots their entire matrix.

One can then proceed to place the joints on the path using these new matrices.

Bezier_Path Constraint

Figure 7:
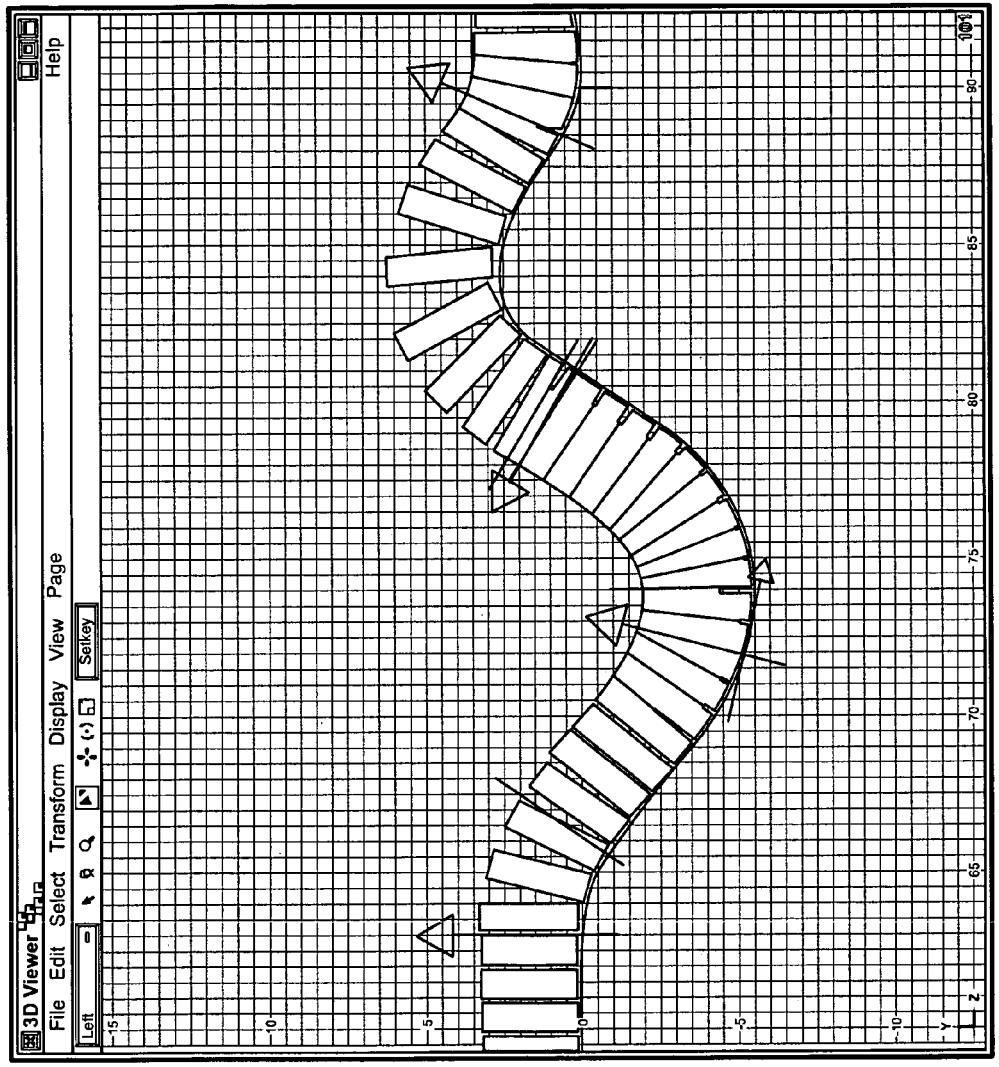
FIG. 7 shows the result of applying 60 degrees rotation on a path control—proxies mode.
Figure 8:
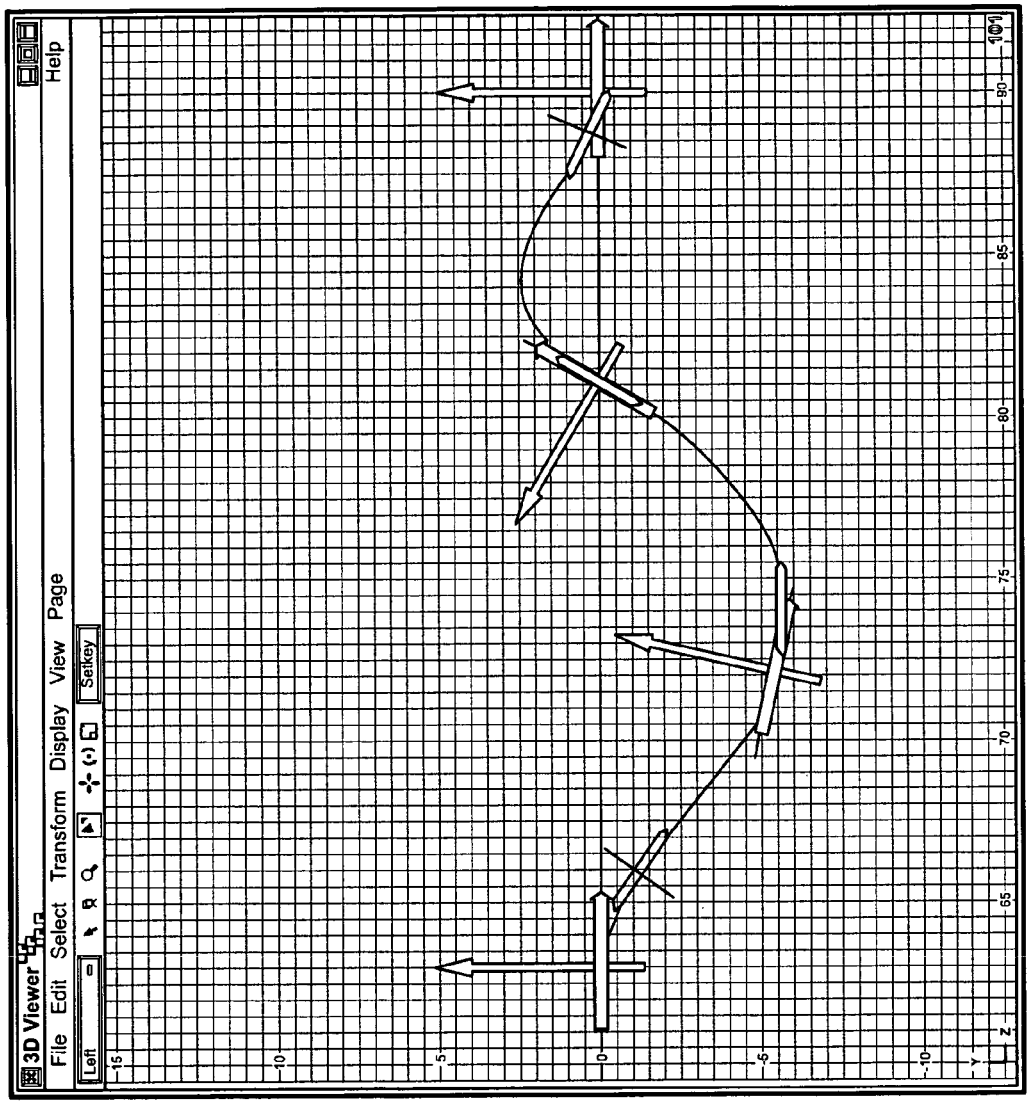
FIG. 8 shows the result of applying 60 degrees rotation on a path control—bare mode.
Figure 9:
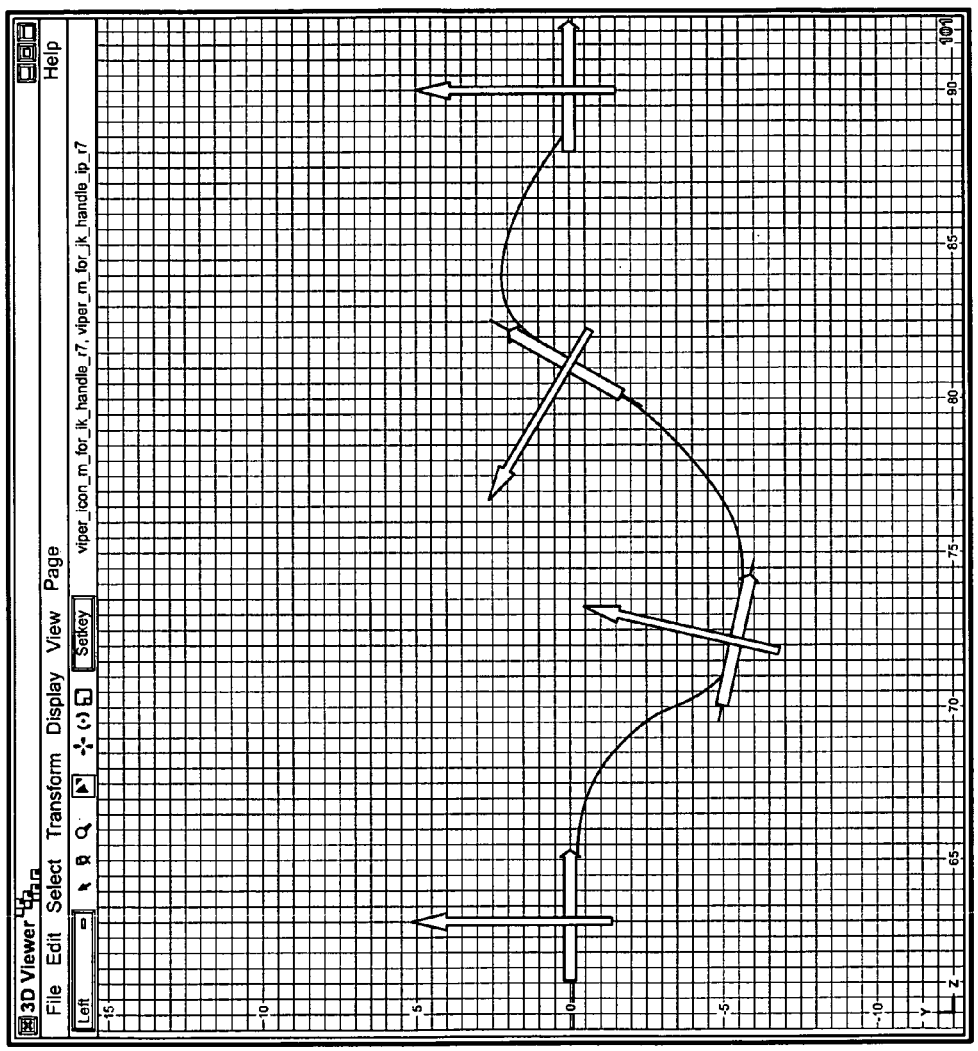
FIG. 9 shows the result of 1.75 bezier handle scale-up on the path spline.
Figure 10:
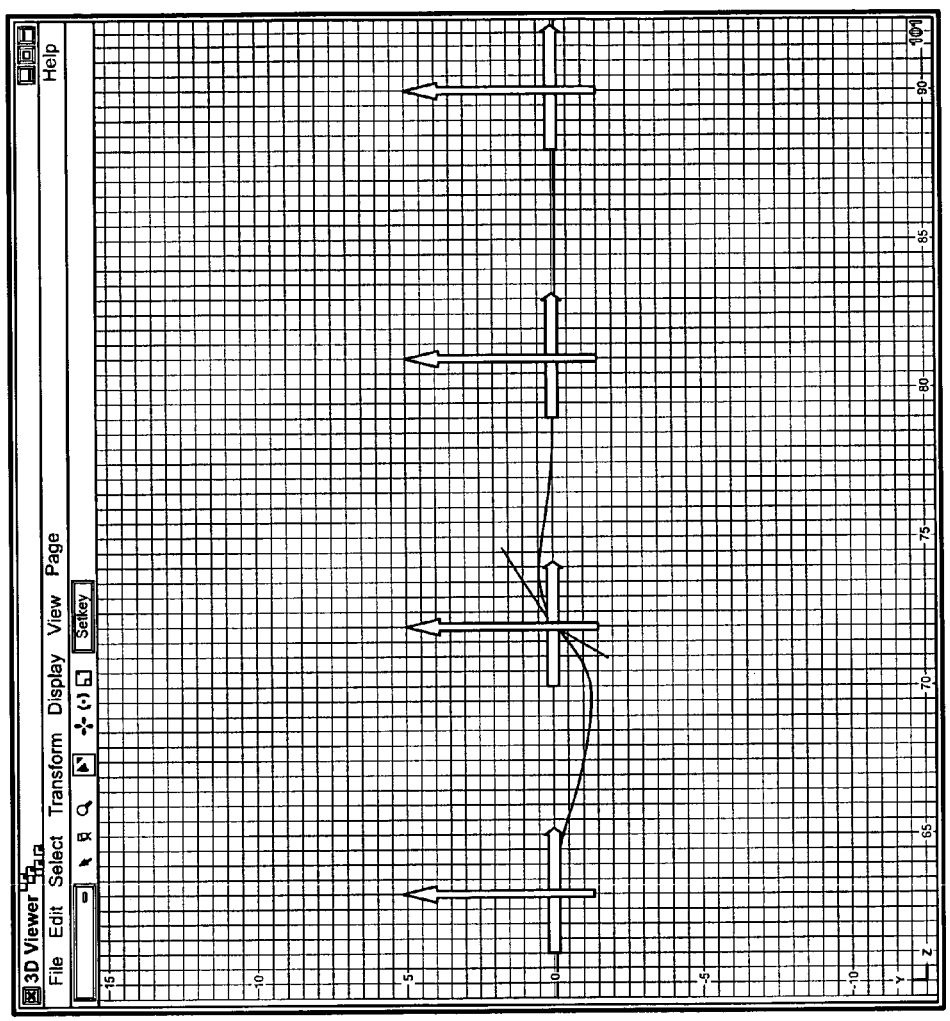
FIG. 10 shows how the two adjacent bezier handles work independently.

Each path control has the ability to apply rotation on two segments of the path. The path segments for a control are the two most adjacent segments to it, hereon referred to as "back" and "forward" segments. By default the two segments rotate as one element and the selected control is the center pivot point of that rotation. FIG. 7 and FIG. 8 shows the result of applying 60 degrees rotation on a path control on respectively, the rough polygonal display objects called proxies, and the exposed, non-polygonal, un-skinned mode showing only key elements, called bare Each of the segments lies between two neighboring path controls. Each segment can also be rotated separately using a "bezier handle". FIG. 10 shows how the bezier handles work independently. The back handle (on the left) is rotating 60 degrees while the right handle is rotating 30 degrees. Each segment can also be scaled either independently or together with its matching handle. FIG. 9 shows a 1.75 scale-up of a bezier_handle. The bezier rotation manipulation adds a novel aspect dimension to the prior art spline-ik. Now one can rotate control points rather than just translate them. Addition of sequential multiple bezier manipulators is believed to be novel here.

This is done as follows. Internally, in script (computer software), here is a single encompassing constraint:

char_constraint_viper_bezier_trn( ) hereon referred to as "main-bezier," is split into 2 calling functions instances constraints:

{ }_constraint_m_viper_bezier_path—hereon referred to as caller 1, handles all path bezier manipulators.

{ }_constraint_m_viper_bezier_trn—hereon referred to as caller 2, handle viper bezier manipulators.

In the present layered constraint list the two constraints are separated by other intermediate constraints, and execute at different times. These two constraints only use the main script encompassing constraint as a skeleton. They are in fact fused together within this constraint. When the first call happens to { }_constraint_m_viper_bezier_path, which in turn calls script actor "main-bezier", a decision is made whether "main-bezier" should be adapted to handle path bezier manipulators or viper bezier manipulators. The decision is based on the name of the caller function. So, "caller 1" will enforce "main-bezier" to behave for the path, and "caller 2" will enforce "main-bezier" to behave for the viper. This means that the constraint will use different input joints, controls, data structure objects, etc., for each of the two executions. In the first case the joints are path joints, in the second the joints, although still called the same, are viper_joints. Of course since the number of joints is different in each group, the looping mechanism throughout must take into account the varying number of joints. Yet because the logic of this constraint works the same way, there are only minor differences between the two operations.

Since the viper bezier manipulators have become thereby outdated, they are somewhat secondary. Calculating bezier on the viper joints is at times an unwanted behavior as the character bones (skeleton) constantly reposition themselves on the bezier curve no matter what control attribute or other constraint may be running. The viper bezier controls are intended to work off the path. Turning all the viper bezier controls at once or even just one, while having it travel through the path (which is also running bezier), may yield an undesirable behavior.

Also sequential bezier iterations operate better in an isolated mode, reducing the chance of disturbances that one iteration may inflict on the following one. For these reasons and for optimization purpose, the viper bezier controls are turned off by default. A bezier curve manipulation can only be activated by turning on "enable local rotation" on the two bordering "universal" controls which it is "fenced" by. This operation required a slightly different kind of implementation from the path hence to some degree works against the initial unified approach of the "main-bezier".

The Control Loop

The operation of the main logic and control loop of the "main-bezier" constraint is as follows: First, one is dealing with an animated curve. At each loop iteration which runs once for every "universal" viper or "path" control, one must update all the character/path joints (currently 120 for the viper or 240 for the path) to reflect the changes along the entire curve (or character's spine). These joints which in fact, part of the foundation building blocks, are similar in their structure to the body joints. Note that one path does not have bones (a skeleton) but uses similar pivoting joints. Since between every two controls there are in fact two different bezier curves, or one jointed dual bezier curve, we constantly update 26 different shapes of single bezier segments, or 12 dual segments and two single segments. Each is an independent unit with different timing and placement.

Essentially every dual bezier segment needs to have four joint matrices from which it will interpolate: these are always the joints at the start and end of the segment as well as the two control joints matrices which marks the peaks of the two bezier arcs of whose shape they control. To find these key four joints we must first find the closest "U" of a joint on the curve. One uses the world space translation vector of the nearby control ("universal" or "path") to derive that location. In the case of the path, if one did not have to occasionally re-construct the path, one could have based the key edge joints directly on the path control's matrices. However the path modification requires the slightly slower procedure of get_closest_point_and_tangent( ).

FIG. 14 shows a C like (psuedo-C) code excerpt demonstrating the engine in action. The engine is where the main operation take place. We notate m0 to m3 as the key joint indexes. Running the back bezier curve from m0 to m3 in fact performs the forward curve as well. That is, it will do this on the next round. Location m0 will become m3 and m3 will become m6. In any case it is highly optimized by not re-writing the matrices. Note the "flip-flopping" that happens here: notate m1 a forward control joint of m0 and m2 a backward control joint of m3 for the current loop iteration. The next iteration will try to over-ride m2 unless taken care of it. In the same token, unless at an edge control, the next m1 location is in fact the old m4 location so we pass forward the value from old m4_mx to new m1_mx. The next three "if" statements in FIG. 14 are the core logic of the "main bezier" constraint. What the bezier actually does here is: modify the type of the spline from here on, so if the type was clamped (the current default) one just destroys or ignores that shape when one modifies to bezier. This means that the longer the distances between neighboring controls, the more damage will occur. Since the only way to get the local rotation is using the bezier handles, there is no way around this, i.e., the construction path will look much better with short distances between path controls.

Controlling the shape of the bezier path arc is done at the local space of its control joint. Also the viper's bezier_trn controllers/markers get their mxs (locations) from the main joints set, not the other way around as in the Bezier_path case.

The rest of the "main bezier" constraint deals specifically with the independent operations of the Bezier handle such as rotating and scaling separately the arc that the handle(s) manage.

Finally a second pass of recreating the spline happens which is handled by char_constraint_viper_spline_ik_ calc_ctl_spline_fast( ) and char_constraint_viper_spline_ik_ calc_ctl_up_spline_fast( ) the corresponding up vector path continue to act as target orientation reference to these paths, but this time around, one rebuild the new path spline taking into account the bezier interpolations calculations. The result is that all the bezier transformations calculations are compounded to the ik control, so if a universal control rotated the body in a close proximity to an ik control, rotating (or translating) the ik control will add-in the body rotations in that area as well.

Once the new path was recreated, one can finish by placing the viper joints back on the path job, done by char_constraint_viper_spline_ik_place_jnts( ) which give the new matrices to which we need to set the joints.

In addition to the original path re-construction that happens here, secondary two uniform paths are also being created from the new two spline we created. The uniform curve is needed for path travel that works downstream later on. See below. This operation happens here:

uniform_mcc=MCC_get_uniform_resample_curve(mcc, num_path_segments);

uniform_up_mcc=MCC_get_uniform_resample_curve(up_mcc, num_path_segments);

In the future, speed considerations may provide a more optimized method to handle this.

Run-Lock Constraints

Introduction

The overall task of the "run-lock" constraint is to handle all the various anchoring, locking, and variable speed functions needed along the character's/object's body. The prior art has trouble achieving efficient locking, anchoring and speed varying control of spline based animation systems. The present "run-lock" presents a new approach and new tools to handle the different requirements.

The problem that "run-lock" solves is novel first because it allows consecutive, concurrent operations that may defer in their behavior from body segment to body segment. That is, while one portion of the character's/object's body may be asked to move slower or not at all, its closest neighboring body segments may be asked to continue to travel along the path with constant speed. This means that in order to keep the overall shape fluidity, there must be a good gradual shape transition between these segments, or the body rig will undesirably appear "broken". Acceleration and deceleration of adjacent controls can quickly become a visible conflict if not handled in the proper manner.

The present viper rig was constructed with an initial 14 total locking systems which corresponds to the total number of "universal" controls but with the understanding that this number is exemplary.

User Interface and Animation Functionality

Within the switches editor (see FIG. 16) as made available by the present system to the animator, there are control buttons available for keying, nail blending and other viper operations. All viper (character) related buttons within the switches editor have the prefix word "Viper." preceding. (For clarity in this disclosure this prefix is generally omitted.)

"key_start_nail"—an action button responsible for blend's first frame keying

"key_end_nail"—an action button responsible for blend's last frame keying

As a general rule "key_start_nail" and "key_end_nail" work in combination with the various mode buttons of the switches editor:

"WS"—an on/off button that sets world space locking mode "On" or "Off".

"NP"—an on/off button that sets nearest path control locking mode "On" or "Off".

"ML"—an on/off button that sets moving locks locking mode "On" or "Off".

Thus prior to clicking (activating by use of a mouse, etc.) one of the above action buttons on the computer screen, the animator should first click one of the locking modes buttons. Some mutual mode selection is possible, such as blending between NP-ML, However it is recommended to key the start and end nails one mode at a time.

In order for the "key_start_nail" and "key_end_nail" buttons to work, the animator must select the magnet (see 0110 for definition) which he intends to blend off. Otherwise the system has no idea which magnet was chosen for keying. If a magnet is shown in the overlays as selected yet its icon is not highlighted, it is not necessarily selected and will not be detected by the locking system. The animator should also deselect the nail once the keying operation is finished, otherwise accidental keying may occur.

See the "ws_nails" section below for detail on "ws_nail" keying.

DEFINITIONS

There are three main components in the locking/anchoring system:

Nails—mark and control the location in space of the actual "anchor" or "lock".

Magnets—tension control by blending the body segment's motion to the nail.

Shadow—a projected spline system of the viper onto the path.

There are currently three types of nails (indicated in the actual system on the computer screen by a traffic-light color coding scheme):

ws_nail—appear as red and handle segments locking to a specific location in World Space.

np_nail—appear as yellow and handle segments locking to the Nearest Path Control.

ml_nail—appear as green and handle segments locking to parametric u via Moving Locks.

"ws_nails"

The main advantage in using "ws_nail" is that the animator can choose the exact initial or final location in world space he wants to lock to. He can freely animate this location, i.e., directly animate the "ws_nail" location. One application of a "ws_nail" type is to achieve an inverse kinematics-like behavior along the body. In animation of the viper, concurrent slide and walk or run combinations on level ground as well as step-climbing on stairs are provided. A slowdown to a full stop of head and neck while the viper's body continues to coil along a path was also achieved. Many animation behaviors can be achieved using "ws_nail", e.g., anything from a skin twitch to a slowdown of a segment or speedup of a segment can be done.

For "ws_nail", "key_start_nail" will allow one to key the start position of the nail at the start of the blend as well as the "ws_anchor" attribute which is responsible for turning the nail On or Off. At Off position of the "ws_anchor" attribute, the nail is simply dragged around by its closest magnet. This functionality achieves the initial placement of the "ws_nail" before we key the blend. At On position of the "ws_anchor" attribute, "ws_nail" is activated and will pull the magnet toward it. The higher the blend value (the range is 0-100) the tension is increased. At the maximum value of 100, the magnet will reach a full stop and will be located where the "ws_nail" is. At the minimum value of 0, the nail has no affect on the magnet. For "ws_nail", "key_start_nail" also saves "pre-amble" keys on the previous frame to achieve a better default arc during the blend. (This behavior is not applicable for using "key_start_nail" on "ml_nails").

With regard to world space, "key_end_nail" is identical to "key_start_nail" except the preamble.

In general the "ws_nail" behavior has highest precedence and will override any other animation on the body. If "ws_nail" is parented to an object in the animation or another character, it will be locked to the space of the object.

"ws_nail" is animatable only when it is activated via its "ws_anchor" attribute. Its attributes can be selected from the related magnet's attributes or directly by picking up the nail and animating its translation and rotation channels. One turns "simple_spline" mode on before using the first single "ws_nail". One has "ws_nail" set at 1 throughout all blend frames to obtain a proper blend.

Since "ws_nails" are animatable on translation (rotation has not yet been exposed) there is no real need for a blend, since one can always animate the "ws_nail" position from origin to target to mimic a blend. But if a blend is required, one approach to set world space blend-locking with "ws_nails" is the following:

Step 1. Select magnet. Set the initial blend by turning "local_path_lock_to_ws" to 100 in both sides of blend. ("key_start_nail" & "key_end_nail" will not work otherwise.)

Step 2. While magnet is still selected, and you are on the end blend frame, turn "WS" on, key the position of the "ws_nail" using "key_end_nail". Notice "ws_anchor" value was changed to 1. Animate the nail position to your preferred new location.

Step 3. Repeat step 2 at the first blend frame. This time use "key_start_nail". Check "ws_nail" x, y, z translation curves. Are they ok?

Step 4. Adjust "local_path_lock_to_ws" value at the start of blend to 0 or any other value.

If needed, adjust also the tension value of "local_path_lock_to_ws" on end frame. "ws_nails" are visualized on screen for the animator with red cones (icons). Since the translation animation of the "ws_nail" is independent and happens regardless of the locked magnet current location, the nail may appear as animating freely in world space. This type of behavior is particularly helpful in identifying the destination of the magnet since typically the nail is moving ahead of the nail when blend tension in not yet set to its maximum of 100% locking. It also means that the animator may prefer to first set the entire animation of the nail traveling or fixed to some location, before "adding any blend into the mix". An initial value such as 0.01 on "local_path_lock_to_ws" will suffice to get the "ws_nail" animation going. The animator may select the red cone (currently only visible with "DP_draw") and animate it directly. Since the snake is not dragged with the "ws_nail", this technique is also slightly faster. FIGS. 23-26 show sequentially the key frames of a "ws_nail" blend.

If one turns on "draw_spline" attribute, an irregularity appears, that the "ws_nail" starts by pulling a very narrow area of the spline (or joints). As the blend's tension increases, the pull will spread out more, and will look smoother and more accurate. Since internally "local_path_lock_to_ws" also handles a blend between two types of curve, this behavior is unavoidable. It is easily corrected by animating the individual joints which have too much pull to them. FIGS. 27-30 show how this correction is done in a sequence of key frames.

However, to minimize it or prevent it entirely, one may keep "local_path_lock_to_ws" to a higher or maximum value while letting the animation of the "ws_nail" take over the main blend work. That means, that the animated position of the "ws_nail" should reflect the intended movement of the magnet. It is in fact permissible for "local_path_lock_to_ws" to be at its maximum value of 100 throughout the entire blend, so the real attribute blending occurs before the "ws_nail" was translated off the path. Optionally specialized smoothing or relaxing algorithms may be applied to handle the tension.

"np_nails"

The concept behind "np_nails" is that since the path is animatable, and since the path controls already give by default the simple spline ik desired behavior, one can connect the viper body segment to the nearest path control and let the path itself shape the viper's body. By attaching the viper's body to the path, one is using the path as a pose for the body of the character.

The nearest path (points) nails or "np_nails" are similar in functionality to the world space nails "ws_nails" but vary in two major respects: First the location of the nail is typically the nearest by path control, although selecting other path controls is possible too. Second, rather than animating the nail, one animates the path control. In reality the nail is constrained to the path control and is merely a slave instead of a master.

If magnets 9 and 10 are set to maximum locking of 100 via "local_path_lock_to_np" translating a path control somewhere behind it (i.e., between control 0-9 where control 0 is the tail control) will cause all magnets from 0-9 and 10-13 to slide just as they would if there were no locks at all. The only viper body area that will not have any sliding motion is the area between magnets 9-10. The magnets between 10-13 will gradually compress against magnet 10 as we add more translation to, e.g., path control 5. The tension between the head (magnet 13) and magnet 10 will be decreased. At the same time, all magnets between path control 5 magnet 9 will pull away as the tension is increased. The animator has total freedom in choosing which and how many magnets are locked or not. What makes the "np_nails" mechanism is even more powerful because the magnets do not have to be locked at their maximum value of 100. At all times a magnet can use some percentage of blend value, where the blend is the amount of tension between the magnets and the path controls. This means that the animator can smoothly blend in and out from body segment which may all move at alternating speed. If the previously locked 9-10 magnets had a "local_path_lock_to_np" blend value of, e.g., 50, rather than a full lock to control, we will get a body portion which is 50% slower than the rest of the viper. Such acceleration and deceleration is optimum to achieve a variety of behaviors, from skin twitching to showing anticipation on a segment.

Controlling "np_nails" via translation on the path may seem more complex. One must pay close attention to which nearest path control the magnets are locking throughout the animation. If a magnet is in motion between frame x and frame y while "local_path_lock_to_np">0, it must be locked to the same control between and including animation frames x-y. Every magnet has an attribute and a curve which is purposely dedicated to the indexing of the path control. The attribute "closest_path_ctl_pt_ndx" represents an integer number that corresponds to the nearest path control. If the nearest path control that the magnet is currently bound to is far away and overlaps other magnets, the rig will appear broken because joints will cross each other. The animator however has total control of easily adjusting the index values. The indexes always are sequential through all the active path controls starting at 0, so it is easy to count and find out what is the index of the nearest path control and adjust the index value of "closest_path_ctl_pt_ndx" on the current frame. This is easily done in the spreadsheet editor (see below).

There is also a short-cut method to set the indexes sequentially in a chronological order stepping down from the head magnet toward the tail. (See the NP-NO-NP Procedure below.)

One may use "key_all_nails" when "NP" mode is selected and the system will attempt to automatically find the nearest path control, but setting "np_nails" manually is safer than using "key_all_nails", since there is less chance to "miss" a path control. A good approach to animate "np_nails" blends is to set "local_path_lock_to_np" manually on the last magnet first. Typically in a complex sequence animated blend such as NP-ML-NP, (nearest-path-point, moving-locks, nearest-path-point) although other methods are possible as well, one may do the following:

Step 1. Set the "local_path_lock_to_np" blend on last magnet ("viper_path_anchor13") at the start and end frames of the blend. (0-100 or 100-0)

Step 2. If necessary, adjust the index of the last magnet using "closest_path_ctl_pt_ndx". This step may precede step 1, if you can successfully "predict" the intended path control. Make sure there is a consistent same integer index value throughout the blend. (Which is likely to be 13 if one has not translated along the path yet.)

Step 3. If traveling along the path using ML moving-locks and "magnets_offset":
  a. select the last magnet.
  b. set the mode to NP in the switches editor.
  c. key using "key_start_nail" or "key_end nail" while "NP" mode is on. (See the next section "ml_nails" for detail.)
  d. repeat a,b,c for the first magnet as well ("viper_path_anchor0").

Step 4. Finish by keying all the "np_nails"; adjust the slider to 0 or 100 depending if the frame is a start or end frame of the blend. Then apply "key_all_nails". Using "key_all_nails", is a short cut that allows one to avoid having to key each nail individually. The system may provide a set of control buttons to allow the animator to easily key just a subset of all the nails.

Figure 15:
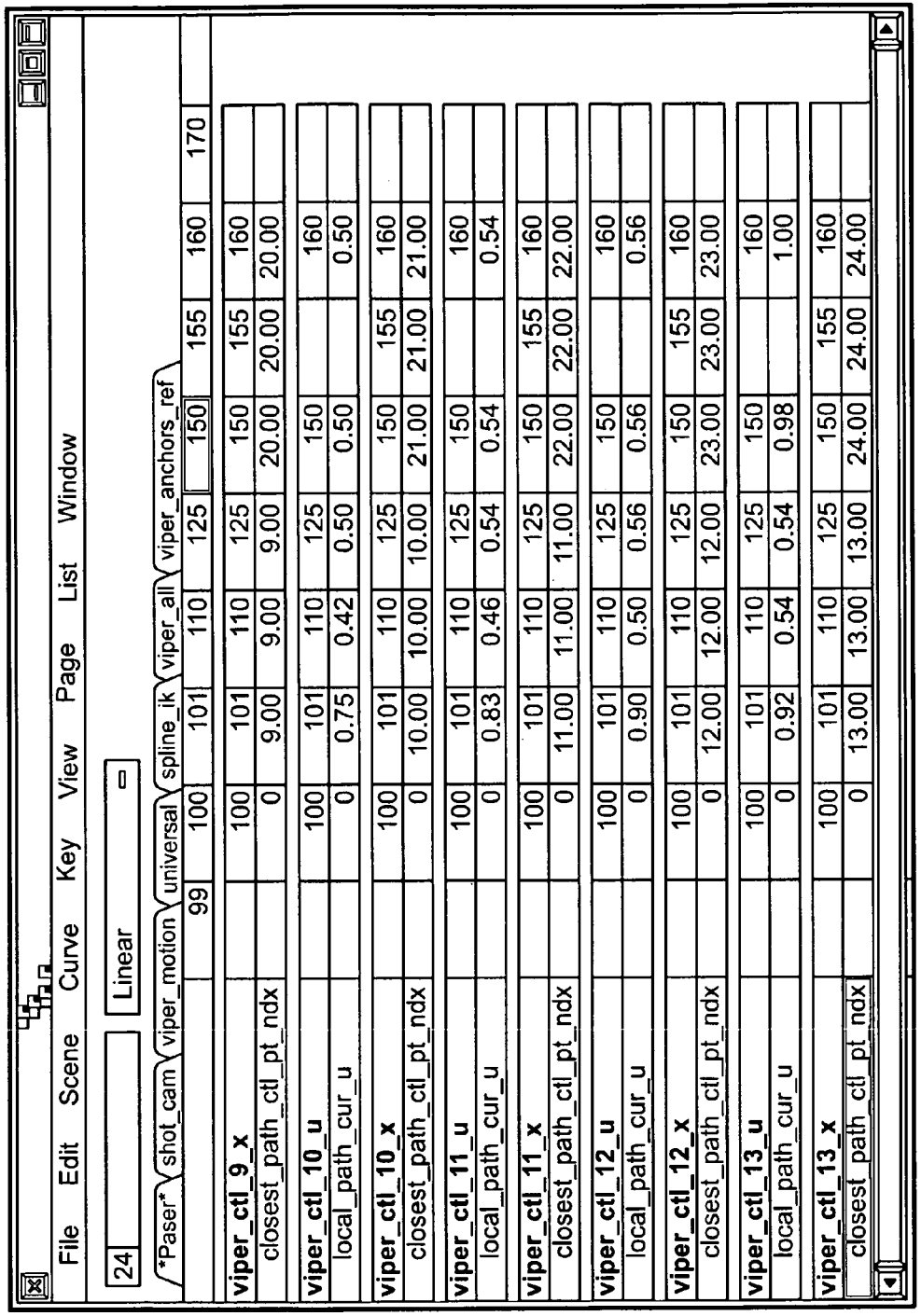
FIG. 15 shows use of the Spreadsheet Editor for an NP-ML-NP sequence with regards to "closest_path_ctl_pt_ndx".

Step 5. If some segments seem off place, check "closest_path_ctl_pt_ndx" for all. Using the spreadsheet editor, adjust back from the last magnet's attribute, so if "closest_path_ctl_pt_ndx" for magnet 13 was set at 24, modify the values going backward from 12 to 0 and subtract 1 each time: 23, 22, 21 . . . (The spreadsheet editor of FIG. 15 is a control screen provided to the animator to select values/parameters as shown.) Alternatively, Step 5 could occur before Step 4, to prevent unwanted "kinks". FIG. 15 shows an NP-ML-NP sequence in the spreadsheet editor control screen with regards to "closest_path_ctl_pt_ndx".

"local_magnet_location"

"np_nails" works well with the attribute and curve "local_magnet_location". This attribute allows the animator to slide the magnet along the path. The sliding or adjusting of the "U" location of the magnet works between the two nearest neighboring magnets. As one approaches one of these neighbors, the joints distances between this magnet and the moving magnet will compress more and more, while at the same time will spread out between the other neighboring magnet and the moving one. "local_magnet_location" is useful in a situation where one may want to establish which will be the nearest path control. Simply relocating a magnet slightly beyond the 50% distance between two neighboring path controls, will make sure one is addressing the intended nearby path control once one has turn on "np_nail" for that magnet. "local_magnet_location" will work even if "local_path_lock_to_np" is already on, but they become less effective as the value of "local_path_lock_to_np" approaches 100 in the overlays.

"local_magnet_location" will yield a good sliding behavior at lower values of "local_path_lock_to_np" such as 0-75, but will appear as "jumping" the intermediate magnet between the neighboring magnets between 75-100. This is because the higher "local_path_lock_to_np" is, the closest the magnet is to the nearest path control and thus the less distance "local_magnet_location" can travel before it reaches its point of no return where the nearest path control suddenly changes from one to the next neighbor. In that regard the magnet's "U" location on the path between the neighbors is a summation or a product of the combined "local_magnet_location" and "local_path_lock_to_np", although their function is different.

It is easy to identify the nearest path point with the on-screen yellow cone icons of the "np_nail". (Similar to the above red cones.) If moving the location has caused the nearest point to change, the yellow cone icon will jump to the new nearest path control. (And if that control is already used for another magnet which is locking to it, these yellow cones will appear as one.)

Figure 17:
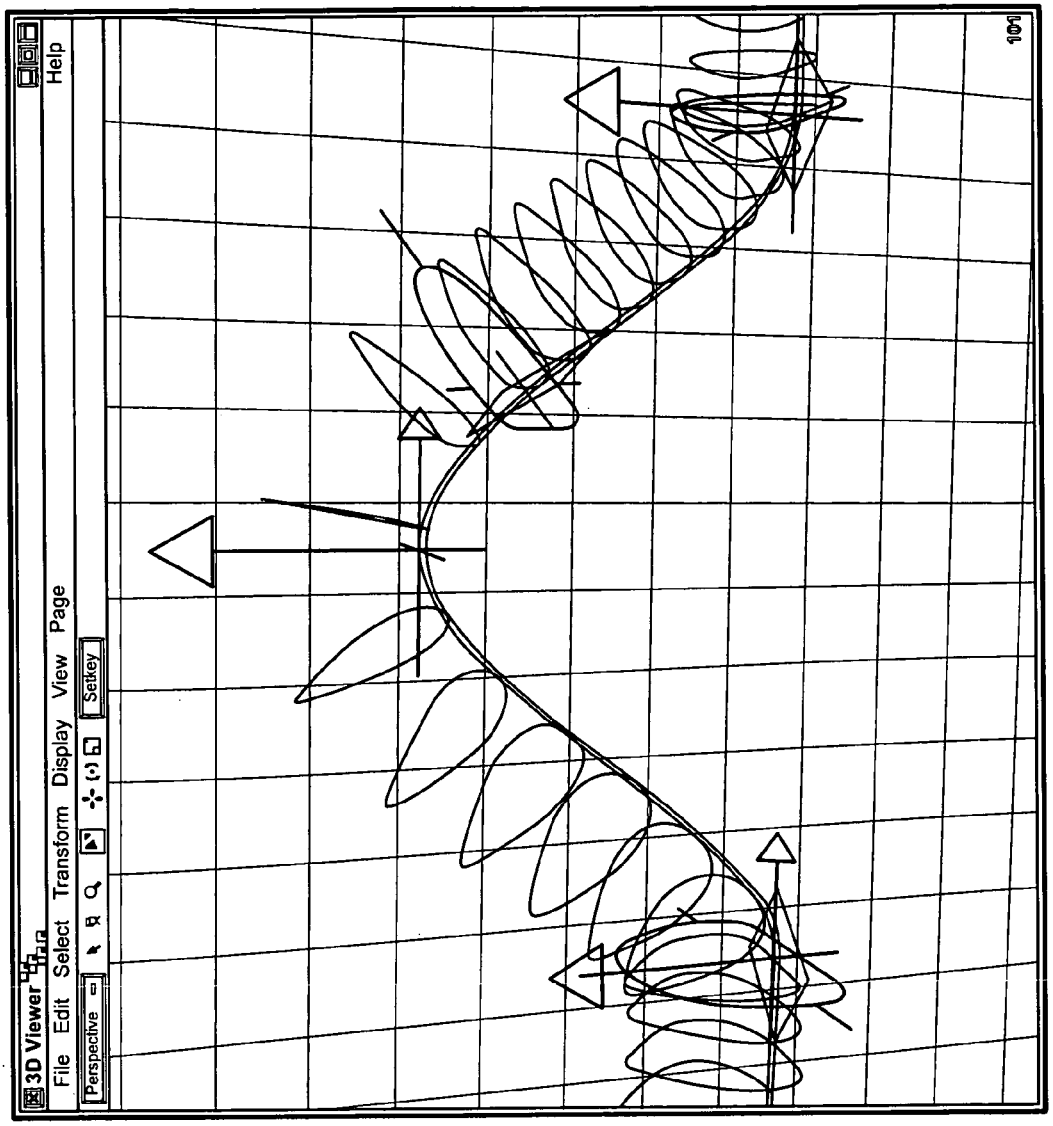
FIG. 17 shows magnet locked (or unlocked) at "local_path_lock_to_np" at 0.
Figure 18:
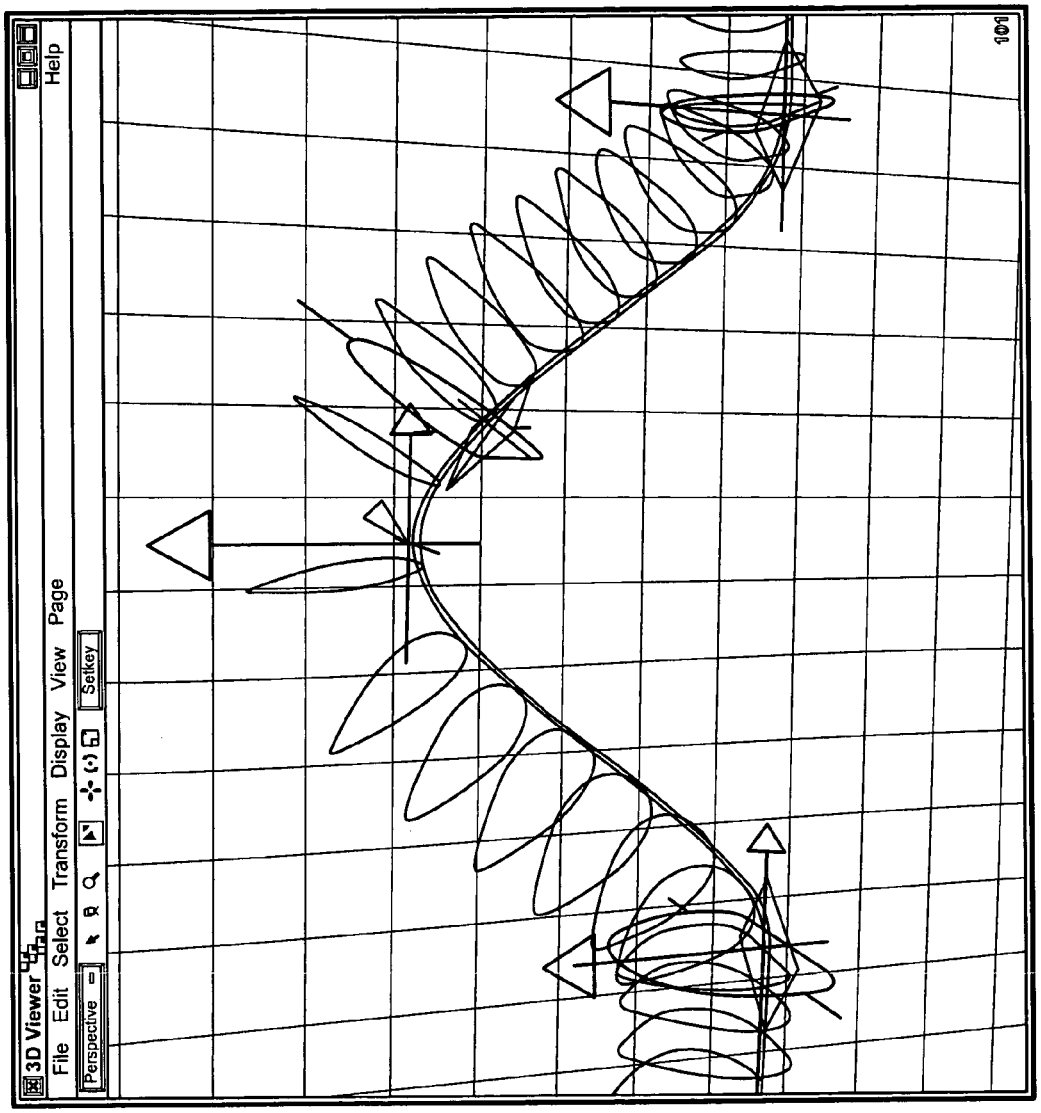
FIG. 18 shows magnet locked at 30, and "local_magnet_location" is still at default 75.
Figure 19:
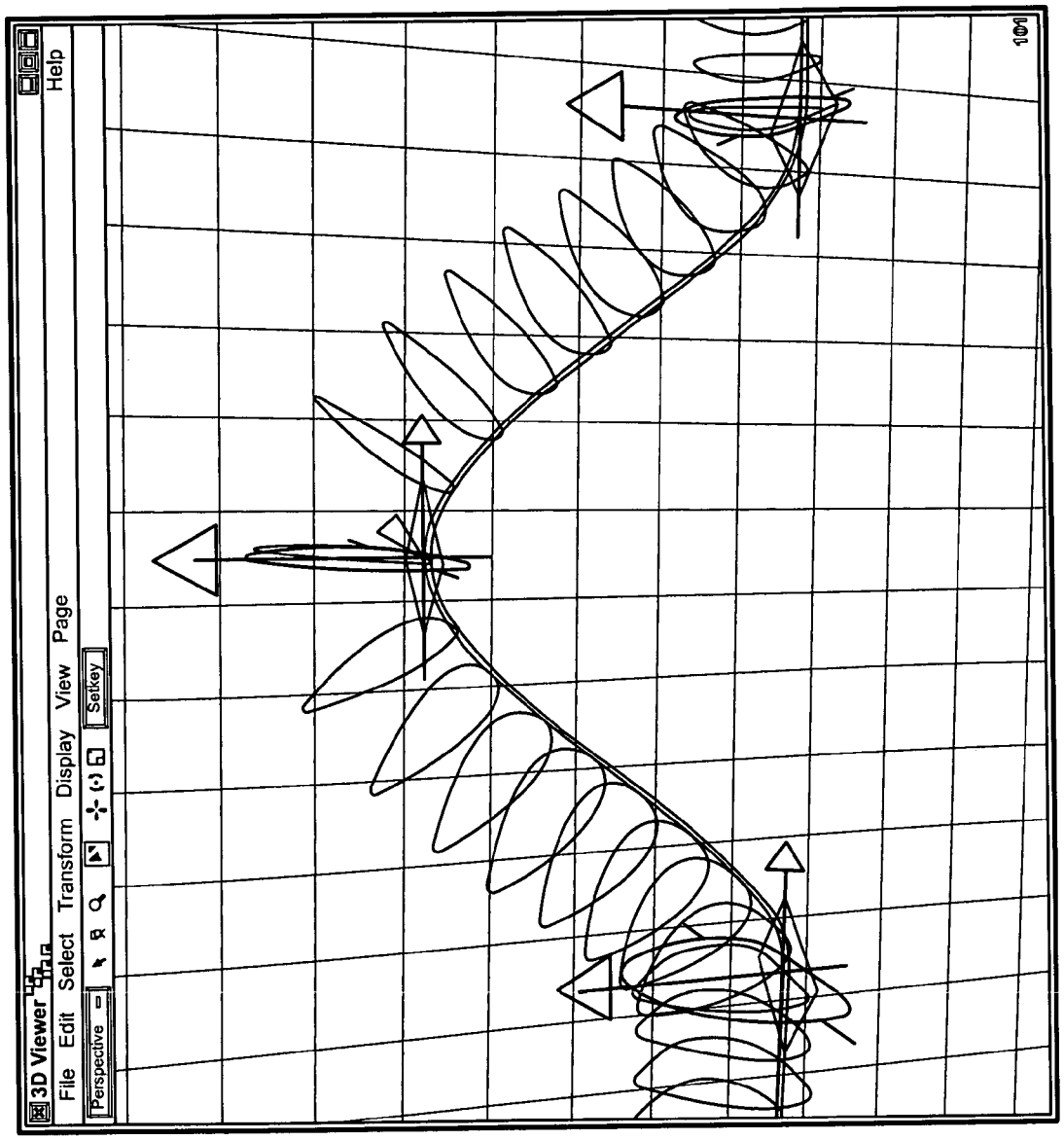
FIG. 19 shows magnet locked at 100.
Figure 20:
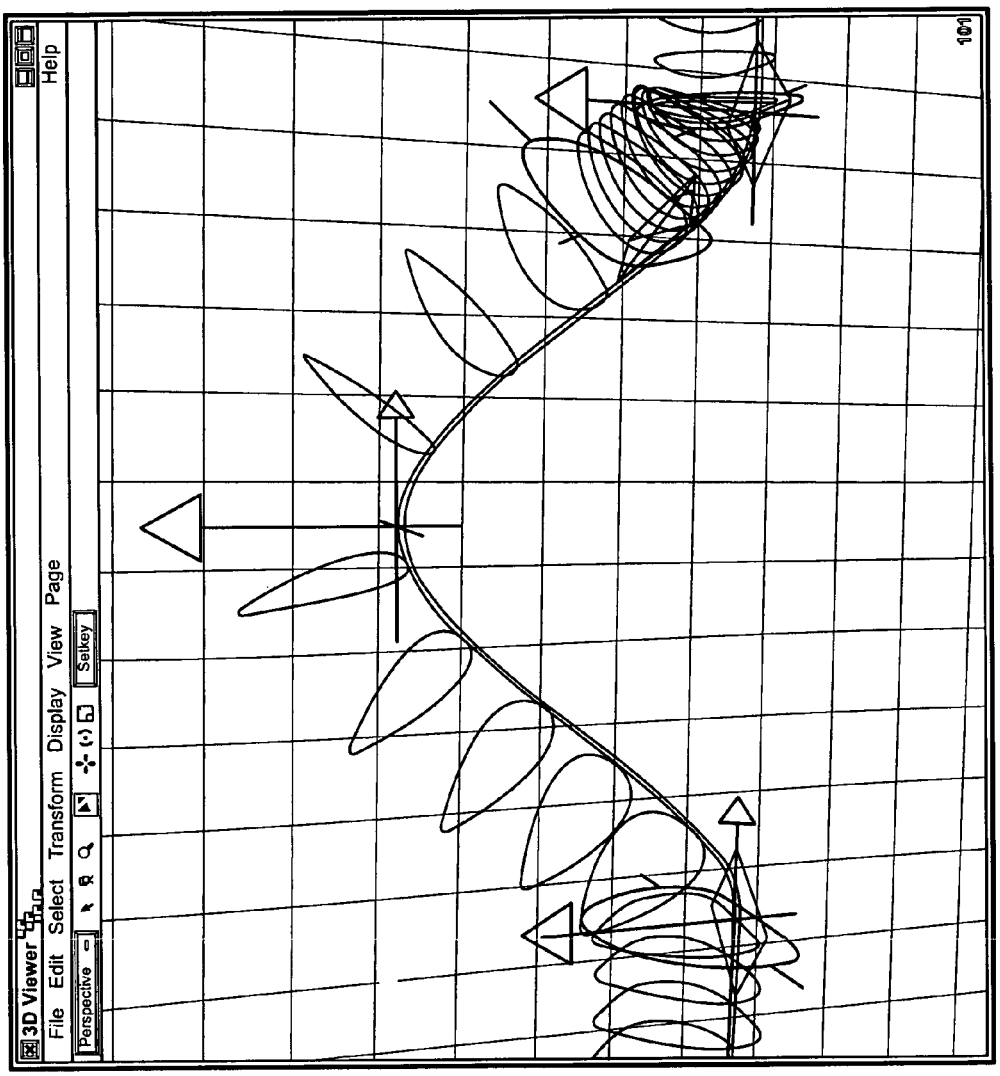
FIG. 20 shows magnet locked at 30, with additional slight location change to 76.
Figure 21:
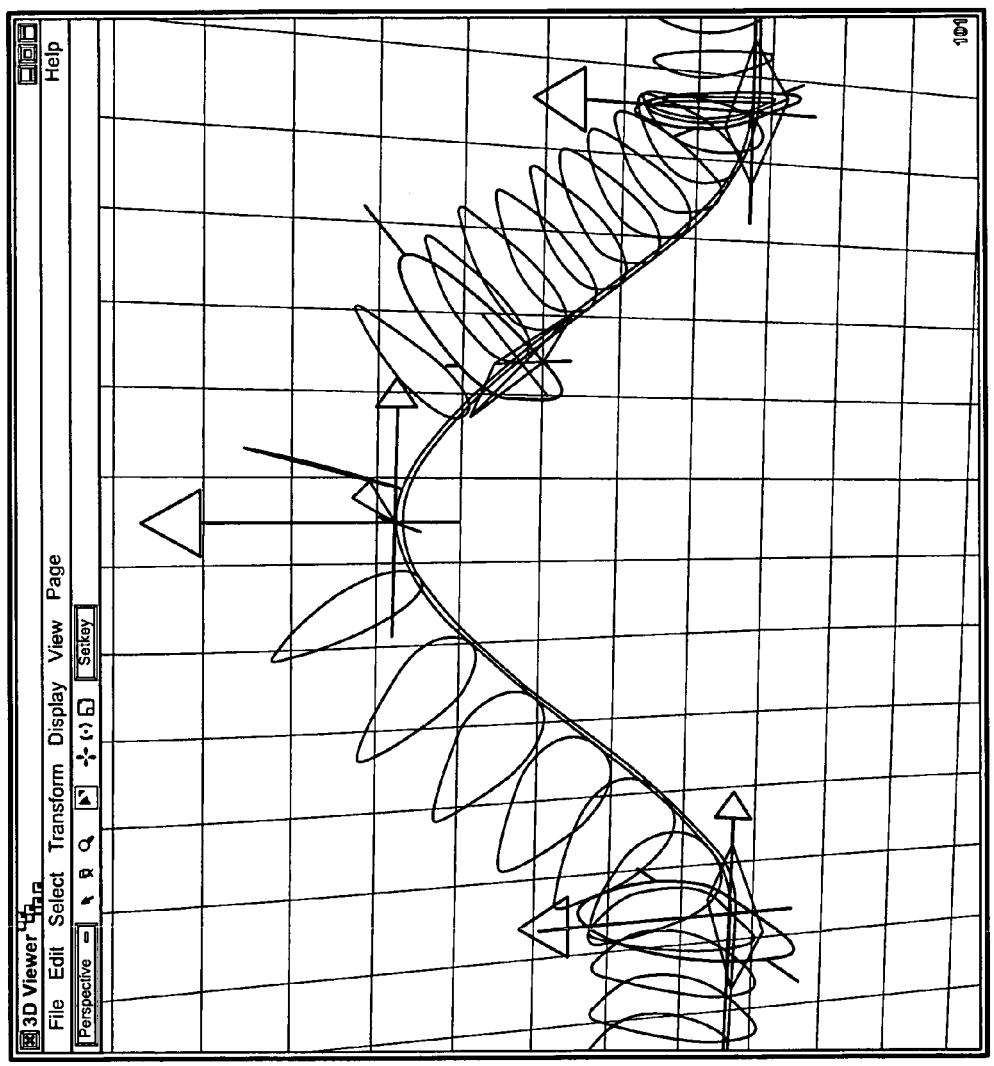
FIG. 21 shows magnet locked at 10 and location of 75.4.
Figure 22:
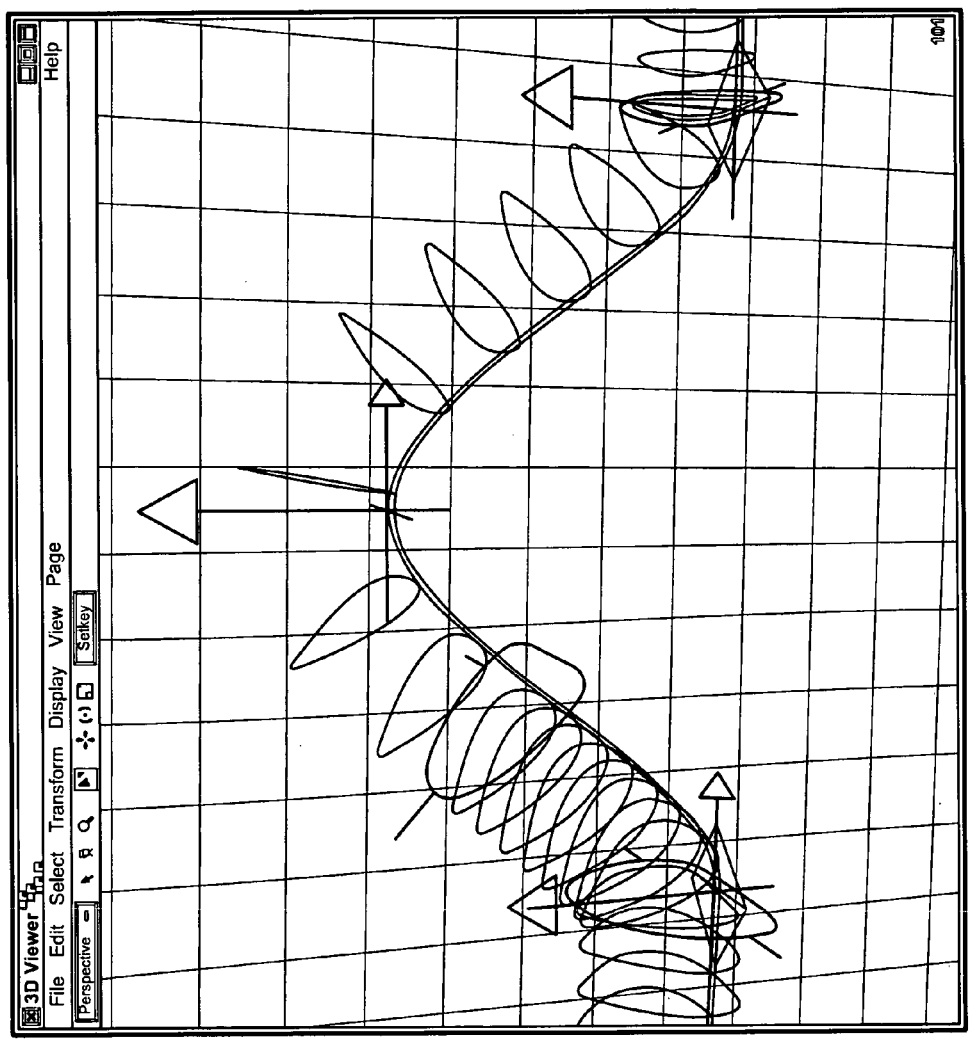
FIG. 22 shows magnet locked at 10 with location of 68.4.
Figure 23:
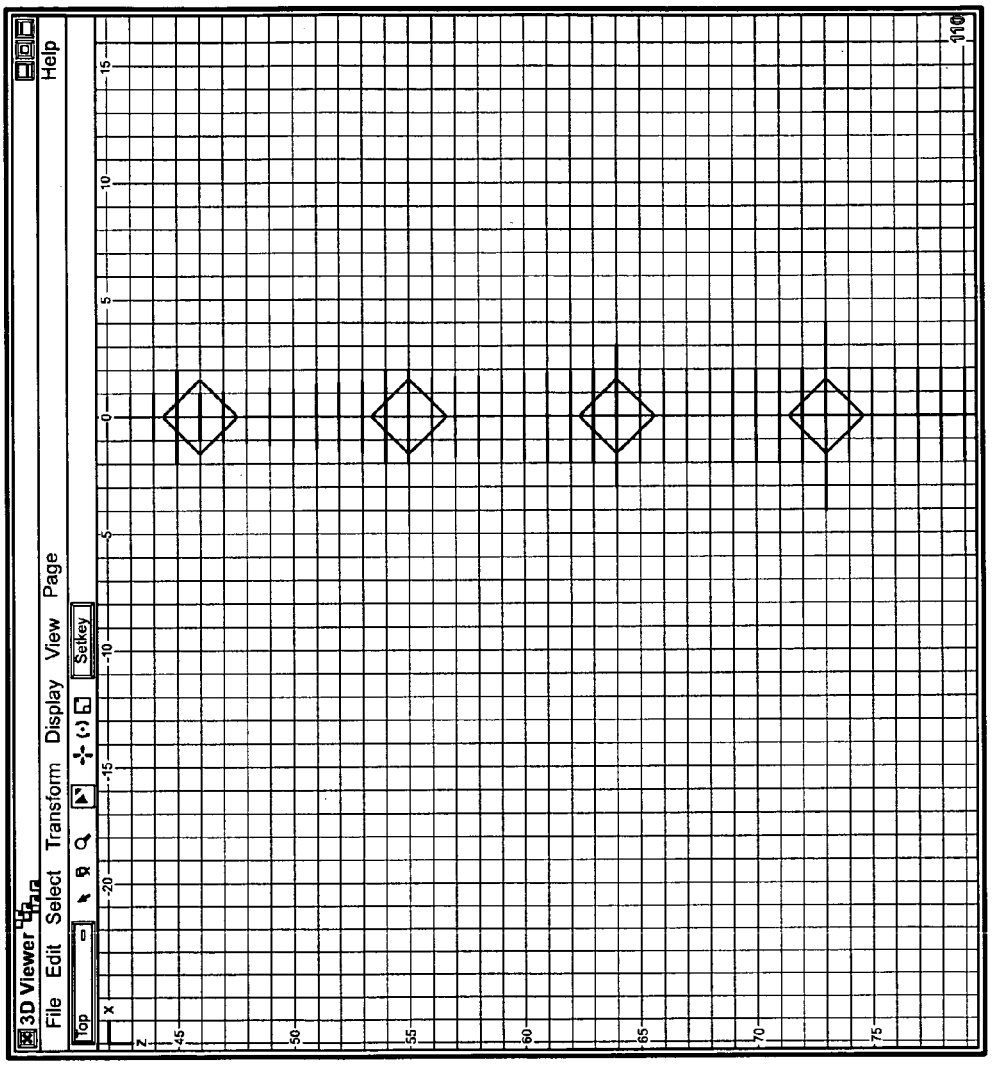
FIG. 23 shows the first key frame of a "ws_nail" blend.
Figure 24:
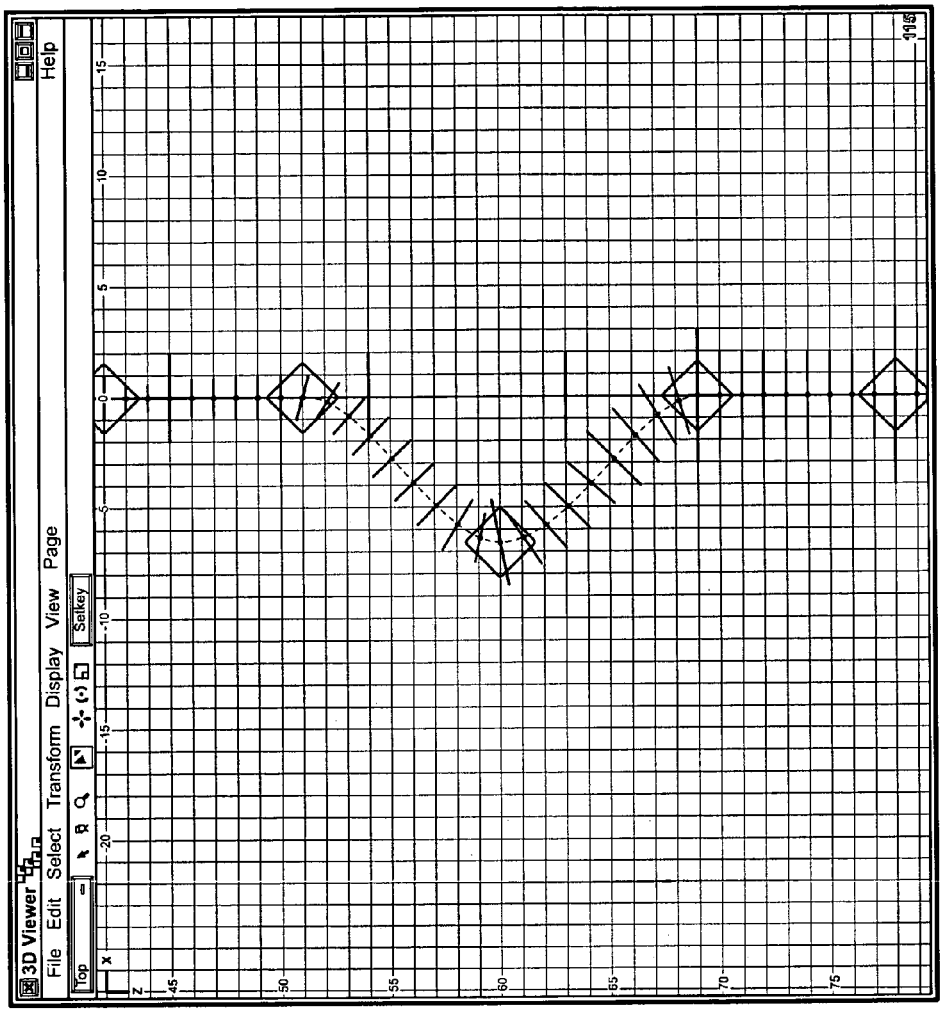
FIG. 24 shows the second key frame of a "ws_nail" blend.
Figure 25:
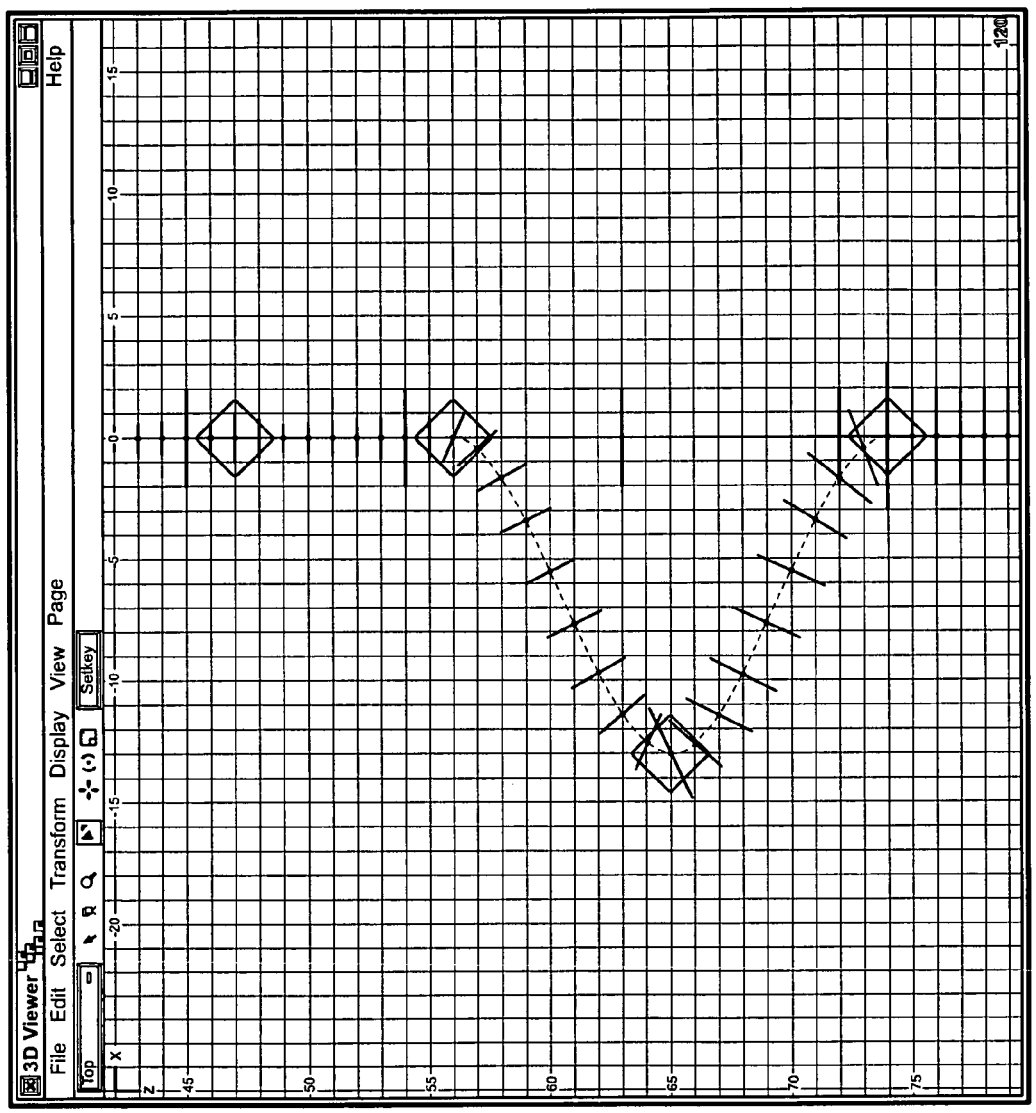
FIG. 25 shows the third key frame of a "ws_nail" blend.
Figure 26:
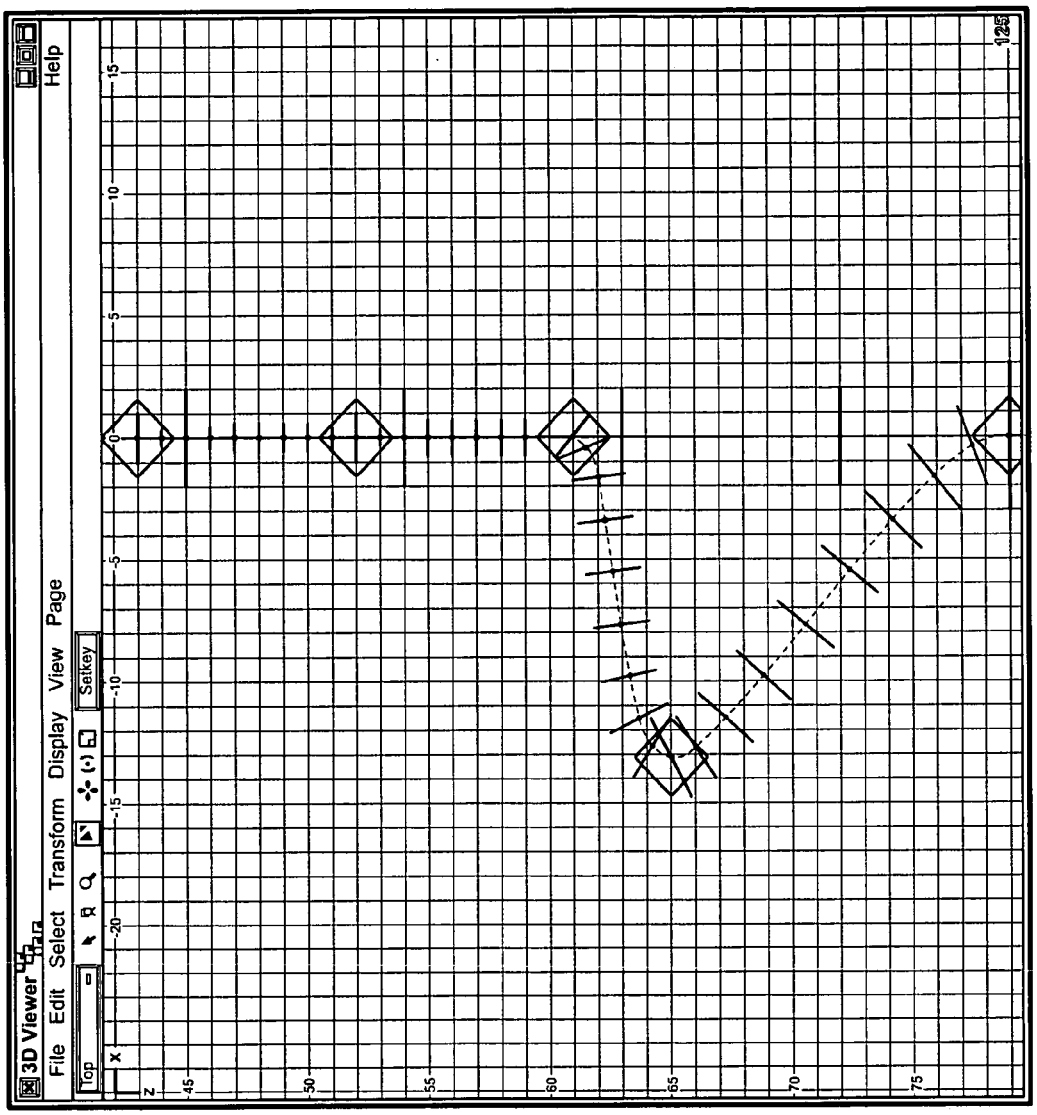
FIG. 26 shows the last key frame of a "ws_nail" blend.
Figure 27:
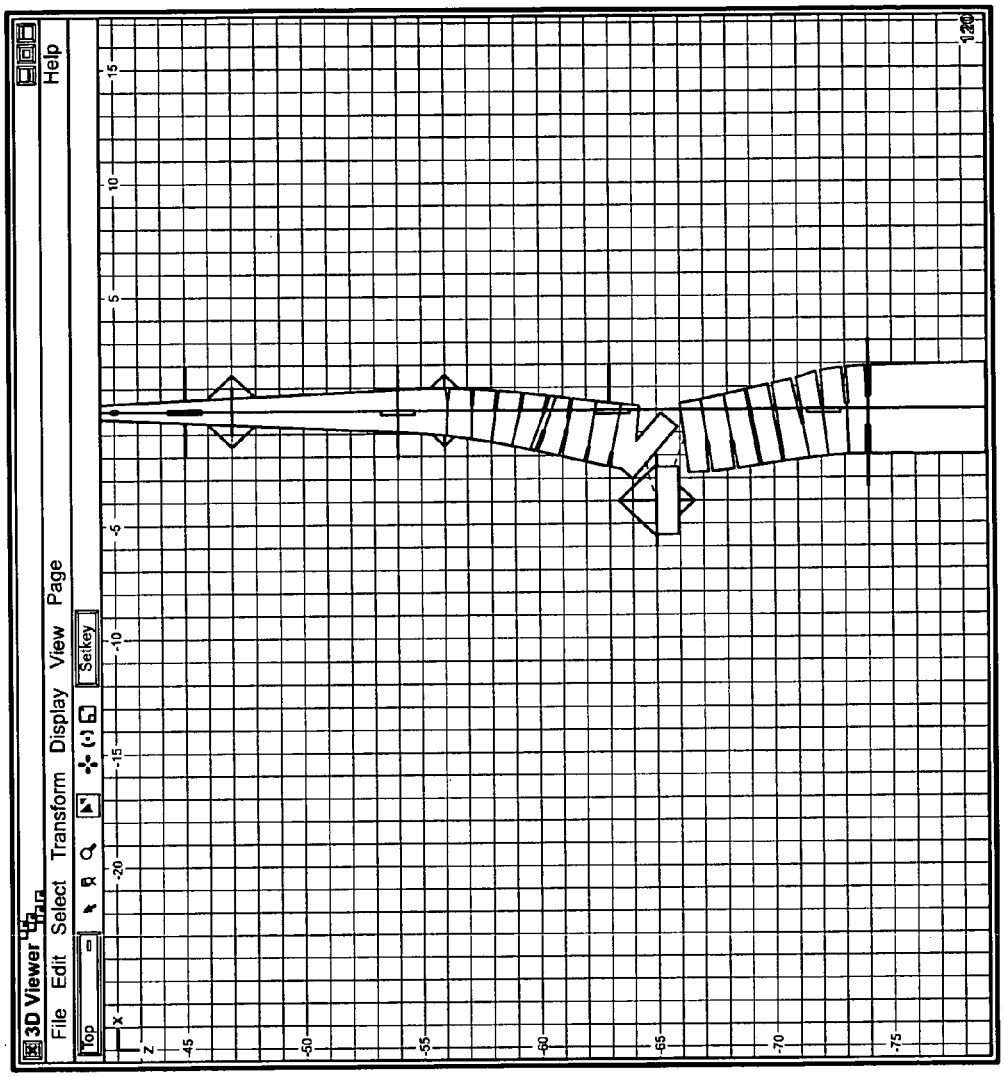
FIG. 27 shows the first key frame of a before corrected "ws_nail" blend.
Figure 28:
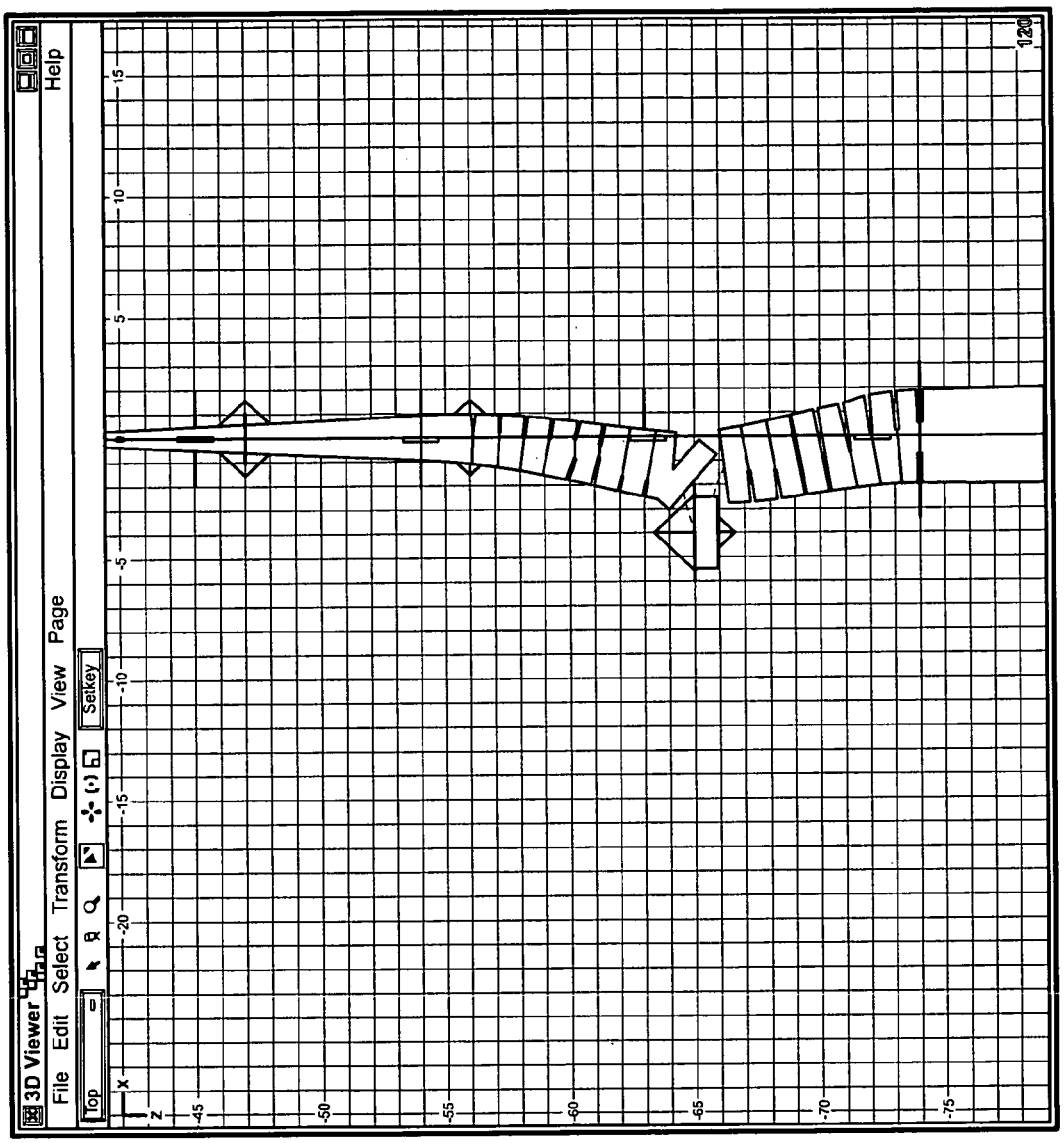
FIG. 28 shows the second key frame of a before corrected "ws_nail" blend.
Figure 29:
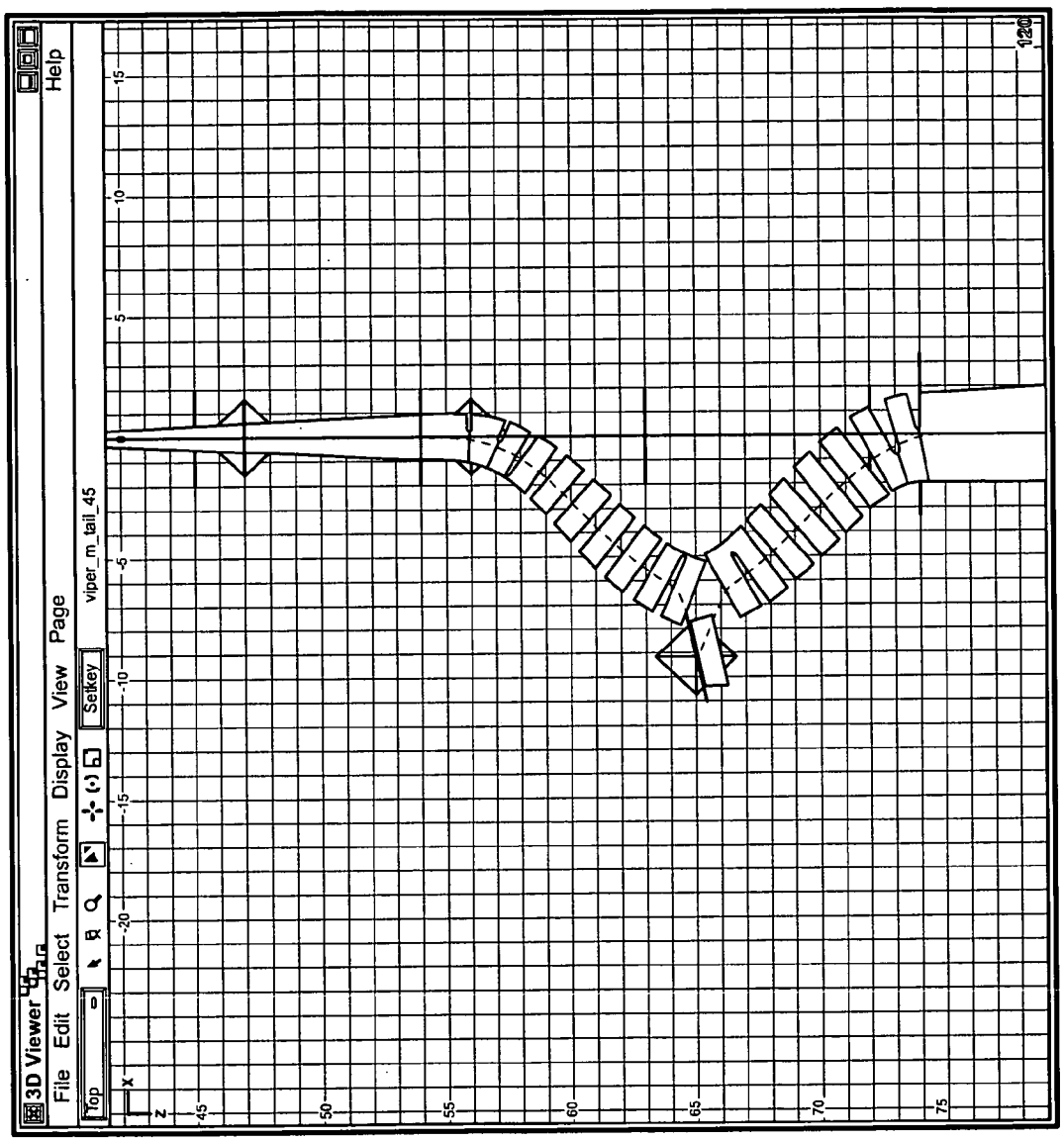
FIG. 29 shows the third key frame of a before corrected "ws_nail" blend.
Figure 30:
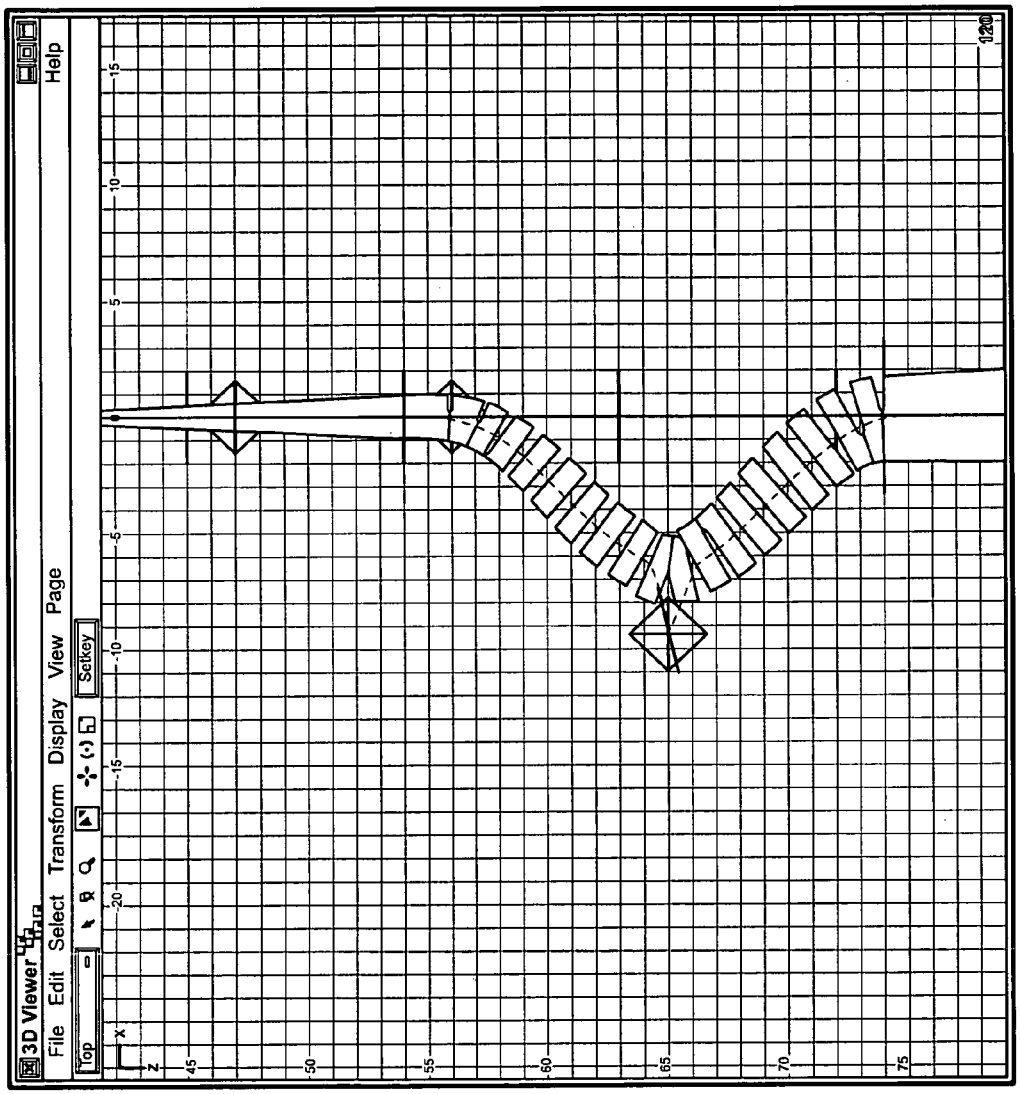
FIG. 30 shows the last key frame of a after corrected "ws_nail" blend.

FIGS. 17-21 show different np_nail variations: FIG. 17 shows magnet locked (or unlocked) at "local_path_lock_to_np" at 0. FIG. 18 shows magnet locked at 30, and "local_magnet_location" is still at default 75. FIG. 19 shows magnet locked at 100. FIG. 20 shows magnet locked at 30, with additional slight location change to 76. FIG. 21 shows magnet locked at 10 and location of 75.4. FIG. 22 shows magnet locked at 10 with location at 68.4.

NP-NO-NP Procedure

A. Setting the First Pose
1. Make sure the values are filled at the first animation frame (101) (for all tracks of curve m_path).
2. Add all path controls needed through the blend between the poses at the first frame of animation (101), this step can be done later also, but doing it before the animation start is preferred.
   a. use key_path to save the latest pose.
   b. use edit_path to read it within the curve ediot.
   c. modify controls as one wishes in the curve ediot.
   d. save the new path to the computer system's disk drive using the curve ediot save button.
   e. read the new path in the 3D viewer.
3. One must re-key the path ("key_path") after any path length changes.
4. While the body is leveled as possible, set the nails mode to NP, set the blend slider to 100, and then "key_all_nails". (Keep NP mode on throughout the entire procedure.)
5. Using all the relevant path controls (all having yellow nails) pose the viper using the path controls translation and rotation curves. Keep draw_path, draw_up_path for path visualization, draw_spline, draw_up_spline for the viper spline visualization.
6. Advance to the end pose frame and while NP is still on and the blend slider is at 0, "key_all_nails".
7. This procedure attempts to set the correct ratio between path_length and viper_length during keying operations. If the viper head position is not exactly where desired for animation, one may adjust it manually using "viper_length" under "m_all".

B. Setting Your Next Pose
1. Animate "body_travel" to move the viper to the next pose as preparation for locking.
2. Adjust relevant path controls (or magnets locations) making sure each magnet is near a logical path control.
3. If a magnet is not where expected or the character's bones look wrong, then use "nearest_path_ctl_number" to adjust to the numbers based on the numbers seen if one toggles on path labels in the Switches Editor. Each magnet should have the same numbers throughout the blend. The keys are integers and are not blendable. There is a method to set all the indices in a step-down sequence starting at the head:
   a. Slide the viper so that its head will be in closest possible proximity to the path control desired.
   b. Set the (temporary) two "points" buttons and NP button to "On".
   c. Key_all_nail.
4. Advance to the end frame of the blend for this pose. Set blend slider to 100, then "key_all_nails".
5. Go back to the first frame of the blend for this pose. Set blend slider to 0, then "key_all_nails".
   To ensure identical indices throughout a blend, this important step will attempt to copy all the indexes from the nearest keyed frame rather than looking for a new nearest neighbor for each magnet. This step also will revert from any irregularities on the body.

C. Adjustments and Animation
1. Check viper_length under m_all. When the viper is locked to the path and one is moving path controls, one is stretching the viper and modifying the length. At the same time one is also stretching the path. Use "key_path" in the switches editor to key the new path length. Check the 3D viewer or the curve for any length changes. One can adjust the lengths by animating the viper_length curve. path_length is not animatable but is adjustable.
2. After adjusting the body_travel animation curve to create an ease-in ease-out in the blend areas, one may need to key_all_nails again at the frames set at 0 earlier. (I.e., end blend of first pose, start blend of next pose. blend slider should be at 0.)
3. Although it should be kept to minimum at this point, if one is animating body_travel during a blend, use the magnets location to adjust the magnets and the bones. The magnets may "fall-off" the path. Try keeping them as close as possible to the path.
4. If one adds more path controls after keying the blends, one should key it again to re-index.

"ml_nails"

Moving locks nails or "ml_nails" is different yet related. "ml_nails" are not intended to lock the body to any fixed location but rather to control the rate of speed the segment will move along the path. Behind this is the concept that if the viper is sliding along the path and a path control will be animated as the viper pass through it, if the viper's body is not currently locked to the path control, the side effect is to pull the viper back making it look as if the front body area is moving backward. If the viper's body segment is locked to the path control, a stretch will occur throughout the body. These undesirable motion behaviors are solved with "ml_nails". In reality, "ml_nails" will have some locking-to-position ability with the body segments if and only if, the viper's placement on the path is at the end of the path. If the head is not near the end of the path, and one translates a path control somewhere along the path, this offset will be translated to a gradual stretch from the tail. It will appear as if the viper is locked in front of the moving path control and unlocked in the back of it. As a workaround, the animator may move/collapse any extra controls in front of the snake during animation. Minor corrections on the "U" may also be achieved by directly animating the nails (which indirectly will slide the magnets, and thus do what the currently locked magnets_location usually does.)

A typical use of "ml_nails" is locking the last body segment (which is called "head") and the first body segment (which is called "tail"), to "ml_nails" to keep the head and tail moving in constant speed while the rest of the body might be stretched. Using intermediate "ml_nail" is particularly useful to localize the amount of stretch happening over a segment. Of course if one is interested in having a stretch only on one segment somewhere in the middle of the body, all "ml_nails" except the two bordering ones will have to be locked.

In essence "ml_nails" turns the viper to a stretched rig with variable length depending on the amount of influence from the path controls, instead of its default fixed length rig. This effect can become quite dramatic as shape changes along the body are absorbed or swallowed by the rig.

For ML, executing Step 3c from the previous section, means one will set a "U" value on the "local_path_cur_u" attribute (and animation curve) for the current "ml_nail". This value must be right to get a smooth blend of the magnet. If the position of the magnet was determined by an "np_nail" which forced it to some location, the new position of the magnet might be out-of-sync. See NP-ML-NP procedure, Step 5 to correct this manually.

Figure 31:
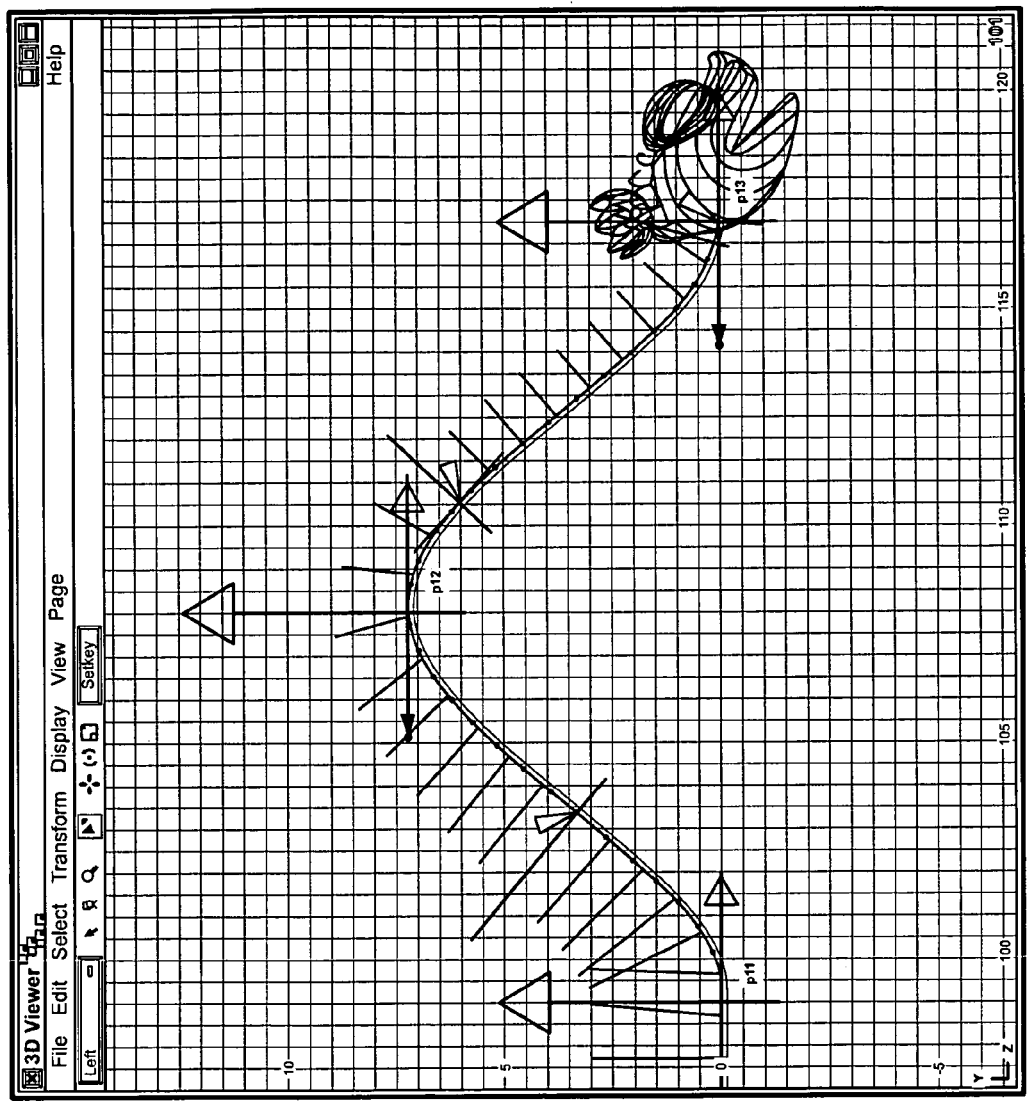
FIG. 31 shows only neck ml_nails locked and the neck stretch that happened as a result.
Figure 32:
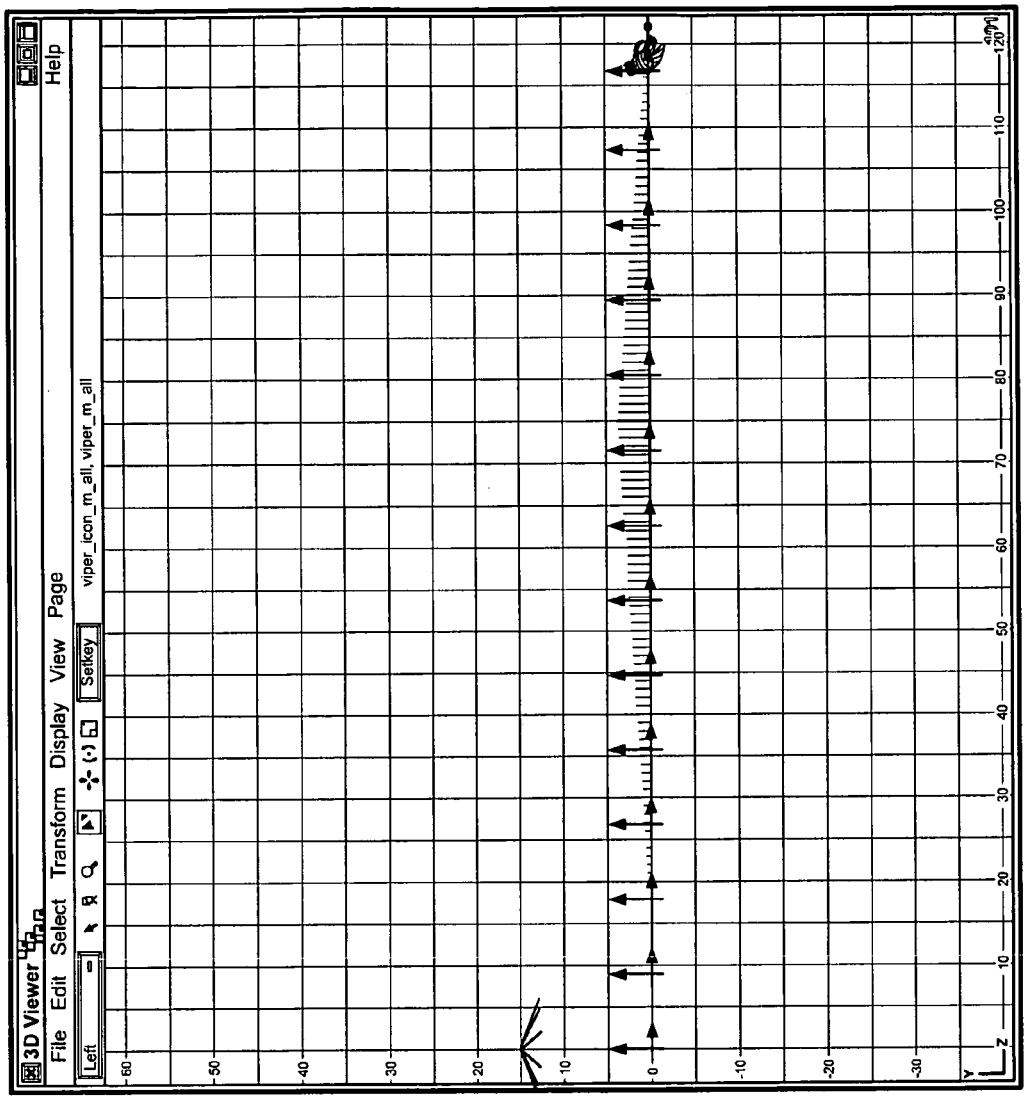
FIG. 32 shows all the ml_nails locked as the viper rig is at its rest pose.
Figure 33:
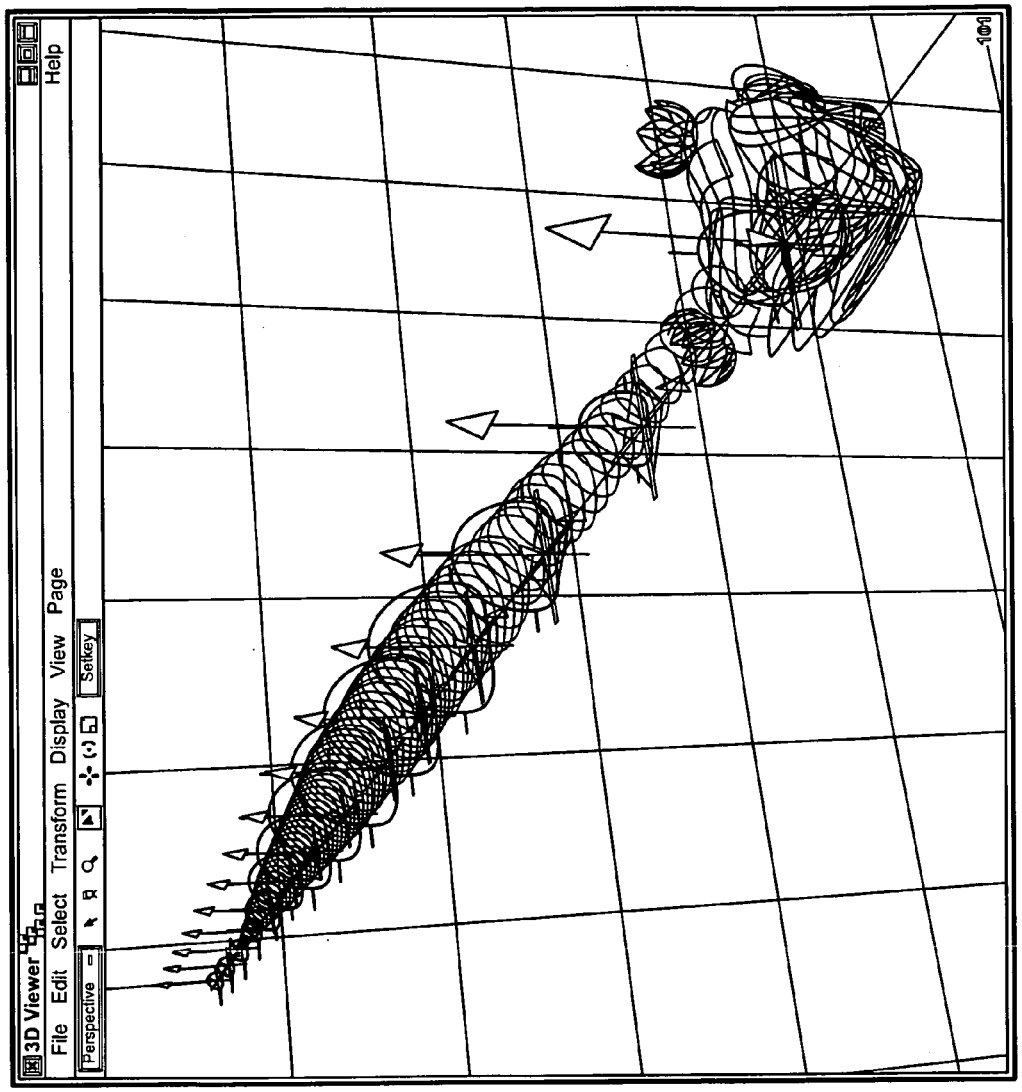
FIG. 33 shows a three dimensional perspective all the ml_nails locked as the viper rig is at its rest pose.
Figure 34:
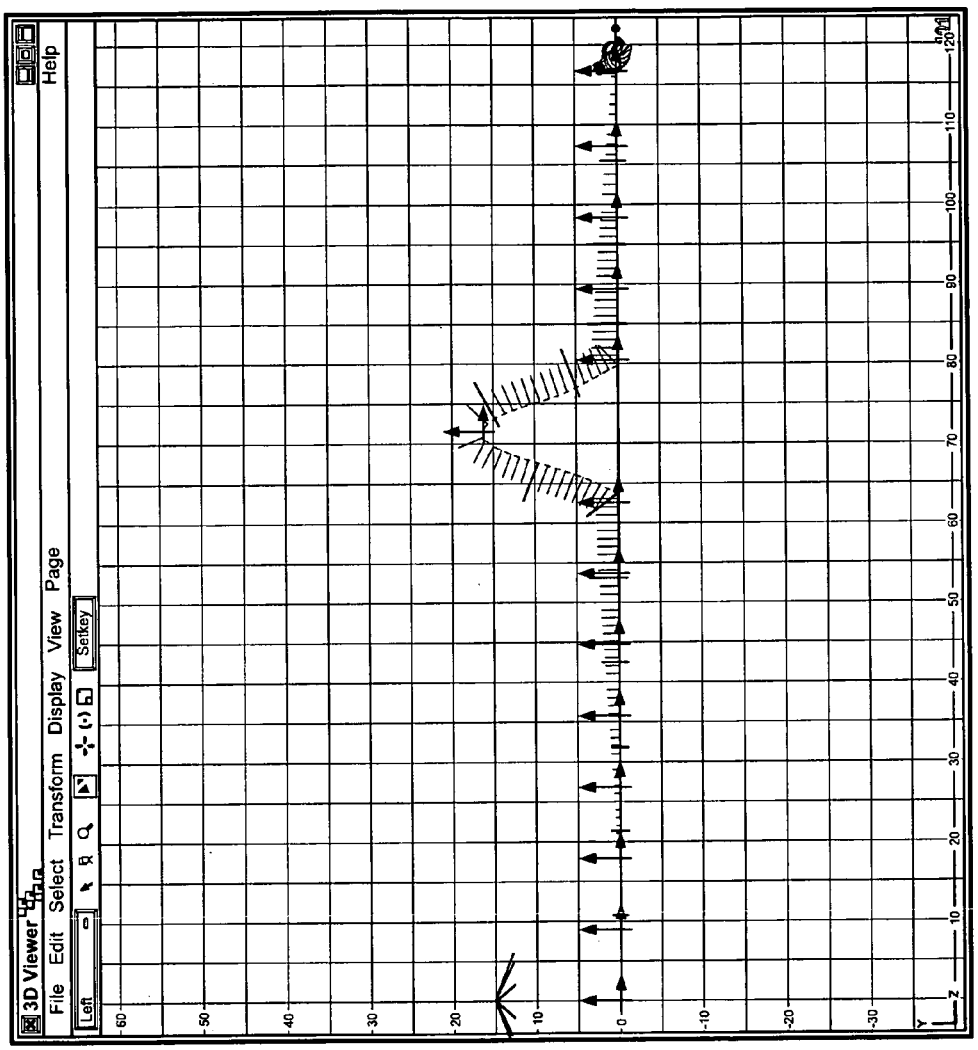
FIG. 34 shows the stretch will occur during translate when ml_nails are still locked.
Figure 35:
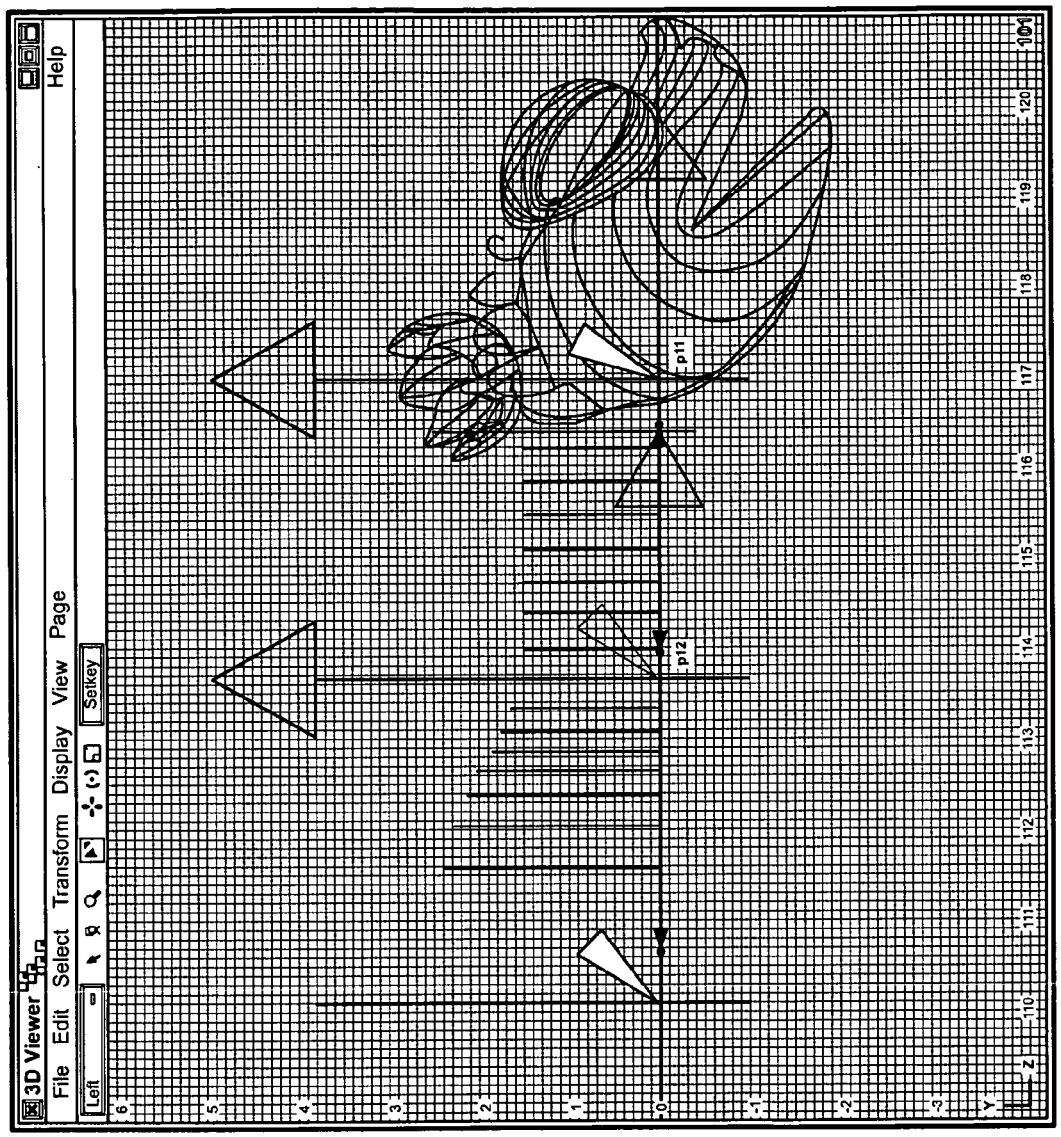
FIG. 35 shows all three nail types from left to right: ws_nail, np_nail, ml_nail.

The new position of the magnet may be out of synchronization with other elements. See the above NP-ML-NP procedure step 5 to correct this manually. FIG. 31 shows only neck "ml_nails" locked and the neck stretch that happens as a result. FIG. 32 shows all the ml_nails locked as the viper rig is at its rest pose. FIG. 33 shows a 3D perspective all the "ml_nails" locked as the viper rig is at its rest pose. FIG. 34 shows the stretch will occur during translate when "ml_nails" are still locked. FIG. 35 shows the three nail types from left to right: "ws_nail", "np_nail", "ml_nail".

Figure 36:
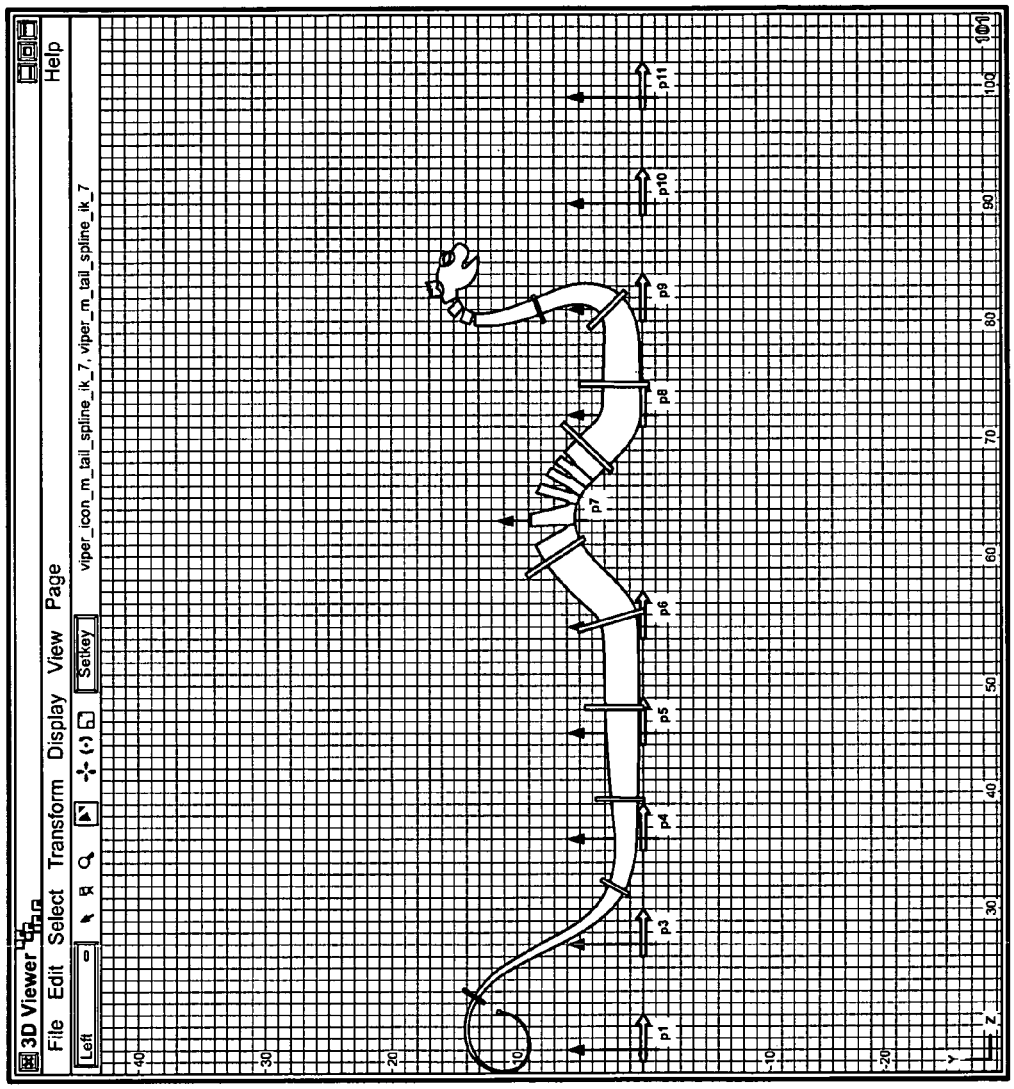
FIG. 36 shows an initial move pose in path travel.
Figure 37:
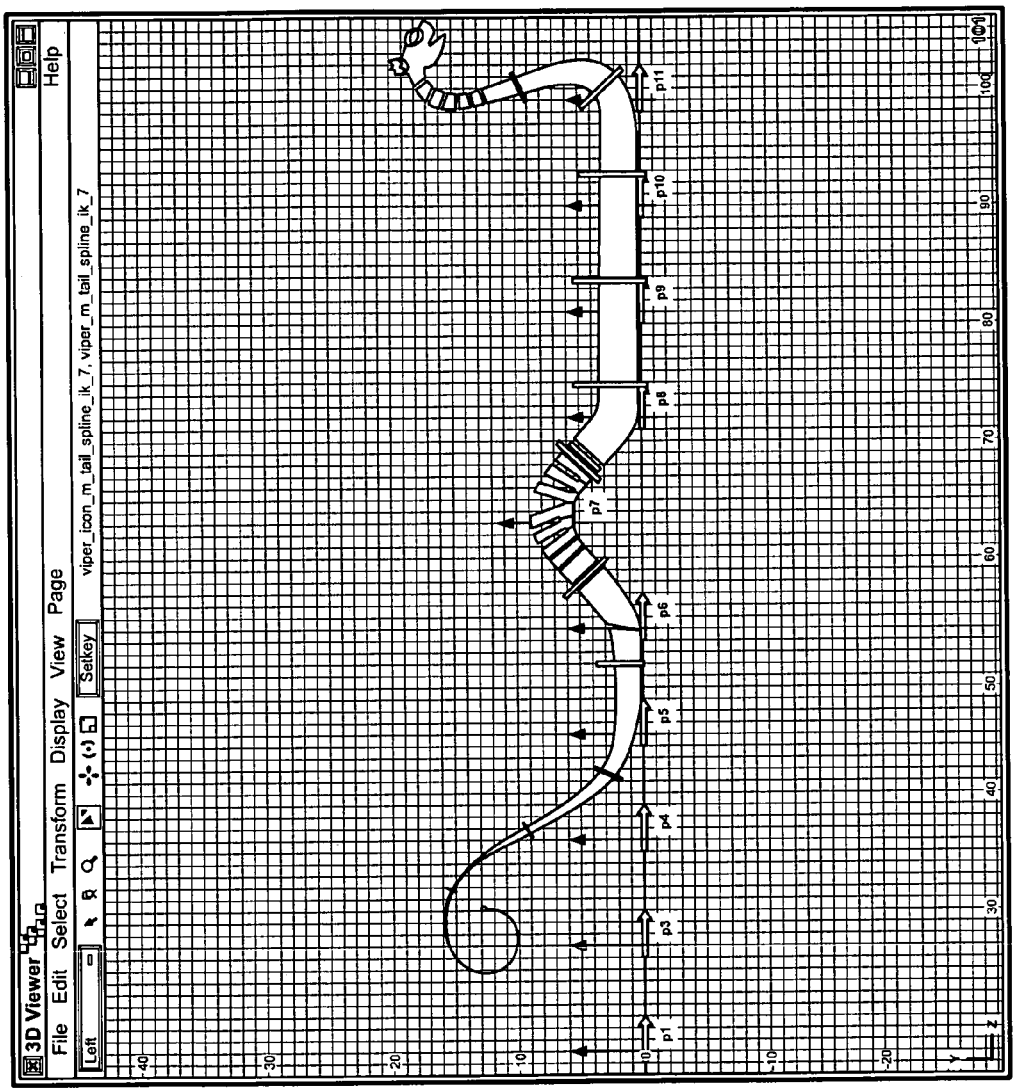
FIG. 37 shows an intermediate move pose in path travel.
Figure 38:
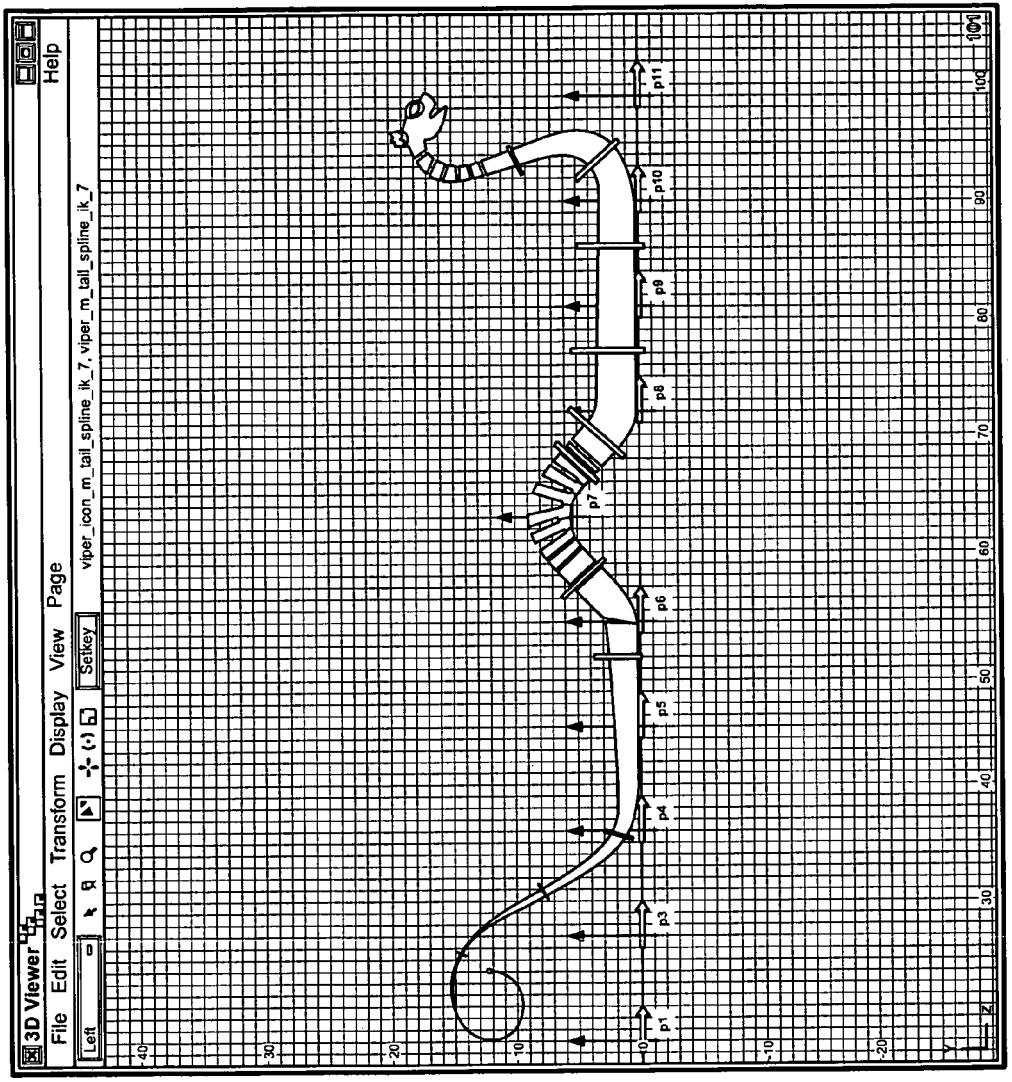
FIG. 38 shows a final move pose in path travel.

Path Travel Constraint viper_constraint_m_viper_path_travel provides a downstream abstraction layer to allow traveling along the path as a secondary mechanism which works in isolation from other constraints. This implies that each node works as a "virtual child" of the path and that this secondary traveling is always dominated by any path distortion. The advantage is that by isolating the traveling mechanism one may always have access to a second level of motion without any potential interferences from other constraints. FIGS. 36-38 show a progression in path travel of the viper character moving left to right. FIG. 36 shows an initial move pose in path travel of the viper character. FIG. 37 shows an intermediate move pose in path travel. FIG. 38 shows a final move pose in path travel.

Rotation Constraint viper_constraint_m_viper_rotate provides a novel rotation transformation which allows each joint (or node) to rotate either independently or in concert with all or some of the other joints. Unlike typical prior art forward kinematics systems (FK) which use a standard parent-child hierarchical paradigm for any rotation type manipulation, the present "XK" or "Xtreme Kinematics" system, as was coined here, differentiates itself by keeping each node free throughout any manipulation. An abstract child-parent relationship may be temporarily formed for the sake of executing a single function and then reset to their default free state when the operation is complete.

Suppose one is trying to rotate an arm in an FK (prior art) based system. Rotating the arm from a shoulder joint will imply that relocation of the elbow joint as well of the hand joint including every finger joint "underneath". This is of course normal and a desired behavior, and is a valid choice within the present system. But the situation differs if one wants to rotate the other way around, that is from the hand back to the shoulder. At first, this behavior does not seem to make sense. But the reality is that there are similar situations in which this is desired. Consider a monkey on a branch of a tree. If the tree has no motion to it, there is no issue. But if the tree moves, one may want to constrain the monkey to the tree branch and have the monkey affected by the branch motion. This will be difficult to do and quite unattainable in a prior art FK system. In the present XK system a rig may be easily constrained to a tree and follow its motion. The kinetic energy released when the tree branch moves can propagate down the character's limb which is in contact. The "chain" thereby becomes reactive rather then proactive. One can freely go back and forth from one rotation direction to the other. When one changes direction one reverses the hypothetical parent-child relationships.

Another important functionality is the ability to use weight in the number of joints participation and their level of interaction. This becomes more apparent on a serpentine type character rig. For example one may want to establish an initial rotation base ("parent") at the base neck joint. Using the same "universal" control one can now rotate forward along the neck and the head, or backward along the body and tail. At any given moment one can decide how many joints may be participating and to what degree.

Figure 39:
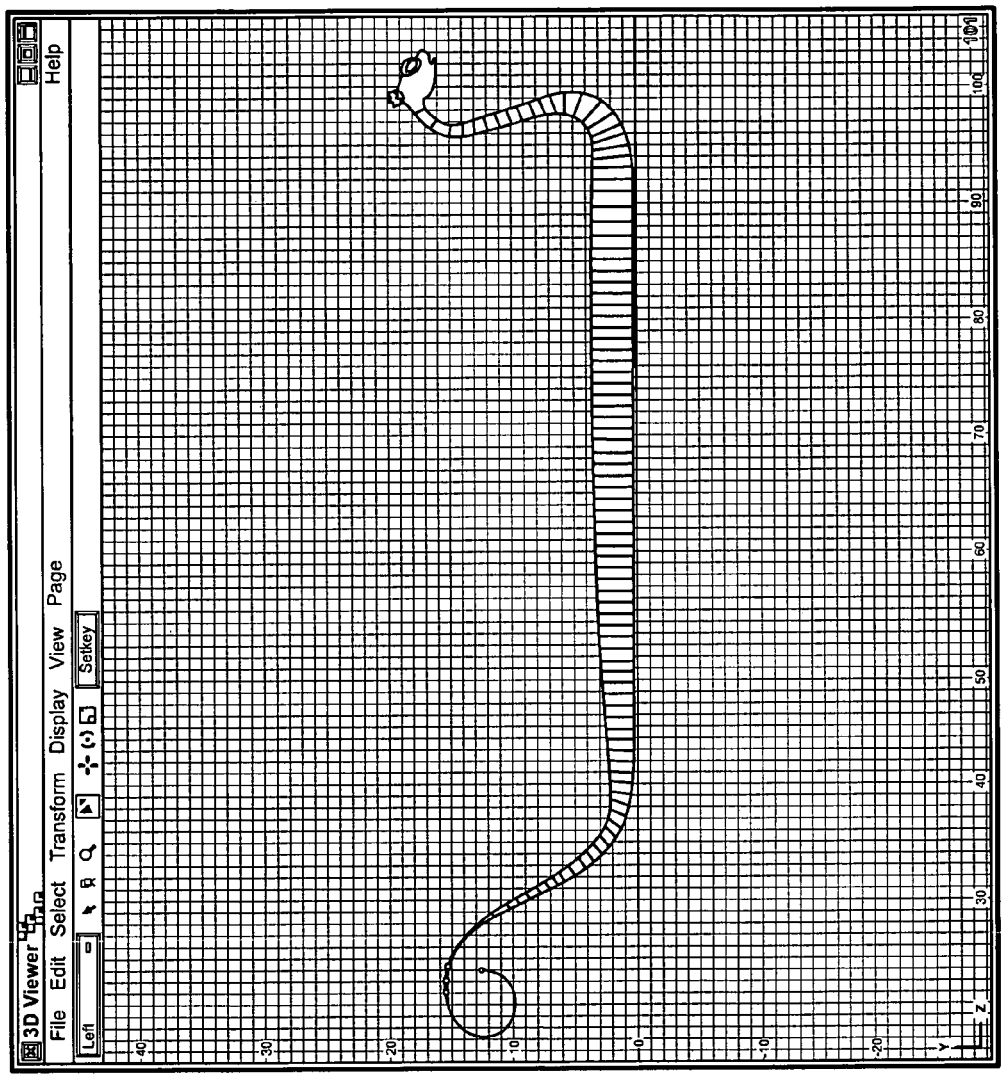
FIG. 39 shows the total summation of rotations for all joints along the x axis.
Figure 40:
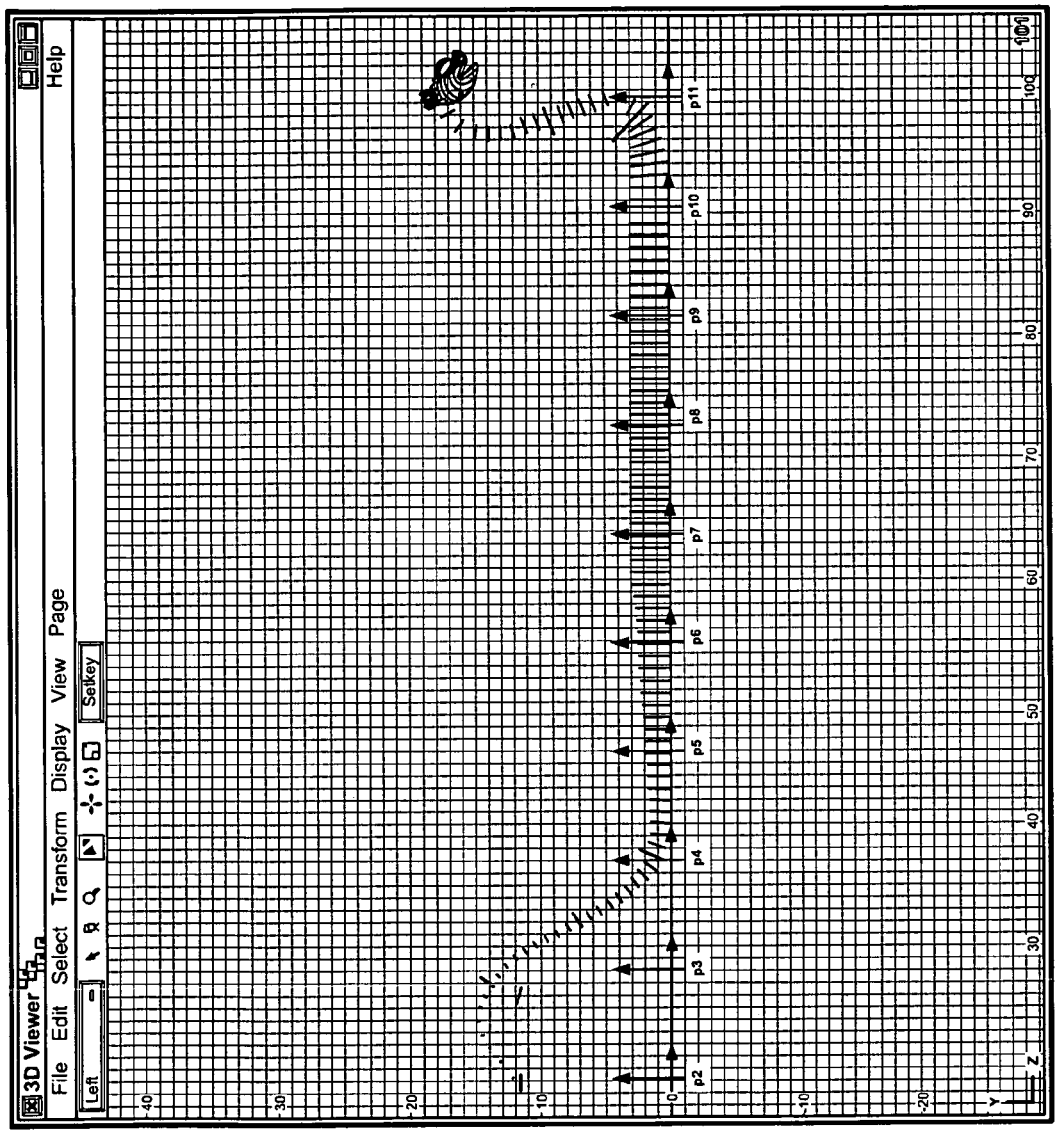
FIG. 40 shows the same elements as FIG. 39 in slinky mode.

Each joint has typically three degrees of freedom with two possible directions (x, y, z, x' y' z'). To handle the two possible directions, the viper rig calls viper_constraint_m_viper_rotate constraint twice, one for each forward or backward direction. Procedure rot_links( ) performs the actual rotation on every joint. "amplitude" controls the amount of the weighted rotation. The "set_time_table( )" procedure maps out proper weight values to each joint. FIG. 39 shows the total summation of rotations for all joints along the x axis. Neck and head are "forward" rotated in two locations. Tail is "backward" rotated in three locations. FIG. 40 shows the same as FIG. 39 but in the "slinky" mode.

Translation Constraint

The translation constraint viper_constraint_m_viper_translate operates similarly to the rotation constraint in that it provides a transformation manipulation method for a weighted area along the character's body. Using the "universal" control, an area can be translated away from the rest of the body on each of the three axes. Typically the closer one is to the center of operation, which may very well be the current location of the selected "universal" control, the higher is the weighted coefficient. Various manipulation algorithms are possible but a 3-point b-spline like manipulation is usually preferred, since the transition between the points is usually smoother.

Figure 46:
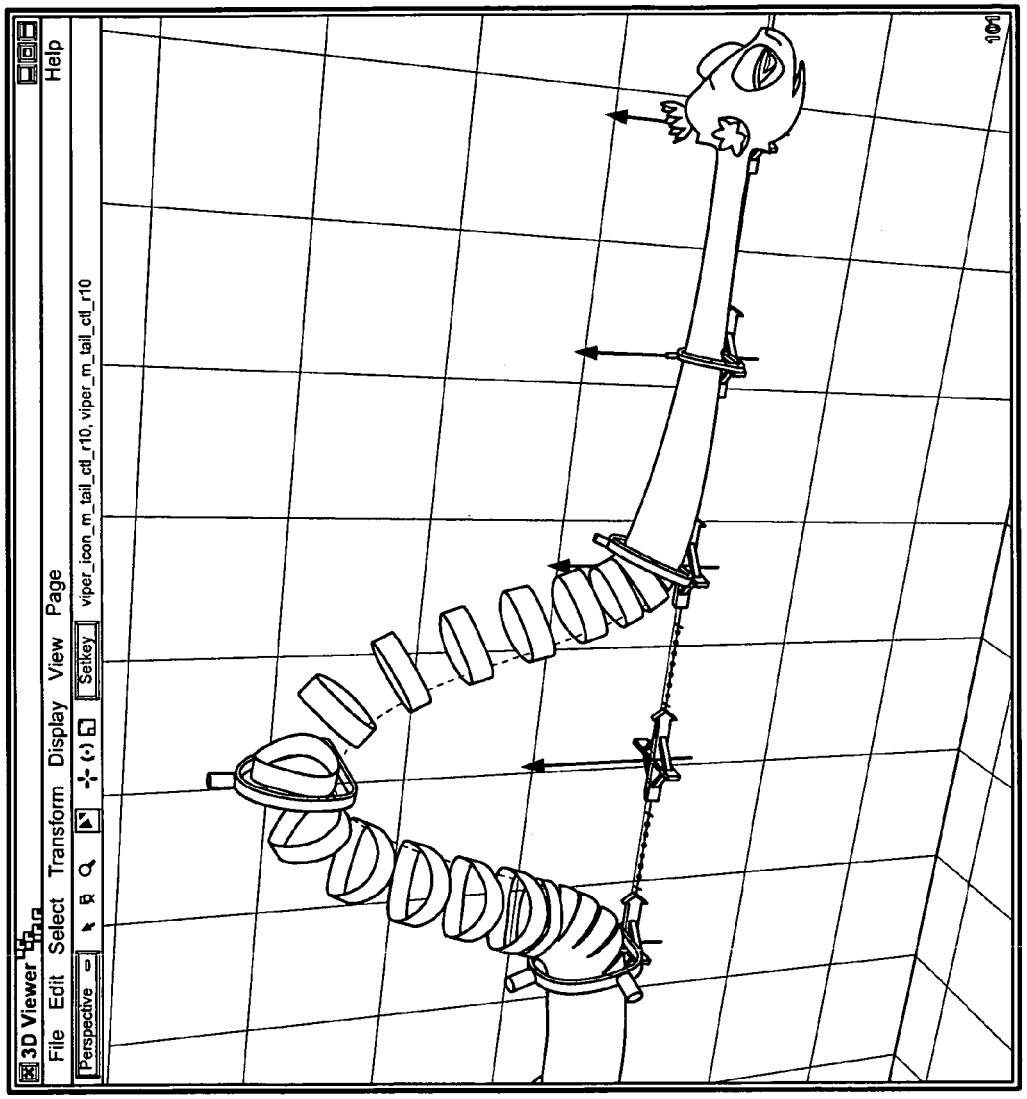
FIG. 46 shows the result of translation in y axis with spaced-out "stretched" proxies.
Figure 47:
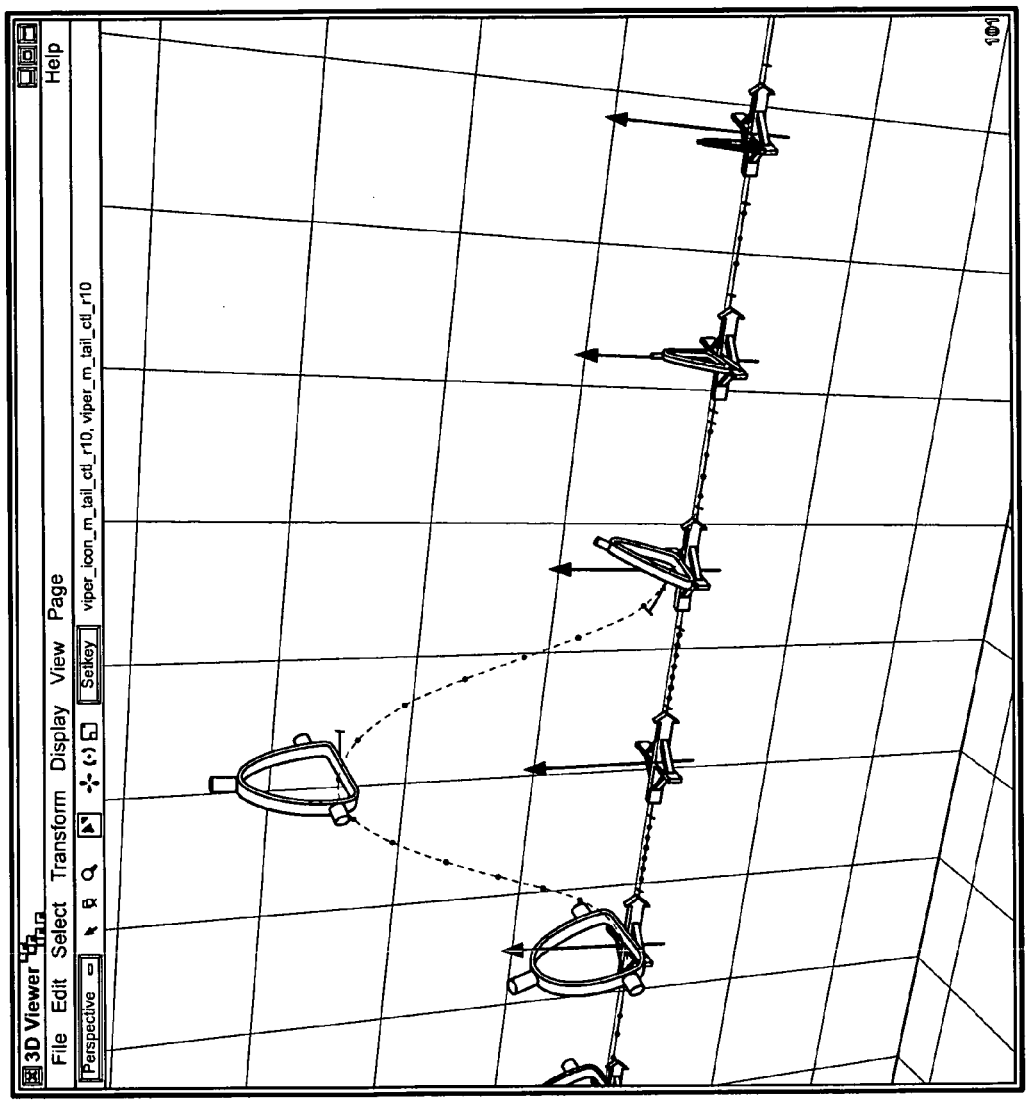
FIG. 47 shows the same result of translation in y axis on a bare system.

Just as in viper_constraint_m_viper_rotate, the free-form behavior of the present XK rig allows for each joint to be manipulated in concert with its neighboring joints, or independently (see FIG. 5) at all times. The entire area of the translation can be slide along the body. FIG. 46 shows the result of translation in y axis with spaced-out "stretched" proxies. (see proxies definition.) FIG. 47 shows the same result of translation in y axis on a bare system. (see bare definition.) Notice the viper's skeleton's spine—spline with its new displacement off the path spline. The selected universal control will drag the spline with it, causing it, as well as the joints which are placed along it, to stretch from the two neighboring universal controls.

Figure 48:
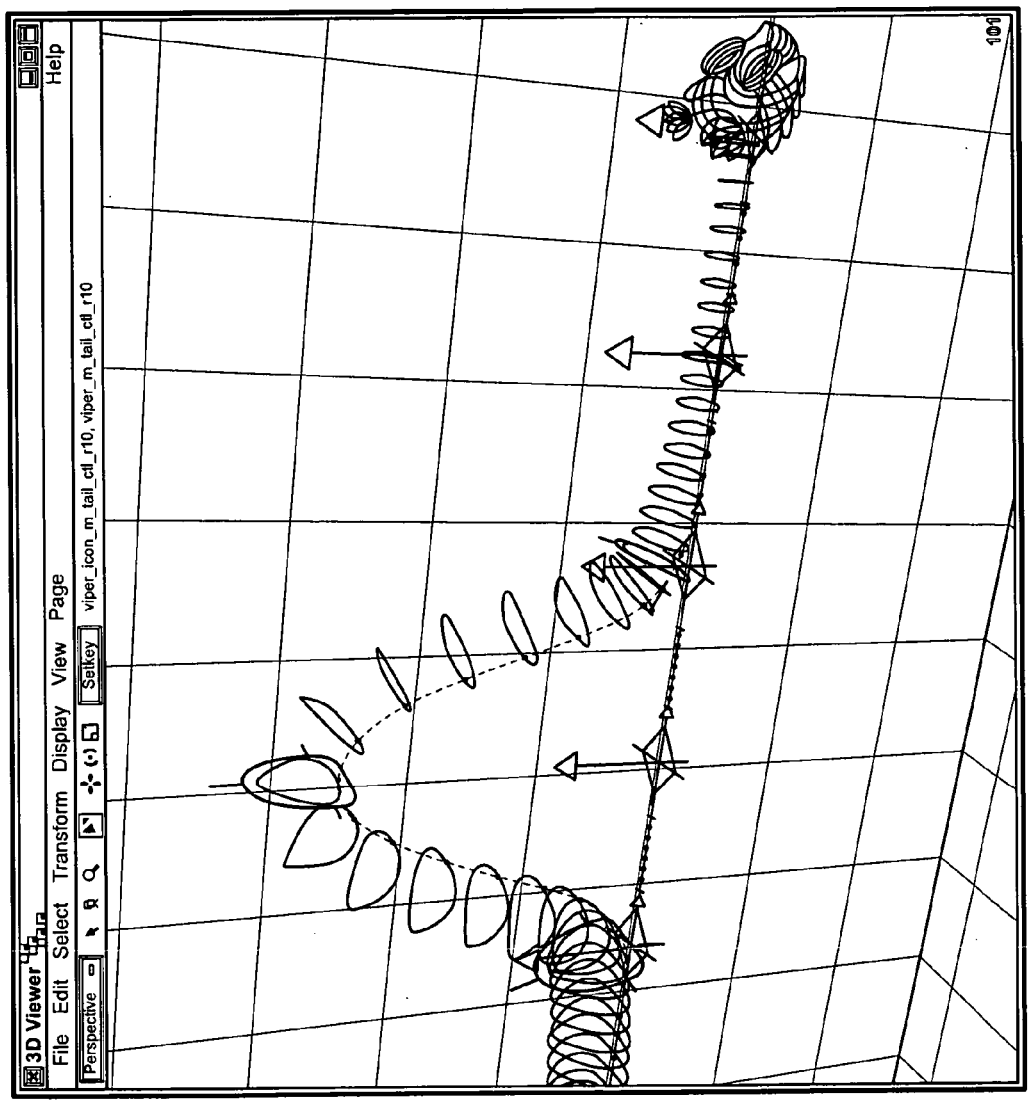
FIG. 48 shows (in slinky mode) first step in a translation type motion.
Figure 49:
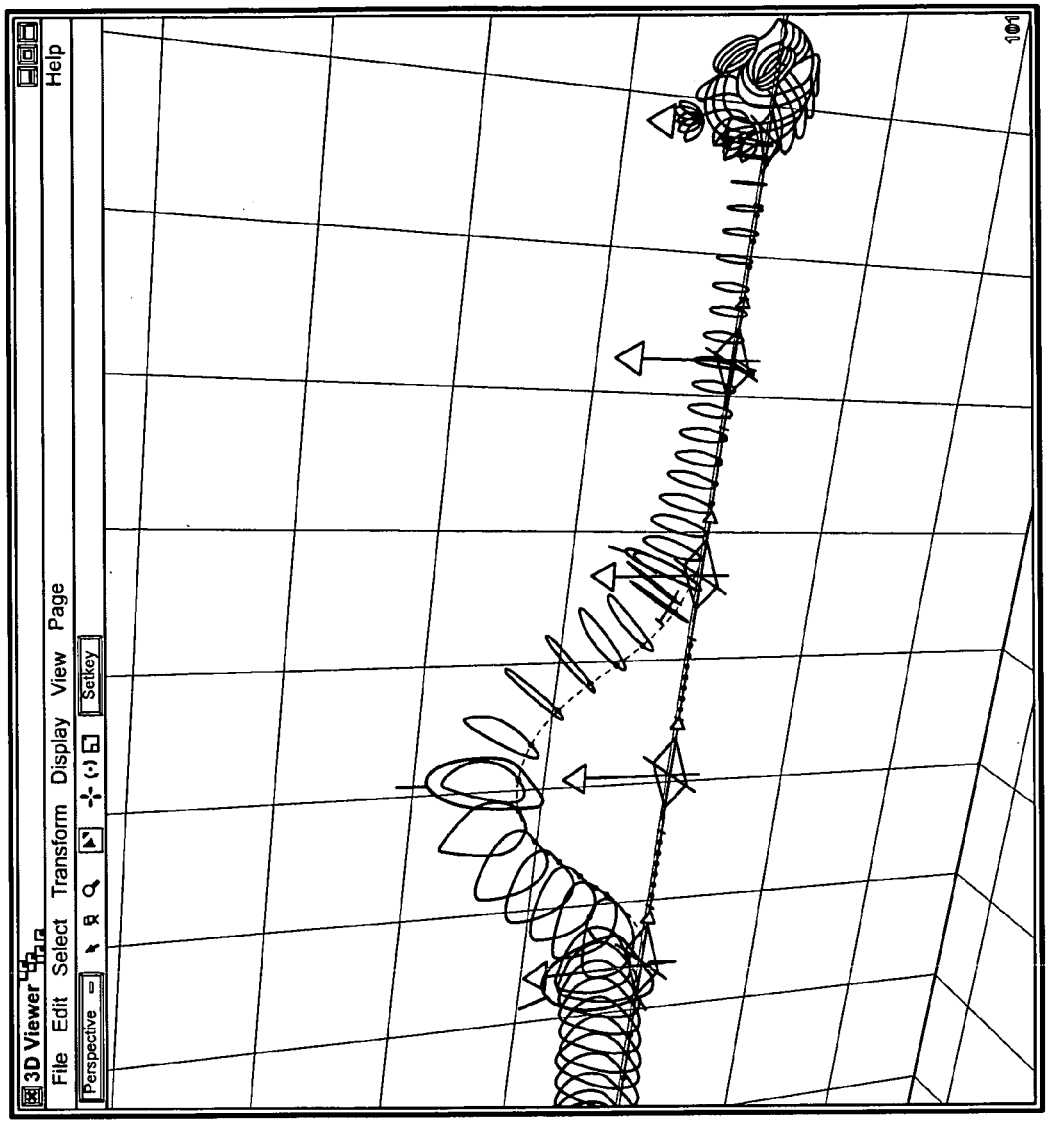
FIG. 49 shows (in slinky mode) mid step in a translation type motion.
Figure 50:
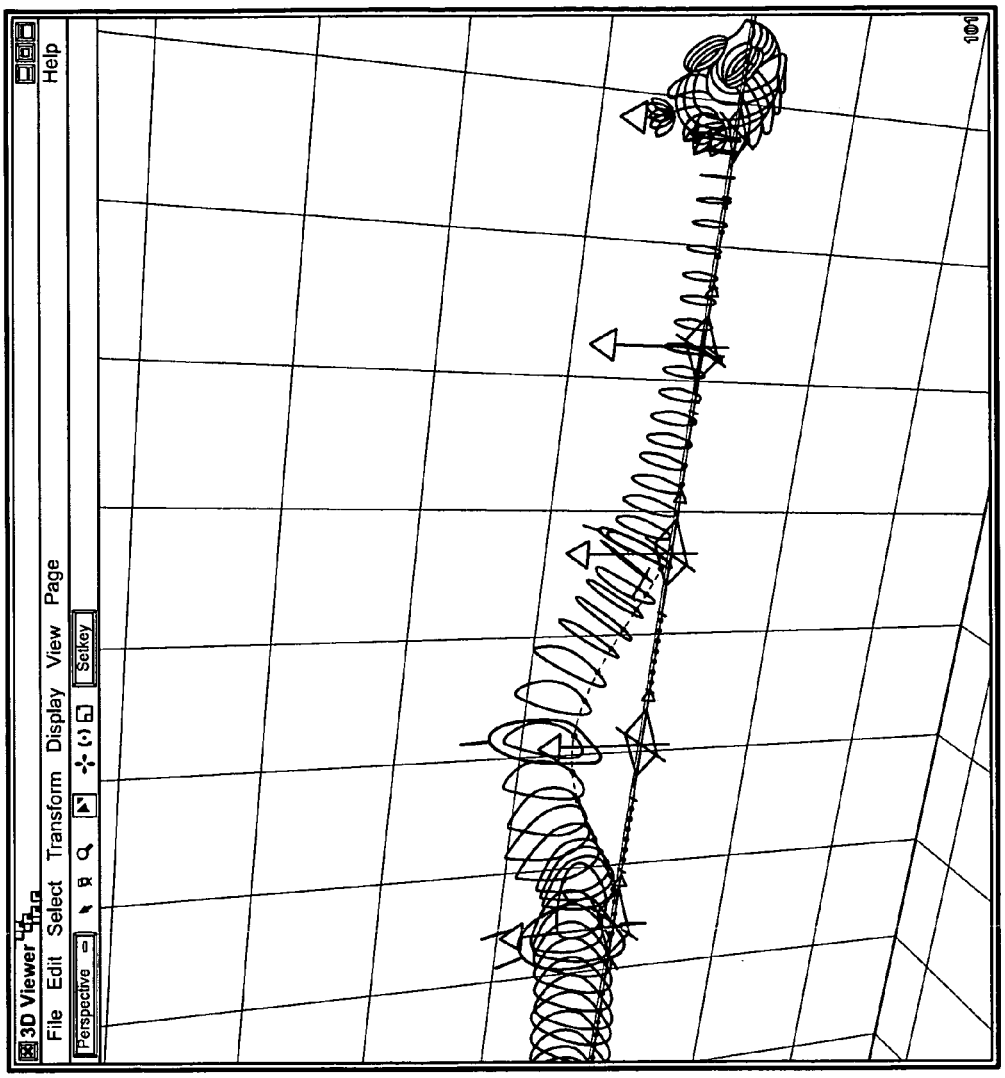
FIG. 50 shows (in slinky mode) first last in a translation type motion back to rest pose.

FIGS. 48-50 show (also in the "slinky" mode) the three translation states as the viper slowly returns to its default rest position. ("Slinky" mode refers to the character being shown in a manner similar to that of the well known slinky toy.) Notice that the spaces between neighboring slinky rings decreases through the motion. The arc sharpness near each one of the controls can also be controlled separately using the bezier handles. See the above { }_constraint_m_viper_bezier_trn and "caller 2" within the Bezier Path constraint.

Twist Constraint

The twist constraint viper_constraint_m_viper_twist operates similarly to the rotation and translation constraints in that it provides a transformation manipulation method for a weighted area along the character's body. Using the universal control, a local area along the body can be twisted on any of x, y, z axes. Typically the closer one is to the center of operation, which may very well be the current location of the selected universal control, the higher the weighted coefficient is. As in viper_constraint_m_viper_rotate, the free-form behavior of the present XK system allows for each joint to be manipulated in concert with its neighboring joints, or independently.

Figure 45:
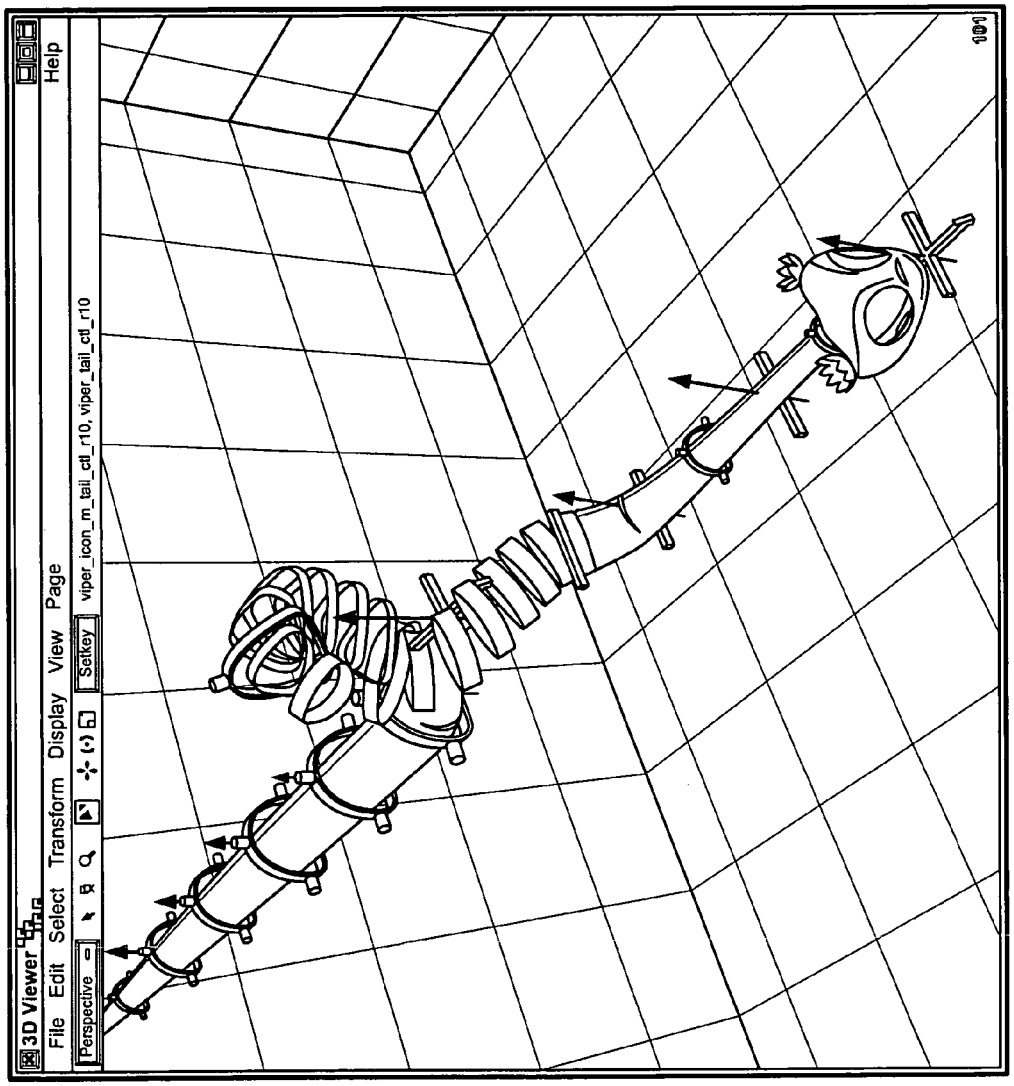
FIG. 45 shows the result of a twist on a single universal control.
Figure 51:
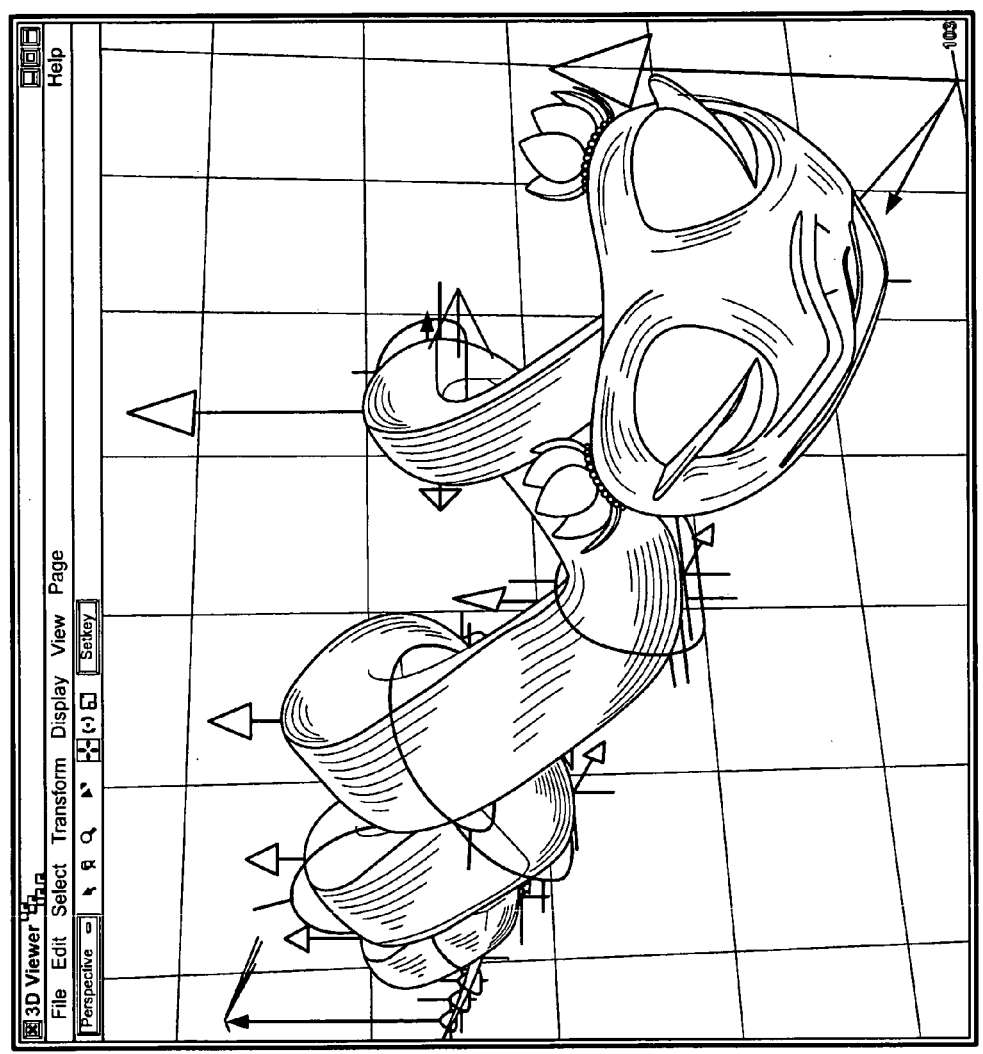
FIG. 51 shows the viper rig with skin deformation on a spiral-like roller coaster path.
Figure 52:
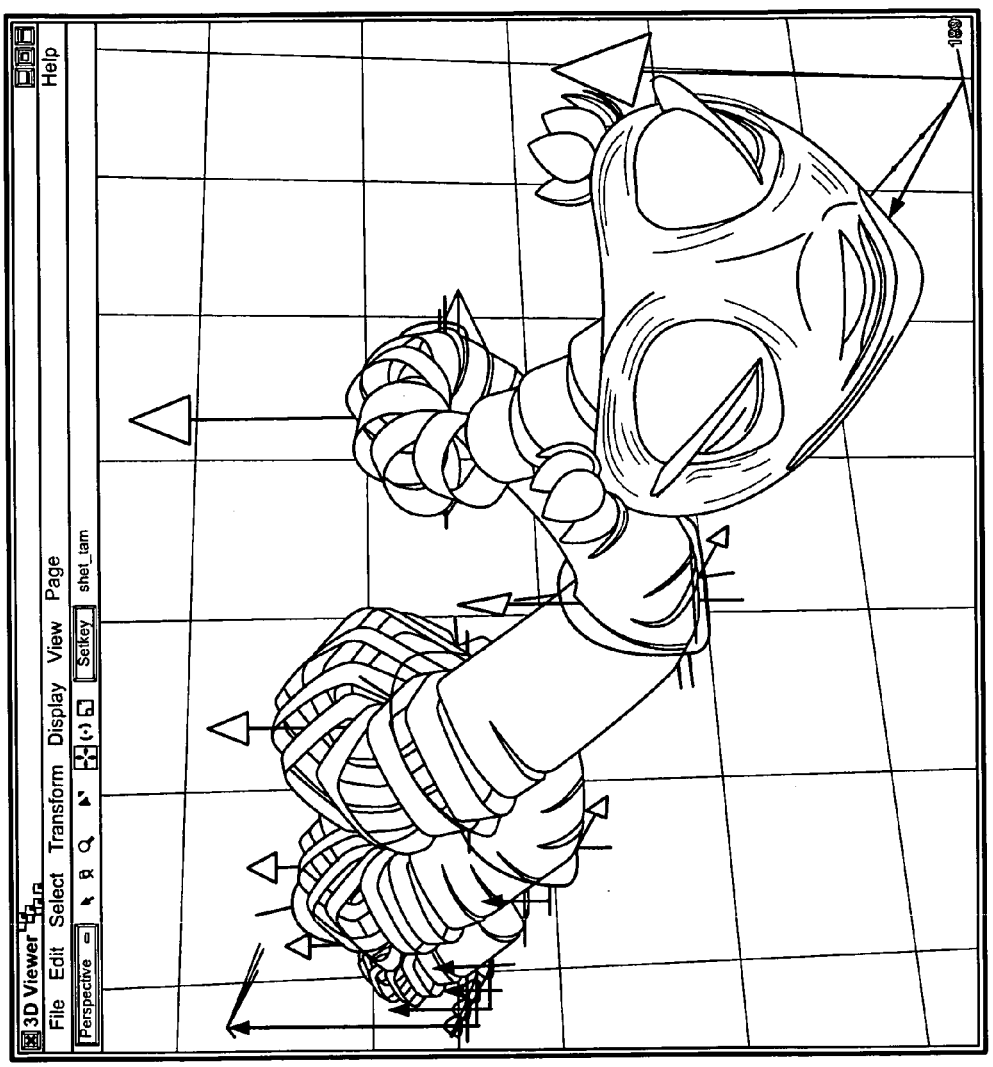
FIG. 52 shows the viper rig with proxies on a spiral-like roller coaster path.

Throughout the twist operation each joint will rotate to a weighted degree of rotation as part of the sequence of joints being manipulated within the area being twisted. Each joint will keep its relative location within its neighboring joints. FIG. 45 shows the result of a twist on a single universal control. Notice that the selected joint was first translated in y and then twisted. Sliding the selected joint along the parametric U of the body, will cause the twist area to slide along the body as well. The twist constraint can be applied on the path controls as well. In that case the viper rig remains on the path and sliding the viper rig through the twist area will cause the body to follow the twist in a roller coaster like behavior. FIG. 51 shows the viper rig with skin deformation on a spiral-like roller coaster path. FIG. 52 shows the viper rig with proxies (see above "proxies" definition) on a spiral-like roller coaster path.

Scale Constraint

Figure 41:
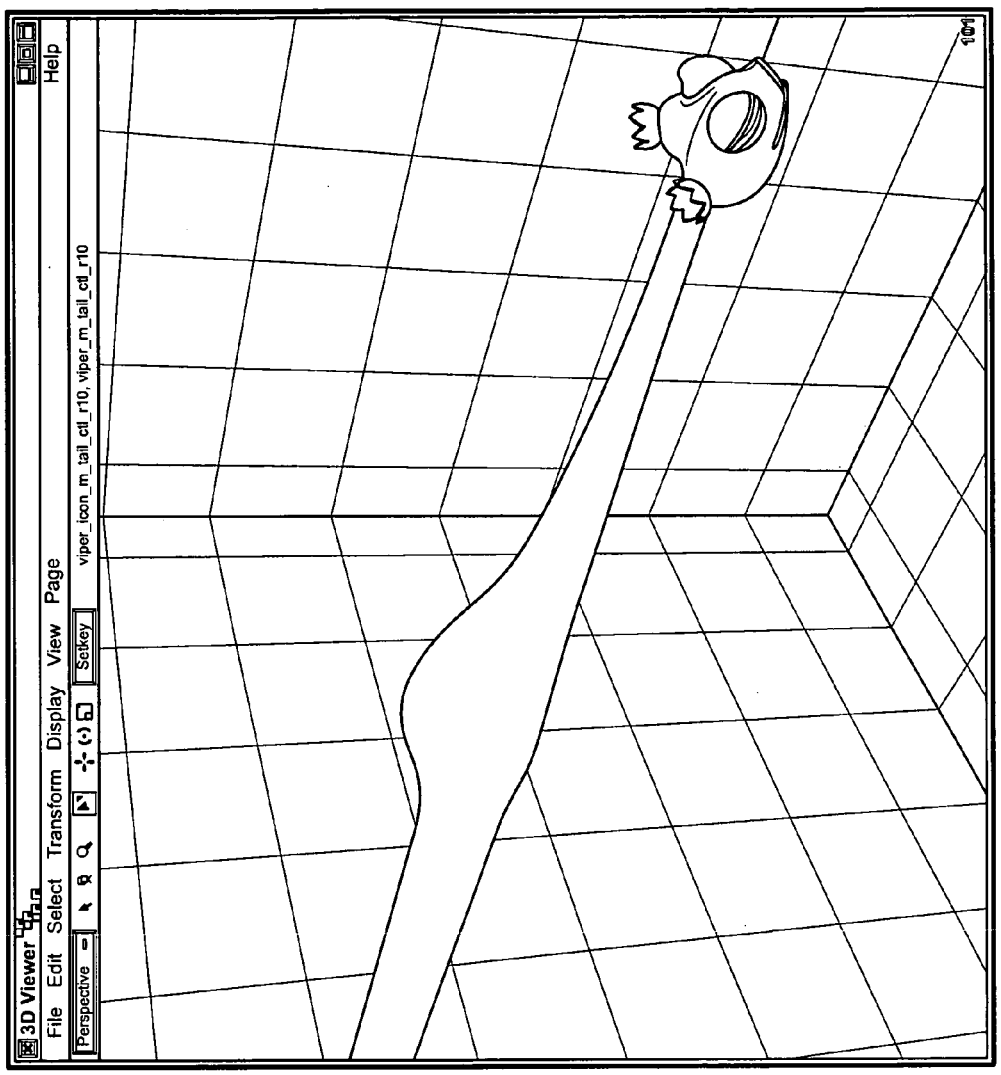
FIG. 41 shows a first step in a forward progression of a volume scale along the body.
Figure 42:
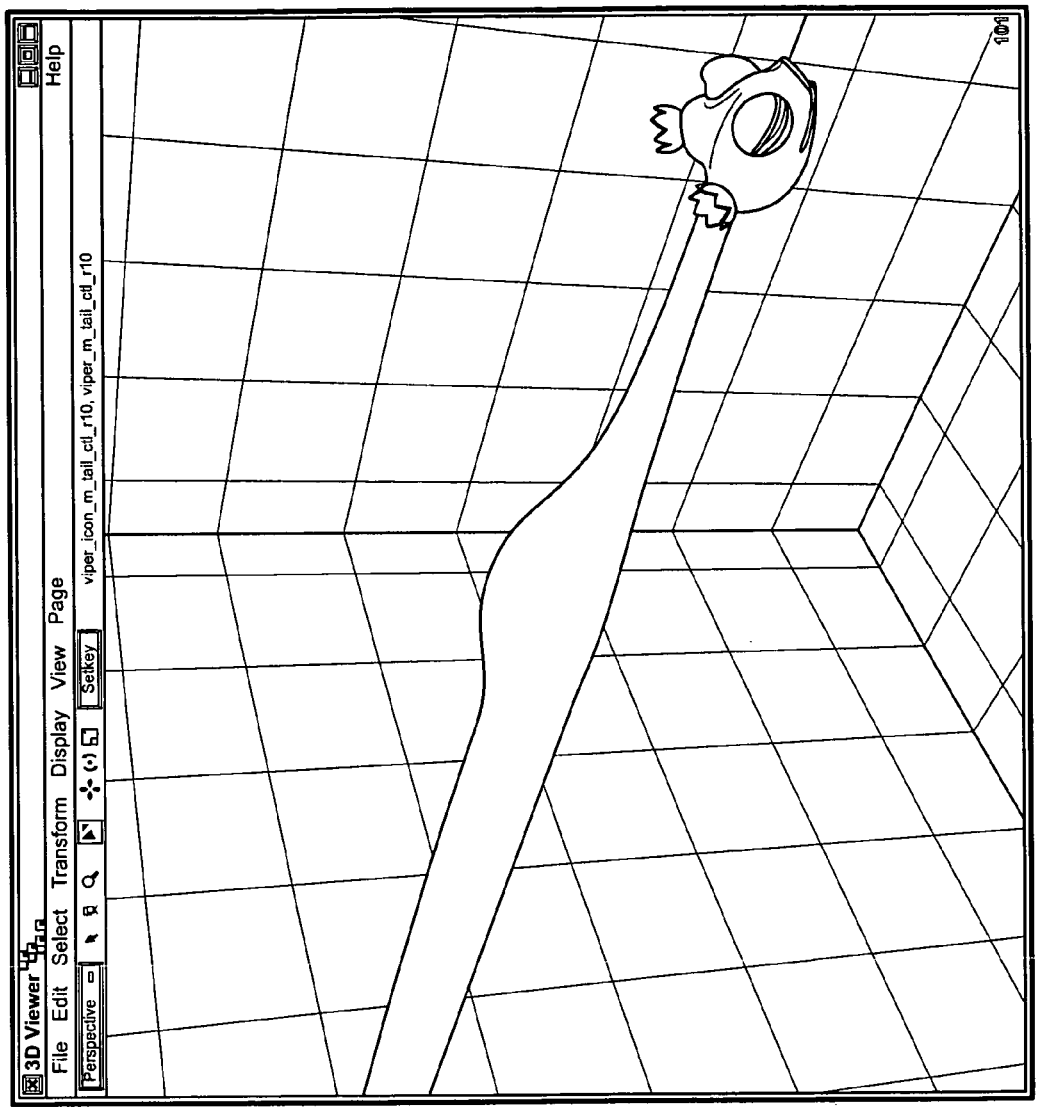
FIG. 42 shows a mid step in a forward progression of a volume scale along the body.
Figure 43:
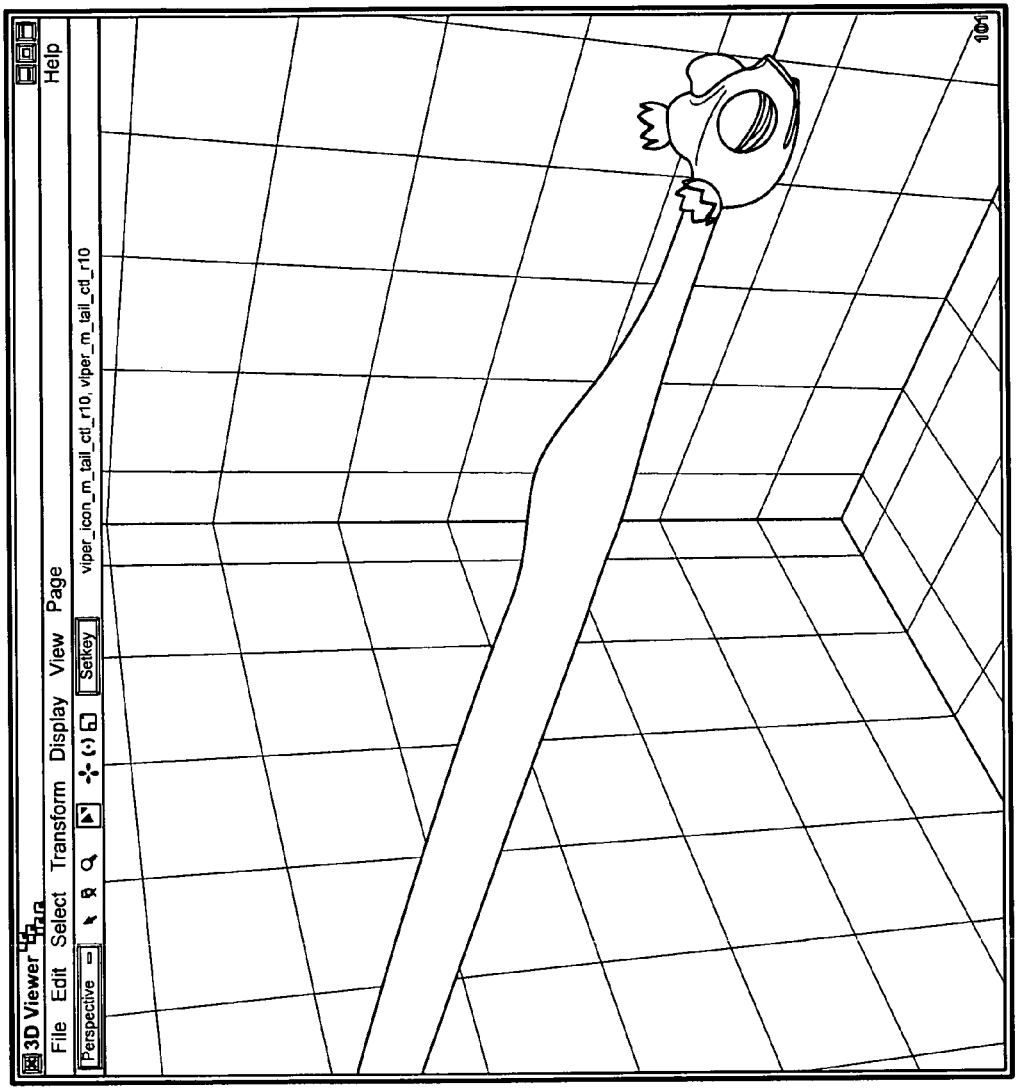
FIG. 43 shows a last step in a forward progression of a volume scale along the body.

The scale constraint viper_constraint_m_viper_scale operates similarly to the rotation and translation constraints in that it provides a scale manipulation method for a weighted area along the character's body. Using the universal control, a local area along the body can be locally scaled separately on any of x, z axes, or uniformly (both x and z). Typically the closer one is to the center of operation, which may very well be the current location of the selected universal control, the higher the weighted coefficient is. As in viper_constraint_m_viper_rotate, or in viper_constraint_m_viper_translate the free-form behavior of the present XK system allows for each joint to be manipulated in concert with its neighboring joints, or independently. Throughout the scale operation each joint will scale to a weighted amount as part of the sequence of joints being manipulated within the area being scaled. FIGS. 41-43 show a forward progression of a volume scale along the viper's body.

Shift Constraint

The shift constraint viper_constraint_m_viper_shift is a secondary motion constraint which works similarly to the rotation and translation constraints in that it provides a shift (by translation) manipulation method for a weighted area along the character's body. Using the universal control, a local area along the body can be locally shifted with respect to the spine. The spine remains static throughout this operation. As in viper_constraint_m_viper_rotate, or in viper_constraint_m_viper_translate the free-form behavior of the present XK system allows for each joint to be manipulated in concert with its neighboring joints.

Figure 54:
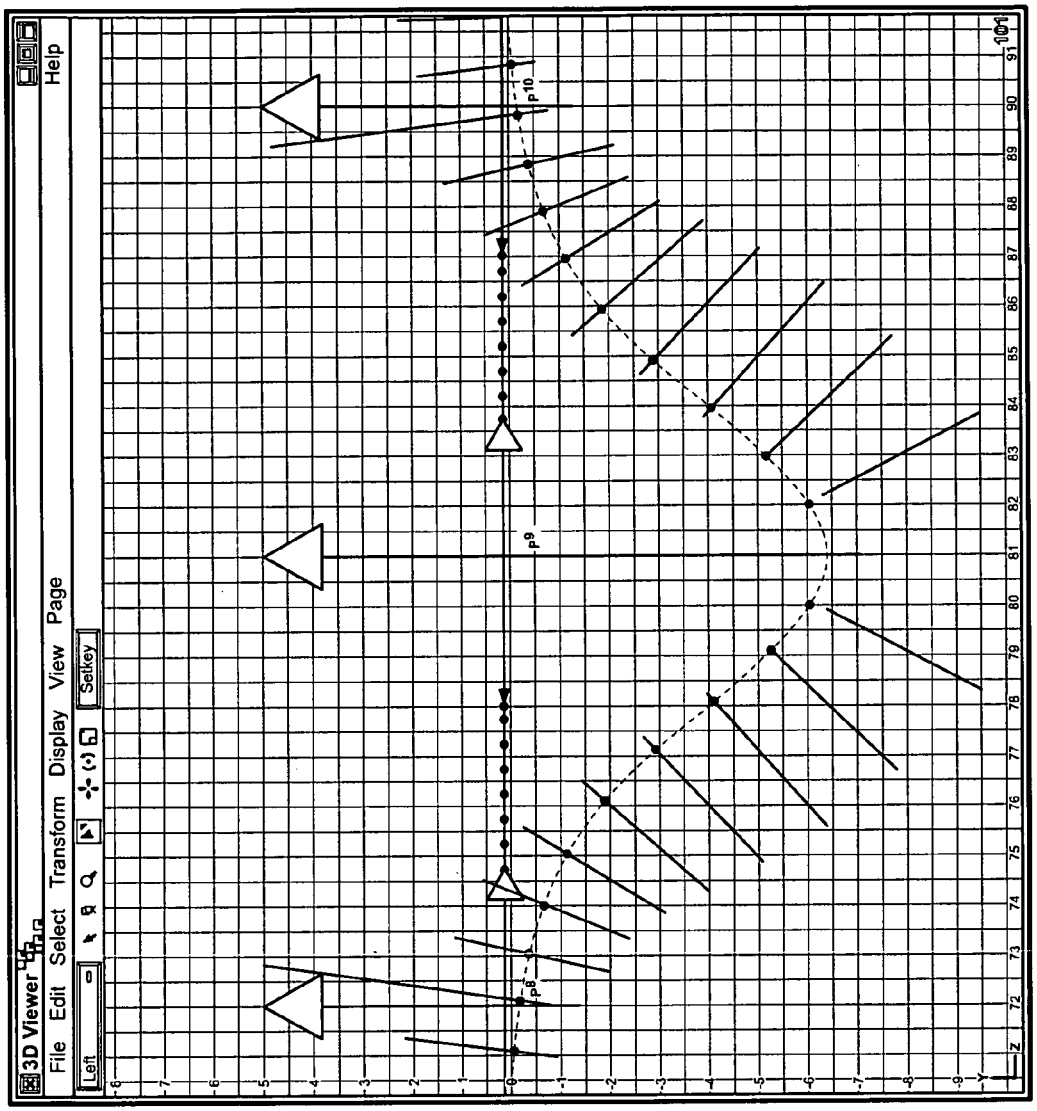
FIG. 54 shows before (shift) perspective of the relationship between the skin and spine.
Figure 55:
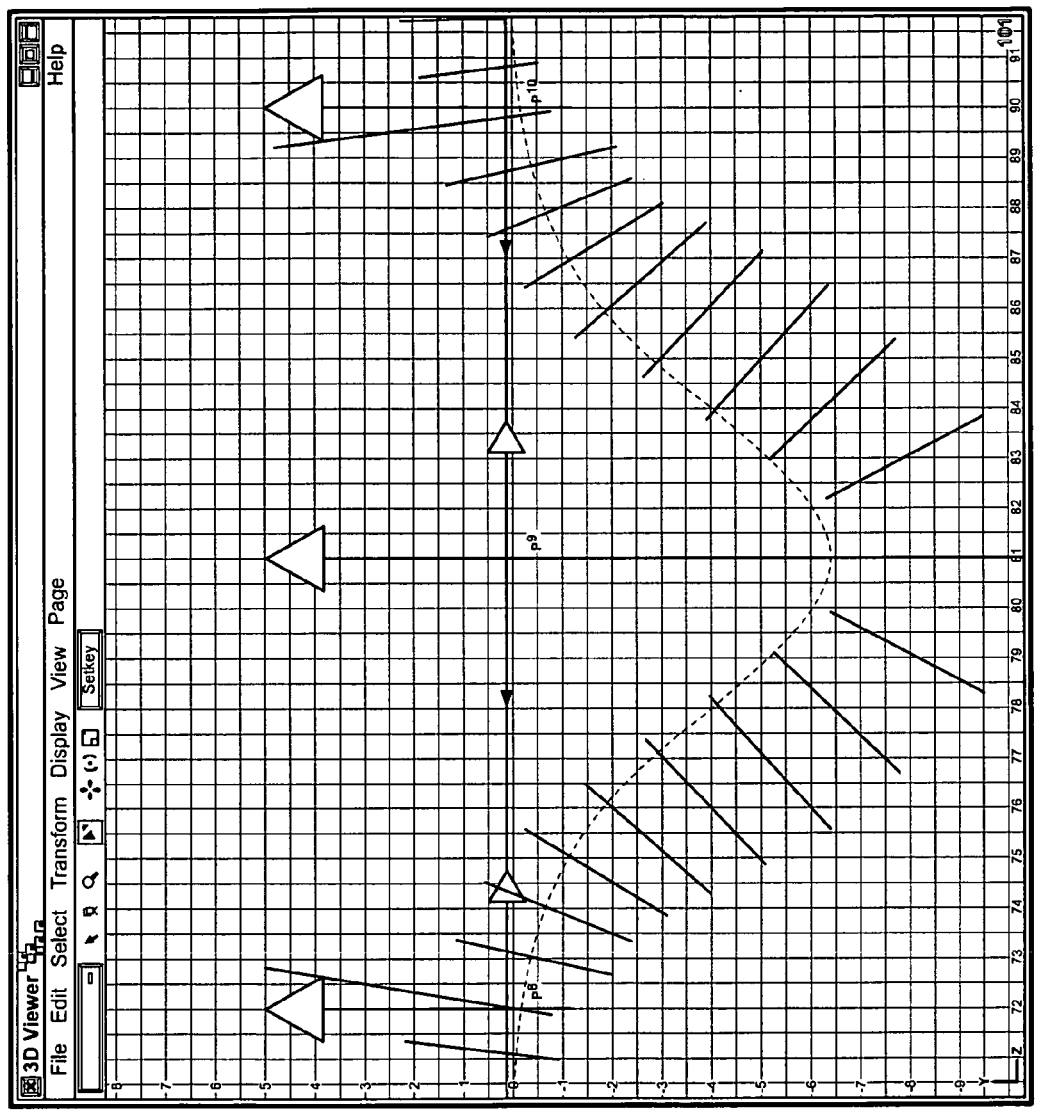
FIG. 55 shows after (shift) perspective of the relationship between the skin and spine.
Figure 56:
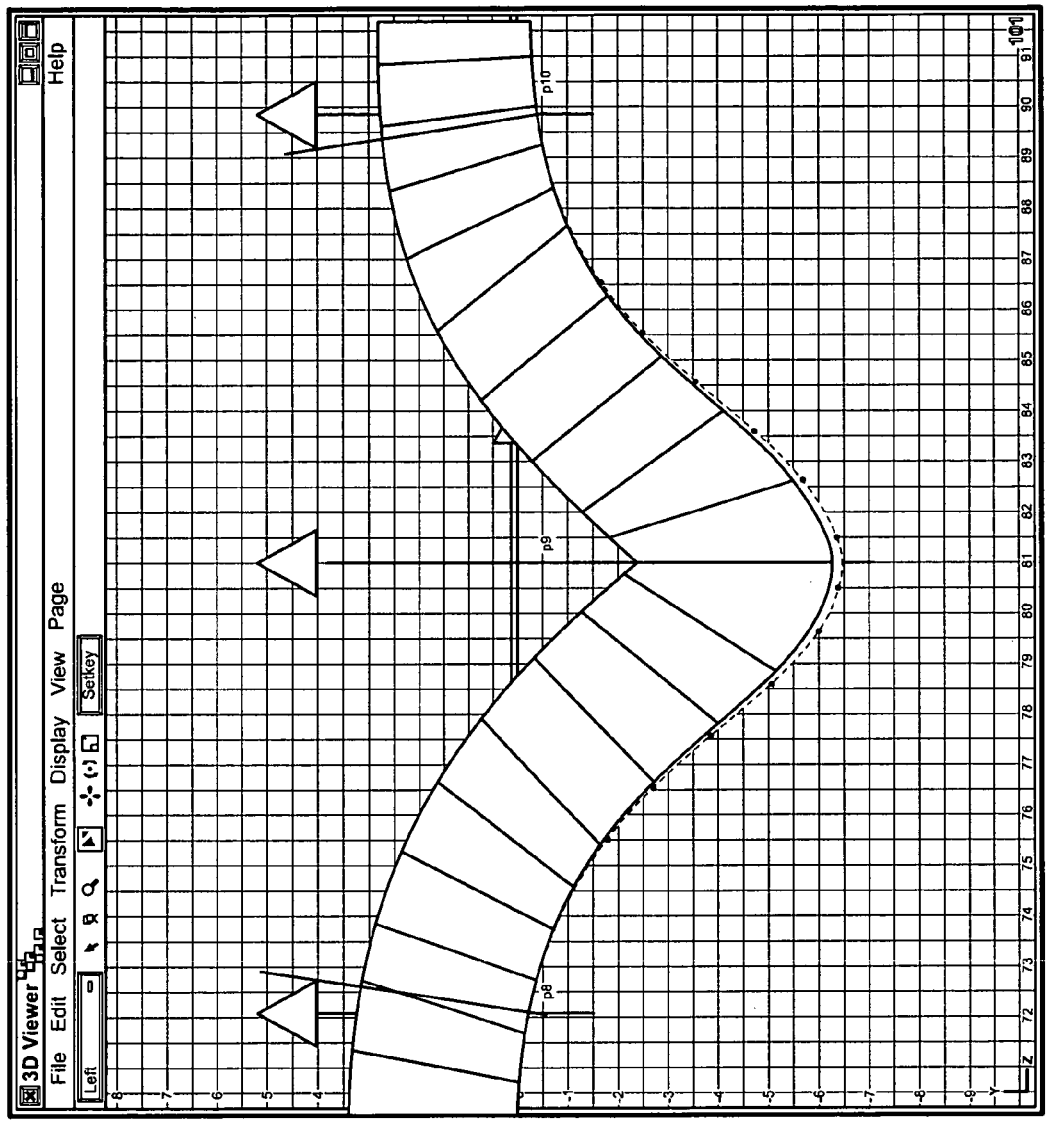
FIG. 56 shows the result of a negative y translation using the translation constraint.
Figure 57:
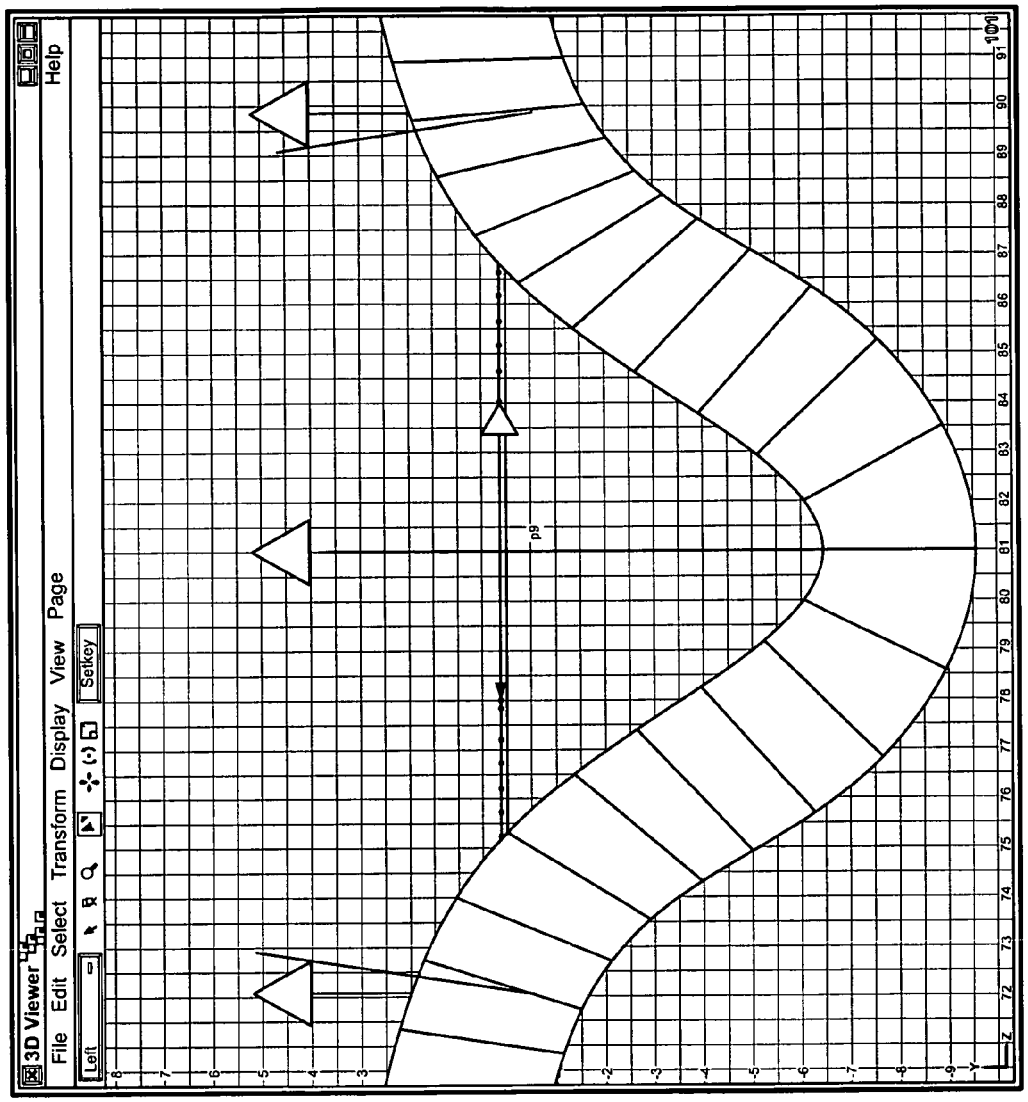
FIG. 57 shows how the skin was fixed after performing the shift operation.
Figure 58:
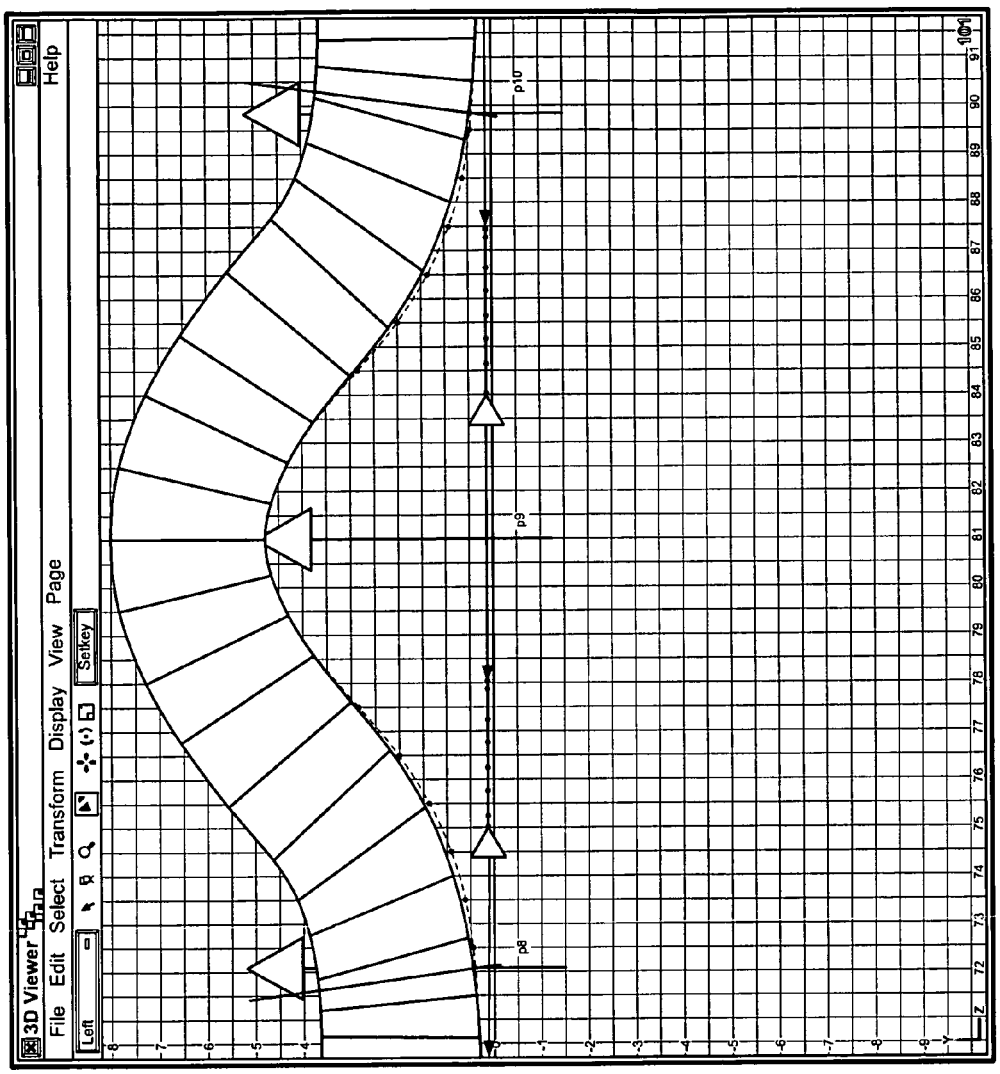
FIG. 58 shows the result of a positive y translation using the translation constraint.

Throughout the shift operation each joint will translate based on a weighted amount as part of the sequence of joints being manipulated within the area being shifted. Rather than actually translating the joints, a layer of secondary nodes will be offset off the joints. The result is that the character's skin itself will be transformed around the designated area while the joint pivots which represent the character's spine remain at their original location. The shift constraint is useful for fine tuning of tight curls along the spine. FIG. 58 shows the result of a positive y translation using the translation constraint. FIG. 56 shows the crunch result of a negative y translation using the translation constraint. These two images show how the character's skin is affected differently depending on the direction of y translating. Since the spine default location is at the bottom of the viper's body instead of being in the center, a dramatic crunching in the skin will appear. FIG. 57 shows how the skin was fixed after performing the shift operation. Notice the "new" location of the skin (z=78-80) in relation to the skin in FIG. 57. FIGS. 54-55 show another before-after (shift) perspective of the relationship between the skin and the spine in bare mode.

Figure 59:
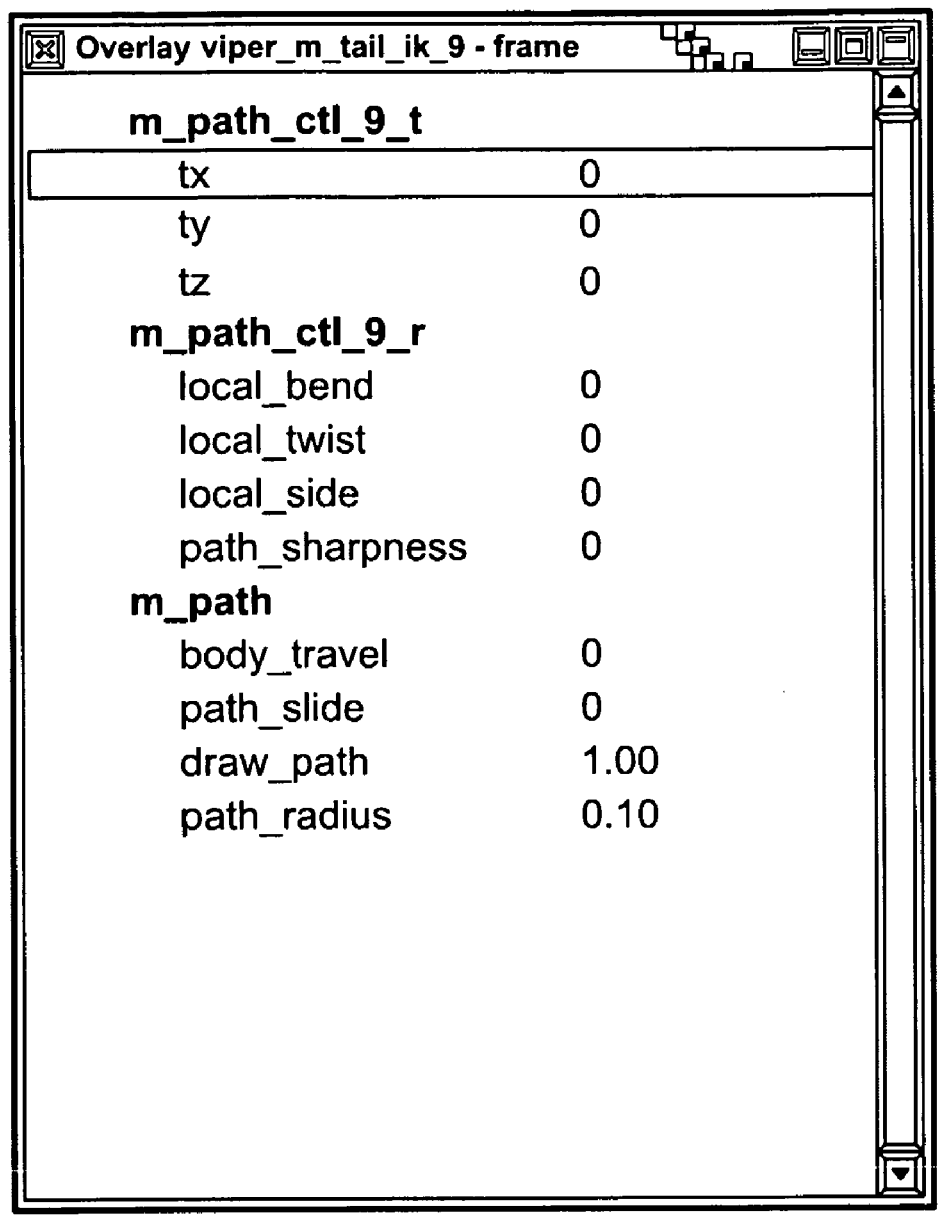
FIG. 59 shows the path controls overlay.
Figure 61:
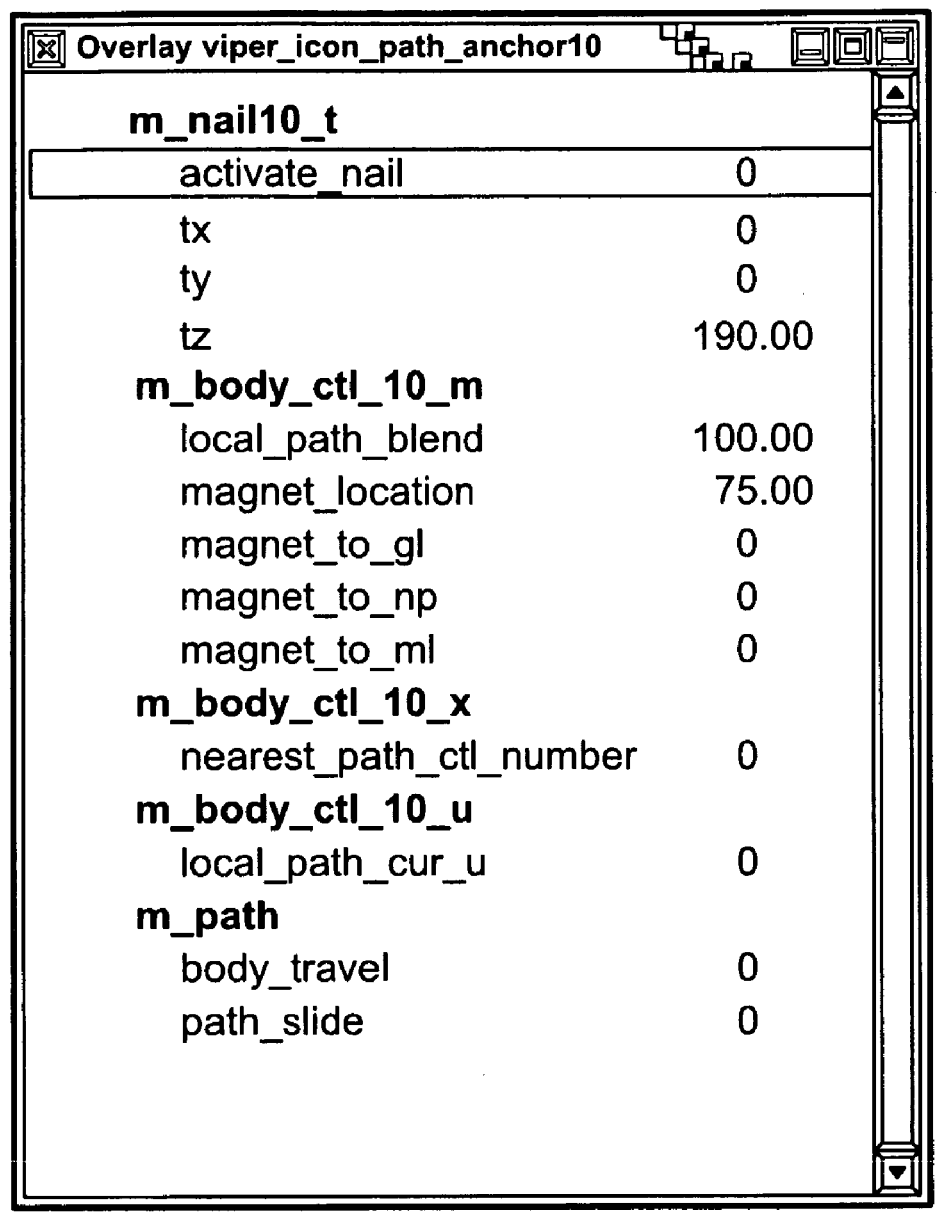
FIG. 61 shows the magnets controls overlay.

The head track constraint viper_constraint_m_viper_head_track provides several levels of head manipulation. Besides the standard basic head transformation for rotation (bend, twist, side) and translation (tx, ty, tz) the control attribute path2global allows having the head either follow the path or obey world-space rules. In the later case two options are available: 1. the "Egyptian" method which keeps the head at constant world-space orientation while the rest of the body might be animated. 2. Follow an aim node toward which the head may be re-oriented. The aim node itself can follow the path or not. FIG. 60 shows the overlay control screen for the character's head. FIG. 59 shows the path controls screen overlay. FIG. 61 shows the magnets controls screen overlay. FIG. 53 shows the universal controls screen overlay. FIG. 44 shows the path controls screen overlay.

This disclosure is illustrative and not limiting; further modifications and embodiments will be apparent in light of this disclosure and are intended to fall within the scope of the appended claims.

What is claimed as new and desired to be protected by Letters Patent of the United States is:

1. A computer enabled apparatus for animation comprising:

a memory operatively coupled to the computer enabled apparatus and storing a path including a set of nodes;

a spline module defining the path including the set of nodes as a spline and having a variable geometry defined only by a consecutive order of the nodes, the nodes being non-hierarchical;

a path module operatively coupled to the spline module and controlling rotation of segments of the path;

a lock module operatively coupled to the spline module and associating an animated character or object with the path for movement along the path; and at least one body module operatively coupled to the spline module and defining a second set of nodes that characterize a shape of the character or object and having a variable geometry defined only by a consecutive order of the second set of nodes, the second set of nodes being non-hierarchical;

wherein the path shapes itself to the shape of the character or object and the path serves as a pose for the character or object.

2. The apparatus of claim 1, wherein the body module controls the character or object to rotate, translate, twist, scale, or shift at least one segment of the character or object.

3. The apparatus of claim 1, wherein the path module assigns a control to each node in the path for use by an animator.

4. The apparatus of claim 1, wherein each node in the path and in the character or object has an associated matrix of values.

5. The apparatus of claim 1, wherein a length of each node in the path and in the character or object is predetermined.

6. The apparatus of claim 1, wherein the character or object includes a plurality of nodes and each node in the character or object is defined as a spline.

7. The apparatus of claim 5, wherein the path module assigns an additional control intermediate each node in the path.

8. The apparatus of claim 5, wherein each control has two associated end points which are nodes in the path.

9. The apparatus of claim 5, wherein the path module applies a rotation to a node of the path using the control.

10. The apparatus of claim 1, further comprising a travel module operatively coupled to the spline module and allowing movement of the character or object along the path and otherwise not constrained.

11. The apparatus of claim 9, wherein two adjacent segments of the path rotate together.

12. The apparatus of claim 3, wherein the path module provides a control associated with a segment of the path between two adjacent nodes and rotates the segment using the control.

13. The apparatus of claim 1, wherein the path module scales a length of each segment of the path.

14. The apparatus of claim 9, wherein the rotation is relative to an axis defined by the path.

15. The apparatus of claim 11, wherein two matrices of values are associated with each of the two path segments.

16. The apparatus of claim 1, wherein the path represents a road, trail, hill, ramp, or stairs along which the character or object moves.

17. The apparatus of claim 1, wherein the lock module associates each of a plurality of nodes of the path with one of a plurality of points in the character or object whereby the character or object is locked to the path from a first animation frame to a second animation frame.

18. The apparatus of claim 17, wherein the locking is such that at least one part of the character or object is locked to a location in world space of the animation.

19. The apparatus of claim 17, wherein the locking is such that at least one part of the character or object is locked to a control associated with the path.

20. The apparatus of claim 17, wherein the locking is such that at least one part of the character or object is locked to move at a predetermined speed along the path animation frame-to-frame.

21. The apparatus of claim 17, wherein the locking is such that a length of the character or object changes animation frame-to-frame.

22. The apparatus of claim 17, wherein the locking controls a tension between the character or object and the path.

23. The apparatus of claim 17, wherein the locking projects a shadow of the character or object onto the path.

* * * * *

UNITED STATES PATENT AND TRADEMARK OFFICE
CERTIFICATE OF CORRECTION

| | | |
|---|---|---|
| PATENT NO. | : 7,782,324 B2 | |
| APPLICATION NO. | : 11/285921 | |
| DATED | : August 24, 2010 | |
| INVENTOR(S) | : Haggai Goldfarb | |

It is certified that error appears in the above-identified patent and that said Letters Patent is hereby corrected as shown below:

Column 1, line 24; please replace "This type of relationships creates many limita-," with -- This type of relationship creates many limita- --.

Column 3, line 55; please replace "the animated feature file "Kung Fu Panda"." with -- the animated feature film "Kung Fu Panda". --.

Column 8, line 11; please replace "elements, called bare" with -- elements, called bare. --.

Signed and Sealed this

Thirty-first Day of May, 2011

David J. Kappos
*Director of the United States Patent and Trademark Office*